US011085836B2

(12) United States Patent
Okada et al.

(10) Patent No.: US 11,085,836 B2
(45) Date of Patent: Aug. 10, 2021

(54) FORCE SENSOR THAT DETECTS AT LEAST ONE OF A FORCE IN EACH AXIAL DIRECTION AND A MOMENT AROUND EACH AXIS IN AN XYZ THREE-DIMENSIONAL COORDINATE SYSTEM

(71) Applicant: TRI-FORCE MANAGEMENT CORPORATION, Saitama-ken (JP)

(72) Inventors: Kazuhiro Okada, Saitama (JP); Satoshi Era, Saitama (JP)

(73) Assignee: TRI-FORCE MANAGEMENT CORPORATION, Saitama-ken (JP)

( * ) Notice: Subject to any disclaimer, the term of this patent is extended or adjusted under 35 U.S.C. 154(b) by 521 days.

(21) Appl. No.: 15/761,415

(22) PCT Filed: Mar. 6, 2017

(86) PCT No.: PCT/JP2017/008843
§ 371 (c)(1),
(2) Date: Mar. 19, 2018

(87) PCT Pub. No.: WO2018/163255
PCT Pub. Date: Sep. 13, 2018

(65) Prior Publication Data
US 2020/0240854 A1    Jul. 30, 2020

(51) Int. Cl.
*G01L 1/14*    (2006.01)
*G01L 25/00*    (2006.01)

(52) U.S. Cl.
CPC ............ *G01L 1/14* (2013.01); *G01L 25/00* (2013.01)

(58) Field of Classification Search
CPC .............. G01L 1/14; G01L 5/16; G01L 25/00
(Continued)

(56) References Cited

U.S. PATENT DOCUMENTS 4,836,034 A    6/1989    Izumi et al.
4,911,023 A    5/1990    Izumi et al.
(Continued)

FOREIGN PATENT DOCUMENTS

JP    7-117470 B2    12/1995
JP    2004-354049 A    12/2004
(Continued)

OTHER PUBLICATIONS

International Search Report (ISR) dated May 16, 2017 for Application No. PCT/JP2017/008843.
(Continued)

*Primary Examiner* — Max H Noori
(74) *Attorney, Agent, or Firm* — Ladas & Parry LLP

(57) ABSTRACT

A force sensor according to the present invention includes: an annular deformable body arranged to surround an origin O when viewed in the Z-axis direction and configured to generate elastic deformation by application of one of a force and a moment; and a detection circuit that outputs an electric signal indicating one of the applied force and the moment on the basis of the elastic deformation generated in the deformable body. The deformable body includes: two fixed portions fixed with respect to the XYZ three-dimensional coordinate system; two force receiving portions positioned alternately with the fixed portions in a circumferential direction of the deformable body and configured to receive application of one of the force and the moment; and four deformable portions positioned between the fixed portion and the force receiving portion adjacent to each other in the circumferential direction of the deformable body, and each of the deformable portions includes a curved portion protruding in the Z-axis direction, and the detection circuit outputs the electric signal on the basis of elastic deformation generated in the curved portion.

19 Claims, 22 Drawing Sheets

(58) Field of Classification Search
USPC .................................................. 73/862.621
See application file for complete search history.

(56) References Cited

U.S. PATENT DOCUMENTS

| | | | | |
|---|---|---|---|---|
| 5,646,400 A * | 7/1997 | Perez | .................... | G01N 21/774 250/226 |
| 5,850,040 A * | 12/1998 | Okada | ..................... | G01C 19/56 73/504.04 |
| 6,499,355 B1 * | 12/2002 | Potyrailo | ............... | G01B 11/20 73/150 A |
| 8,966,996 B2 | 3/2015 | Okada et al. | | |
| 10,783,406 B1 * | 9/2020 | Ye | ............................ | G06T 7/001 |
| 2004/0187602 A1 | 9/2004 | Okada | | |
| 2004/0252748 A1 * | 12/2004 | Gleitman | .............. | E21B 47/135 374/130 |
| 2006/0169060 A1 * | 8/2006 | Okada | ..................... | G01L 5/165 73/862.043 |
| 2009/0055106 A1 * | 2/2009 | Finkel | ..................... | G01B 17/04 702/39 |
| 2011/0107850 A1 * | 5/2011 | Kim | .......................... | G01L 5/16 73/862.041 |
| 2013/0167661 A1 | 7/2013 | Nishioki et al. | | |
| 2013/0319135 A1 * | 12/2013 | Okada | .................... | G01L 5/0076 73/862.043 |
| 2015/0135856 A1 * | 5/2015 | Kim | .......................... | G01L 1/22 73/862.045 |
| 2016/0041049 A1 * | 2/2016 | Okada | ..................... | G01L 1/142 73/862.626 |
| 2016/0265339 A1 * | 9/2016 | Xia | ........................ | H01B 7/046 |
| 2018/0017452 A1 * | 1/2018 | Okada | .................... | G01L 3/1457 |
| 2019/0360943 A1 * | 11/2019 | Sahu | ...................... | G01N 21/90 |

FOREIGN PATENT DOCUMENTS

| | | |
|---|---|---|
| JP | 4948630 B2 | 3/2012 |
| JP | 4963138 B1 | 4/2012 |
| JP | 6552026 B2 | 7/2019 |

OTHER PUBLICATIONS

Japanese Office Action dated Apr. 9, 2019 for Application No. JP 2019-030866.

Japanese office action with an English translation dated Mar. 9, 2021 for corresponding Japanese Application No. JP 2020-195013.

* cited by examiner

|    | C1 | C2 | C3 | C4 |
|----|----|----|----|----|
| Mx | − | − | + | + |
| My | + | − | − | + |
| Mz | − | + | − | + |
| Fz | − | − | − | − |

| | C11 | C12 | C21 | C22 | C31 | C32 | C41 | C42 |
|---|---|---|---|---|---|---|---|---|
| Mx | − | − | − | − | + | + | + | + |
| My | + | + | − | − | − | − | + | + |
| Mz | − | − | + | + | − | − | + | + |
| Fz | − | − | − | − | − | − | − | − |

|     | C11 | C12 | C21 | C22 | C31 | C32 | C41 | C42 |
|-----|-----|-----|-----|-----|-----|-----|-----|-----|
| Mx  | −−  | −   | −−  | −   | ++  | +   | ++  | +   |
| My  | ++  | +   | −−  | −   | −−  | −   | ++  | +   |
| Mz  | −−  | −   | ++  | +   | −−  | −   | ++  | +   |
| Fz  | −−  | −   | −−  | −   | −−  | −   | −−  | −   |

FORCE SENSOR THAT DETECTS AT LEAST ONE OF A FORCE IN EACH AXIAL DIRECTION AND A MOMENT AROUND EACH AXIS IN AN XYZ THREE-DIMENSIONAL COORDINATE SYSTEM

RELATED APPLICATION

This application is an application under 35 U.S.C. 371 of International Application No. PCT/JP2017/008843 filed on Mar. 6, 2017, the entire contents of which are incorporated herein by reference.

TECHNICAL FIELD

The present invention relates to a force sensor, and more particularly to a sensor having a function of outputting a force applied in a predetermined axial direction and a moment (torque) applied around a predetermined rotational axis as an electric signal.

BACKGROUND ART

For example, Patent Literature 1 describes a force sensor having a function of outputting a force applied in a predetermined axial direction and a moment applied around a predetermined rotational axis as an electric signal, and widely used for force control in industrial robots. In recent years, force sensors are also adopted in life supporting robots. With expansion of the market of the force sensor, there are increased demands for lower prices and higher performance in the force sensors.

Meanwhile, the force sensor includes a capacitance type force sensor that detects a force or a moment on the basis of a variation amount of an electrostatic capacitance value of a capacitive element, and a strain gauge type force sensor that detects the force or the moment on the basis of a variation amount of an electric resistance value of a strain gauge. Among them, the strain gauge type force sensor includes a strain body (elastic body) having a complicated structure, and further needs a step of attaching the strain gauge to the strain body in the manufacturing process. Due to this high manufacturing cost of the strain gauge type force sensor, it is difficult to achieve lower prices.

In contrast, the electrostatic capacitance type force sensor can measure one of a force and a moment applied by a pair of parallel flat plates (capacitive elements), making it possible to simplify the structure of the strain generating body including the capacitive elements. That is, since the electrostatic capacity type force sensor needs relatively lower manufacturing cost, there is an advantage of easily lowering the price. Therefore, by further simplifying the structure of the strain generating body including the capacitive elements, it is possible to further lower the price in the electrostatic capacity type force sensor.

CITATION LIST

Patent Literature

Patent Literature 1: JP 2004-354049 A

The present invention has been made in view of the above circumstances. That is, an object of the present invention is to provide a less expensive capacitive type force sensor by simplifying the structure of a strain generating body including capacitive elements.

SUMMARY OF INVENTION

A force sensor according to the present invention detects at least one of a force in each axial direction and a moment around each axis in an XYZ three-dimensional coordinate system, the force sensor including:
an annular deformable body arranged so as to surround an origin O when viewed in a Z-axis direction and configured to generate elastic deformation by application of one of the force and the moment; and a detection circuit configured to output an electric signal indicating one of the applied force and the moment on the basis of the elastic deformation generated in the deformable body, in which the deformable body includes: two fixed portions fixed with respect to the XYZ three-dimensional coordinate system; two force receiving portions positioned alternately with the fixed portions in a circumferential direction of the deformable body and configured to receive application of one of the force and the moment; and four deformable portions positioned between the fixed portion and the force receiving portion adjacent to each other in the circumferential direction of the deformable body, each of the deformable portions includes a curved portion protruding in the Z-axis direction, and
the detection circuit outputs the electric signal on the basis of the elastic deformation generated in the curved portion.

According to the present invention, with the simple deformable body having a curved portion protruding in the Z-axis direction, it is possible to generate a displacement corresponding to one of the applied force and the moment in the Z-axis direction at a detection site. This enables the pair of electrodes constituting the capacitive element to be arranged in parallel to the XY plane, making it easy to configure the capacitive element. As a background, in the conventional electrostatic capacity type force sensor, the displacement corresponding to one of the applied force and the moment is generated in a direction orthogonal to the Z-axis, there used to be a need to first install a support extending in the Z-axis direction on an upper surface of a fixed body and then install another electrode (fixed electrode) on this support, resulting in a slightly complicated structure. In view of such a conventional arrangement of electrodes, the effect of the present invention can be better understood. According to the present invention, due to employment of the simple structure as described above, it is possible to provide a capacitive type force sensor less expensive than the conventional force sensor. In particular, in a force sensor having a plurality of capacitive elements, it is possible form a fixed electrode (electrode facing a displacement electrode arranged in a curved portion) of each of the pair of electrodes using a common substrate. Furthermore, it is also possible to achieve a configuration in which the fixed electrode is used as a common electrode shared by the plurality of capacitive elements.

Such a force sensor may be configured to further include:
a fixed body fixed with respect to the XYZ three-dimensional coordinate system; and
a force receiving body configured to move relative to the fixed portion by the application of one of a force and a moment, and may be configured such that the fixed portion of the deformable body is connected to the fixed body, and
the force receiving portion of the deformable body is connected to the force receiving body.

In this case, it is easy to apply one of the force and the moment to the deformable body.

Each of the fixed body and the force receiving body may include a through hole through which the Z-axis is inserted. This makes it possible to reduce the weight of the force sensor, and furthermore, to enhance the flexibility in installation of the force sensor.

The two fixed portions may be arranged symmetrically with a site where the deformable body overlaps with the X-axis about the Y-axis when viewed in the Z-axis direction, and the two force receiving portions may be arranged symmetrically a portion where the deformable body overlaps with the Y-axis about the X-axis when viewed in the Z-axis direction.

In this case, it is possible to effectively transmit one of the applied force and the moment to the deformable body.

The deformable body may have an annular shape about the origin O as a center, when viewed in the Z-axis direction.

Alternatively, the deformable body may have a rectangular shape about the origin O as a center, when viewed in the Z-axis direction.

In these cases, since the deformable body is arranged symmetrically about the X-axis and the Y-axis, the deformable body is symmetrically deformed due to one of the applied force and the moment. Therefore, it is easy to measure one of the applied force and the moment on the basis of the deformation.

It is allowable to configure such that each of the curved portions of the deformable body protrudes in a negative direction on the Z-axis, the detection circuit includes: a total of four displacement electrodes arranged one for each of the curved portions; and a fixed electrode arranged to face each of the displacement electrodes and fixed to the fixed portion, each of the displacement electrodes and the fixed electrode may constitute four sets of capacitive elements, and the detection circuit outputs an electric signal indicating one of the applied force and the moment on the basis of a variation amount of the electrostatic capacitance values of the four sets of capacitive elements.

In this case, by focusing on a combination of variations in electrostatic capacitance values of individual capacitive elements, it is possible to detect a plurality of components among a total of six components of force in individual axial directions and moment around individual axes in the XYZ three-dimensional coordinate system.

In a case where the V-axis and the W-axis passing through the origin O and forming an angle of 45° with respect to the X-axis and the Y-axis are defined on the XY plane, each of the four sets of capacitive elements may be arranged at each of the four sites at which the deformable body intersects the V-axis and the W-axis when viewed in the Z-axis direction.

In this case, the capacitive elements are arranged symmetrically about the X-axis and the Y-axis, and thus, particularly in a case where a deformable body having a symmetrical shape about the X-axis and the Y-axis is applied, the electrostatic capacitance value of each of the capacitive elements varies with high symmetry. This makes it possible to measure one of the applied force and the moment on the basis of the variation amount in the electrostatic capacitance value very easily.

In this force sensor, one deformable body-side support may be connected to each of the curved portions of the deformable body, and each of the four displacement electrodes may be supported by the corresponding deformable body-side support.

Attaching the displacement electrode directly to the curved portion might generate warping in the displacement electrode due to the effects of deformation of the curved portion. Adopting the above-described configuration, however, no warping is generated in the displacement electrode, making it possible to efficiently convert the elastic deformation generated in the curved portion into variation of the electrostatic capacitance value of the capacitive element.

Each of the force sensors described above may be configured such that detection sites are defined at a site located on the most negative side on the Z-axis at each of the curved portions of the deformable body, and the deformable body-side support includes: a beam arranged so as to overlap with the detection site of the curved portion to which the deformable body-side support is connected; and a connecting body connecting one end of the beam to the curved portion at a position different from the detection site, viewed in the Z-axis direction, and each of the displacement electrodes is supported by the beam of the corresponding deformable body-side support.

In this case, since the beam is connected to the curved portion at a position different from the detection site, displacement generated in the displacement electrode supported by the beam is amplified. That is, in a case where one of a force and a moment of a certain magnitude is applied, the displacement generated in the displacement electrode in this force sensor is greater than the displacement generated on the displacement electrode in the force sensor in which the displacement electrode is supported at the detection site of the curved portion. This makes it possible to perform measurement with higher sensitivity to one of the applied force and the moment and with higher accuracy.

Alternatively, it is possible to provide a force sensor capable of performing failure diagnosis using a single force sensor with the following configuration. That is, each of the curved portions of the deformable body protrudes in the negative direction on the Z-axis, the detection circuit includes: a total of eight displacement electrodes arranged two in each of the curved portions; and a fixed electrode arranged to face each of the displacement electrodes and fixed to the fixed portion, the displacement electrodes and the fixed electrodes constitute eight sets of capacitive elements, the detection circuit outputs a first electric signal indicating one of the applied force and the moment on the basis of a variation amount in an electrostatic capacitance value of a total of four capacitive elements obtained by selecting each one from the capacitive elements arranged such that two capacitive elements are located in each of the curved portions of the deformable body, and outputs a second electric signal indicating one of the applied force and the moment on the basis of a variation amount in an electrostatic capacitance value of a total of four capacitive elements obtained by selecting each one from the remaining capacitive elements, and determines whether the force sensor is functioning normally on the basis of the first electric signal and the second electric signal.

In this force sensor, the detection circuit may determine whether the force sensor is functioning normally on the basis of a difference between the first electric signal and the second electric signal. In this case, it is possible to provide a force sensor capable of detecting one of the applied force and the moment and capable of performing failure diagnosis.

Alternatively, it is allowable to configure such that each of the curved portions protrudes in the negative direction on the Z-axis and is formed by a first curved portion having a first spring constant and a second curved portion having a second spring constant different from the first spring constant continuously connected in a circumferential direction of the deformable body, the detection circuit includes: a total of eight displacement electrodes arranged one for each of the first curved portion and the second curved portion; and a fixed electrode arranged to face each of the displacement electrodes and fixed to the fixed portion, each of the displacement electrodes and the fixed electrodes constitute eight sets of capacitive elements, the detection circuit outputs a first electric signal indicating one of the applied force and the moment on the basis of a variation amount in an electrostatic capacitance value of the four capacitive elements arranged in the first curved portion, and outputs a second electric signal indicating one of the applied force and the moment on the basis of a variation amount in an electrostatic capacitance value of the four capacitive elements arranged in the second curved portion, and determines whether the force sensor is functioning normally on the basis of a change in a ratio of the first electric signal to the second electric signal.

Specifically, the detection circuit may store the ratio between the first electric signal and the second electric signal in a state where the force sensor is functioning normally as a reference ratio, and may determine whether the force sensor is functioning normally on the basis of a difference between the ratio of the first electric signal to the second electric signal, and the reference ratio.

In this case, it is possible to provide a force sensor capable of detecting one of an applied force and a moment and capable of diagnosing a failure due to metal fatigue developed in the deformable body. The principle of more detailed failure diagnosis will be described below.

In the force sensor having the above eight capacitive elements, in a case where the V-axis and the W-axis passing through the origin O and forming an angle of 45° with respect to the X-axis and the Y-axis are defined on the XY plane, the two displacement electrodes arranged in a first quadrant on the XY plane may be arranged symmetrically about the positive V-axis, the two displacement electrodes arranged in a second quadrant on the XY plane may be arranged symmetrically about the positive W-axis, the two displacement electrodes arranged in a third quadrant on the XY plane may be arranged symmetrically about the negative V-axis, and the two displacement electrodes arranged in a fourth quadrant on the XY plane may be arranged symmetrically about the negative W-axis.

In this case, since the eight capacitive elements are symmetrically arranged about each of the X-, Y-, V-, and W-axes, the variation amount in the electrostatic capacitance value generated in each of the capacitive elements due to one of the applied force and the moment is also symmetrical. This makes it easy to measure one of the applied force and the moment.

Alternatively, the present invention is a force sensor that detects at least one of a force in each axial direction and a moment around each axis in an XYZ three-dimensional coordinate system, the force sensor including:

a circular fixed body fixed with respect to the XYZ three-dimensional coordinate system;

an annular deformable body arranged so as to surround the fixed body and to be connected to the fixed body and configured to generate elastic deformation by application of one of the force and the moment;

an annular force receiving body surrounding the deformable body and connected to the deformable body, and configured to move relative to the fixed body by the application of one of the force and the moment; and a detection circuit configured to output an electric signal indicating one of the force and the moment applied to the force receiving body on the basis of the elastic deformation generated in the deformable body, in which the fixed body, the deformable body, and the force receiving body are arranged to be concentric with each other, a Z-coordinate value of an end surface of the force receiving body on the positive side on the Z-axis is greater than a Z-coordinate value of an end surface of the deformable body on the positive side on the Z-axis, the Z-coordinate value of an end surface of the fixed body on the negative side on the Z-axis is smaller than the Z-coordinate value of an end surface of the deformable body on the negative side on the Z-axis, and the deformable body includes: two fixed portions connected to the fixed body; two force receiving portions connected to the force receiving body and alternately positioned with the fixed portions in the circumferential direction of the deformable body; and four deformable portions positioned between the adjacent fixed portions and the force receiving portions.

That is, with the force sensor according to the present invention, it is possible to provide a less expensive capacitive type force sensor by simplifying the structure of a strain generating body including the capacitive element. Furthermore, this force sensor does not interfere with other members when attached to a joint portion of a robot.

Each of the deformable portions may include a curved portion protruding in the Z-axis direction, and the detection circuit may output the electric signal on the basis of the elastic deformation generated in the curved portion.

In this case, it is possible to generate in the elastic body a displacement in the Z-axis direction by one of the applied force and the moment by a simple configuration, making it easy to arrange a pair of electrodes constituting the capacitive element.

Alternatively, each of the deformable portions may include a curved portion protruding in a radial direction of the deformable body, and the detection circuit may output the electric signal on the basis of the elastic deformation generated in the curved portion.

In this case, it is possible to provide a force sensor that does not interfere with other members when attached to the joint portion of the robot even with the conventional deformable body.

The two fixed portions may be arranged symmetrically with a site where the deformable body overlaps with the X-axis about the Y-axis when viewed in the Z-axis direction, and the two force receiving portions may be arranged symmetrically with a site where the deformable body overlaps with the Y-axis about the X-axis when viewed in the Z-axis direction.

In this case, it is possible to effectively transmit one of the applied force and the moment to the deformable body.

BRIEF DESCRIPTION OF DRAWINGS

FIG. 5 is a schematic cross-sectional view of FIG. 4.

FIG. 7 is a schematic cross-sectional view of FIG. 6.

FIG. 9 is a schematic cross-sectional view of FIG. 8.

FIG. 11 is a schematic cross-sectional view of FIG. 10.

FIG. 42 is a schematic cross-sectional view of FIG. 41.

DESCRIPTION OF EMBODIMENTS

<<<§ 1. Force Sensor According to First Embodiment of the Present Invention>>>

Hereinafter, a force sensor according to a first embodiment of the present invention will be described in detail with reference to the accompanying drawings.

<1-1. Basic Structure>

Figure 1:
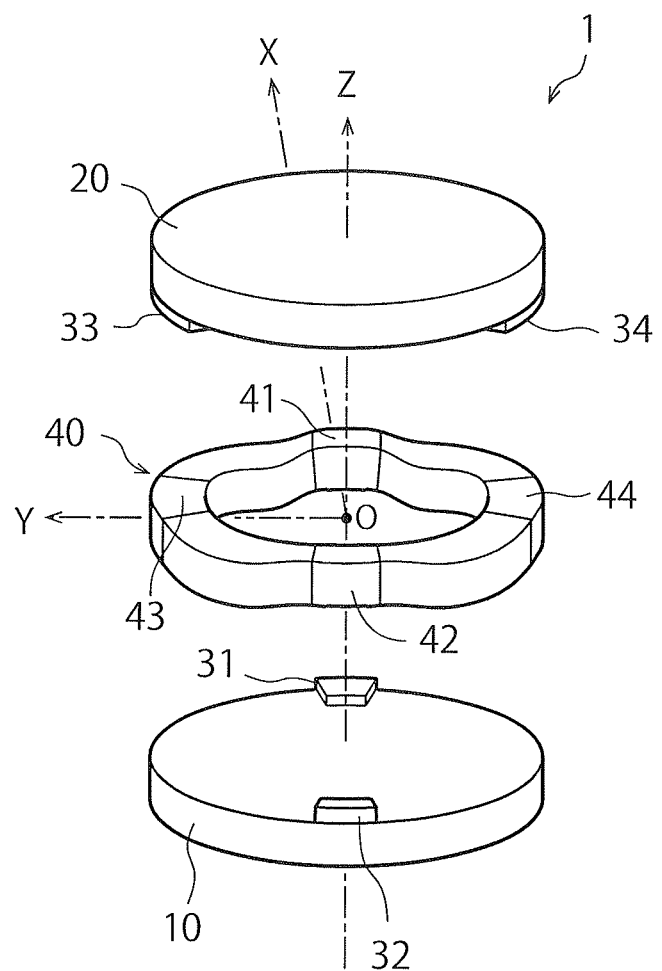
FIG. 1 is a schematic perspective view illustrating a basic structure of a force sensor according to an embodiment of the present invention.
Figure 2:
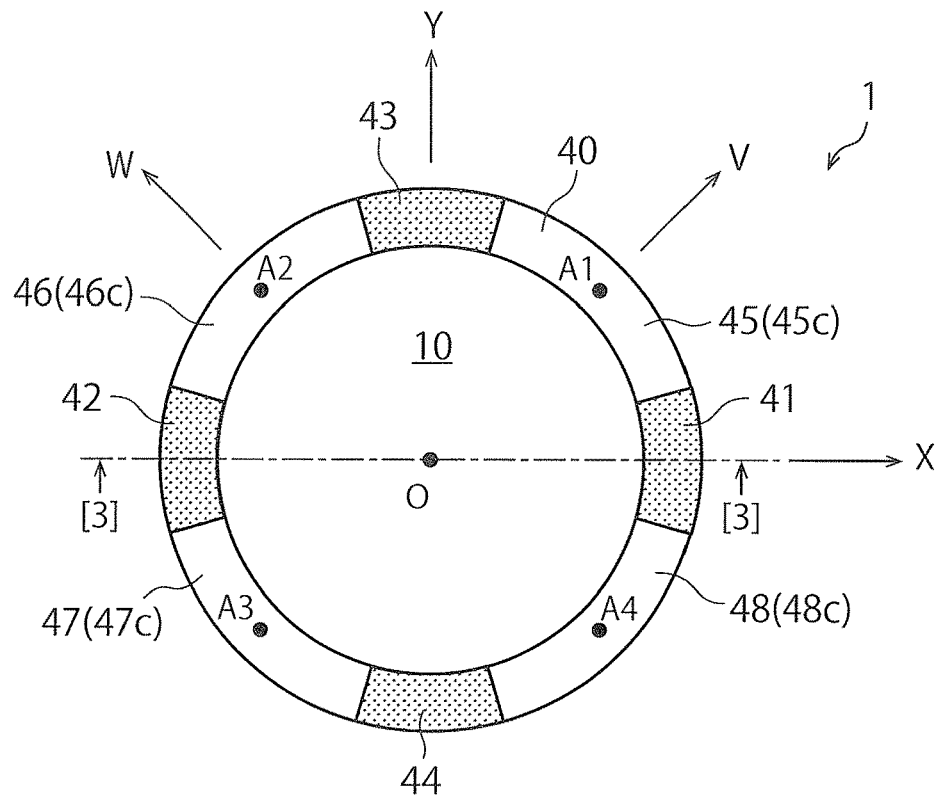
FIG. 2 is a schematic plan view illustrating the basic structure of FIG. 1.
Figure 3:
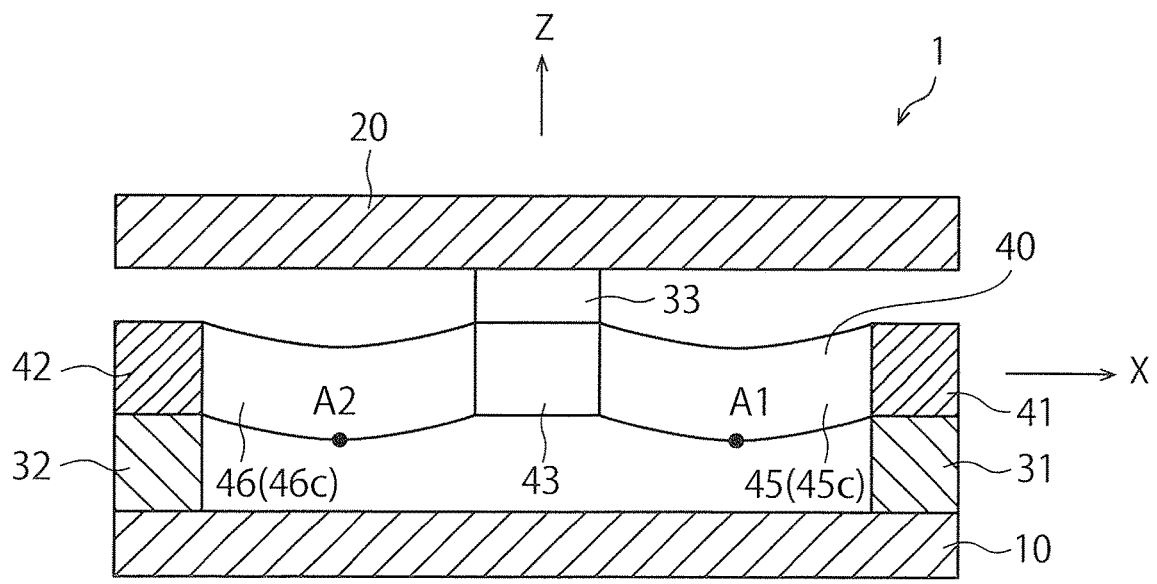
FIG. 3 is a cross-sectional view taken along line [3]-[3] in FIG. 2.

FIG. 1 is a schematic perspective view illustrating a basic structure 1 of a force sensor according to the first embodiment of the present invention. FIG. 2 is a schematic plan view illustrating the basic structure 1 of FIG. 1. FIG. 3 is a cross-sectional view taken along line [3]-[3] in FIG. 2. In FIG. 2, a left-right direction is defined as an X-axis, an up-down direction is defined as a Y-axis, and a depth direction is defined as a Z-axis. In the present description, the positive direction on the Z-axis will be referred to as an upper or upward direction, and the negative direction on the Z-axis will be referred to as a lower or downward direction. In addition, in this description, the term "around the positive X-axis" represents a rotational direction of rotating a right screw to advance the right screw in the positive direction on the X-axis, and the "around the negative X-axis" represents the reversed rotational direction. The definition of the rotational direction is similarly applied to the Y-axis and the Z-axis.

As illustrated in FIGS. 1 to 3, the basic structure 1 includes a disk-shaped fixed body 10 having an upper surface parallel to the XY plane, a force receiving body 20 that moves relative to the fixed body 10 upon application of one of a force and a moment, and an annular deformable body 40 connected to the fixed body 10 and the force receiving body 20 and configured to generate elastic deformation by the movement of the force receiving body 20 relative to the fixed body 10. The fixed body 10, the force receiving body 20 and the deformable body 40 are concentric with each other, having a same outer diameter. In FIG. 2, in order to clearly illustrate the deformable body 40, illustration of the force receiving body 20 is omitted.

In the basic structure 1 according to the present embodiment, a capacitive element is arranged at a predetermined position of a gap formed between the deformable body 40 and the fixed body 10, and functions as a force sensor by connecting a predetermined detection circuit 50 (refer to FIG. 12) to the capacitive element. The detection circuit 50 is provided for measuring one of the applied force and the moment on the basis of a variation amount in the electrostatic capacitance value of the capacitive element. A specific arrangement manner of the capacitive element and a specific method for measuring one of the applied force and the moment will be described below.

As illustrated in FIGS. 1 and 2, the deformable body 40 has an annular shape in general having an origin O of the XYZ three-dimensional coordinate system as a center and arranged in parallel with the XY plane. Herein, it is assumed that the XY plane exists at a position half the thickness in the Z-axis direction of the deformable body 40 as illustrated in FIG. 3. As illustrated in FIG. 3, the deformable body 40 of the present embodiment has a square cross-sectional shape. As the material of the deformable body 40, for example, a metal can be adopted. As illustrated in FIG. 2, the deformable body 40 includes a first fixed portion 41 positioned on the positive X-axis, a second fixed portion 42 located on the negative X-axis, and a first force receiving portion 43 located on the positive Y-axis, and a second force receiving portion 44 located on the negative Y-axis. As will be described below, each of the fixed portions 41 and 42 and each of the force receiving portions 43 and 44 are regions to which the fixed body 10 and the force receiving body 20 of the deformable body 40 are connected, and they not sites having characteristics different from the other regions of the deformable body 40. Accordingly, the material of each of the fixed portions 41 and 42 and the force receiving portions 43 and 44 is the same as the material of the other regions of the deformable body 40. However, for the sake of convenience of explanation, the regions are illustrated in a color different from the colors of other regions of the deformable body 40 in the drawing.

As illustrated in FIGS. 1 to 3, the deformable body 40 further includes: a first deformable portion 45 located between the first fixed portion 41 and the first force receiving portion 43 (first quadrant of the XY plane); a second deformable portion 46 located between the first force receiving portion 43 and the second fixed portion 42 (second quadrant of the XY plane); a third deformable portion 47 located between the second fixed portion 42 and the second force receiving portion 44 (third quadrant of the XY plane); and a fourth deformable portion 48 located between the second force receiving portion 44 and the first fixed portion 41 (fourth quadrant of the XY plane). Both ends of each of the deformable portions 45 to 48 are integrally coupled to the adjacent fixed portions 41 and 42 and the force receiving portions 43 and 44, respectively. With this structure, one of the forces and the moments applied to the force receiving portions 43 and 44 are reliably transmitted to the individual deformable portions 45 to 48, thereby generating elastic deformation corresponding to one of the applied force and the moment in the deformable portions 45 to 48.

As illustrated in FIGS. 1 and 3, the basic structure 1 further includes a first connecting member 31 and a second connecting member 32 connecting the fixed body 10 to the deformable body 40, and a third connecting member 33 and a fourth connecting member 34 connecting the force receiving body 20 to the deformable body 40. The first connecting member 31 connects a lower surface (lower surface in FIG. 3) of the first fixed portion 41 to an upper surface of the fixed body 10. The second connecting member 32 connects a lower surface of the second fixed portion 42 to an upper surface of the fixed body 10. The third connecting member 33 connects an upper surface (upper surface in FIG. 3) of the first force receiving portion 43 to a lower surface of the force receiving body 20. The fourth connecting member 34 connects an upper surface of the second force receiving portion 44 to the lower surface of the force receiving body 20. Each of the connecting members 31 to 34 has rigidity enough to be regarded as substantially a rigid body. This causes the one of a force and a moment applied to the force receiving body 20 to effectively generate elastic deformation on each of the deformable portions 45 to 48.

Furthermore, as illustrated in FIGS. 1 and 3, each of the deformable portions 45 to 48 of the deformable body 40 includes curved portions 45c to 48c curved to protrude in the negative direction on the Z-axis. In the illustrated example, each of the deformable portions 45 to 48 forms the curved portions 45c to 48c as a whole. Accordingly, FIGS. 1 to 3 illustrate reference numerals 45 to 48 of the deformable portions together with reference numerals 45c to 48c of the curved portions. This similarly applies to other embodiments to be described below. In the deformable body 40 according to the present embodiment, as illustrated in FIG. 3, a site of the first curved portion 45c located at the lowermost position (negative direction on the Z-axis) exists at a 45° rotated position counterclockwise from the first fixed portion 41 along the circumferential direction of the deformable body 40. In addition, the shape of the first curved portion 45c from the first fixed portion 41 to the site located at the lowermost position is the same as the shape of the site from the first force receiving portion 43 to the site located at the lowermost position. In other words, the first curved portion 45c has a symmetrical shape about the site located at the lowermost portion in the circumferential direction of the deformable body 40.

This similarly applies to the remaining three curved portions 46c, 47c, and 48c. That is, a site of the second curved portion 46c located at the lowermost position exists at a 45° rotated position counterclockwise from the first force receiving portion 43 along the circumferential direction of the deformable body 40 and has a symmetrical shape about the site located at the lowermost portion in the circumferential direction of the deformable body 40. A site of the third curved portion 47c located at the lowermost position exists at a 45° rotated position counterclockwise from the second fixed portion 42 along the circumferential direction of the deformable body 40 and has a symmetrical shape about the site located at the lowermost portion in the circumferential direction of the deformable body 40. A site of the fourth curved portion 48c located at the lowermost position exists at a 45° rotated position counterclockwise from the second force receiving portion 44 along the circumferential direction of the deformable body 40 and has a symmetrical shape about the site located at the lowermost portion in the circumferential direction of the deformable body 40.

As a result, as illustrated in FIG. 2, when the V-axis and the W-axis passing through the origin O and forming 45° with respect to the X-axis and the Y-axis are defined on the XY plane, the first curved portion 45c is symmetrical about the positive V-axis, the second curved portion 46c is symmetrical about the positive W-axis, the third curved portion 47c is symmetrical about the negative V-axis, and the fourth curved portion 48c is symmetrical about the negative W-axis.

As illustrated in FIGS. 2 and 3, the basic structure 1 defines detection sites A1 to A4 for detecting elastic deformation generated in each of the curved portions 45c to 48c. Specifically, the detection sites A1 to A4 are formed at the lowermost position of each of the curved portions 45c to 48c, that is, at the sites in which each of the curved portions 45c to 48c overlaps with the V-axis and the W-axis when viewed in the Z-axis direction. In FIG. 2, while the detection sites A1 to A4 are illustrated as being provided on the upper surface (front surface) of the deformable body 40, the detection sites A1 to A4 are actually provided on the lower surface (back surface) of the deformable body 40 (refer to FIG. 3).

<1-2. Application of Basic Structure>

Next, application of the basic structure 1 will be described.

(1-2-1. Case where Moment Mx Around X-Axis is Applied to Basic Structure 1)

Figure 4:
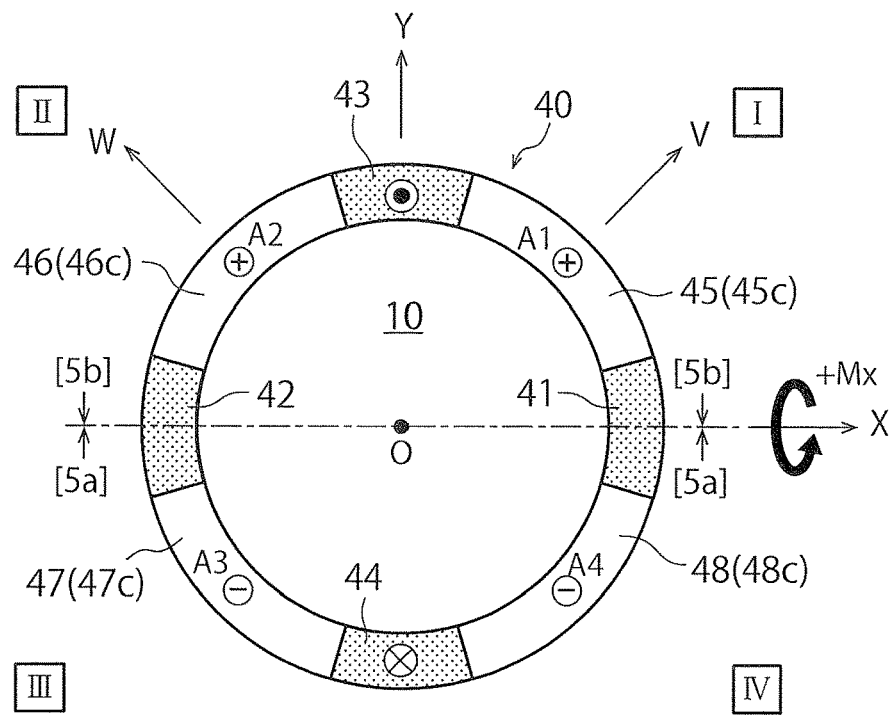
FIG. 4 is a schematic plan view for illustrating elastic deformation generated in each of curved portions when a moment+Mx around the positive X-axis is applied to the basic structure in FIG. 1.
Figure 5A:
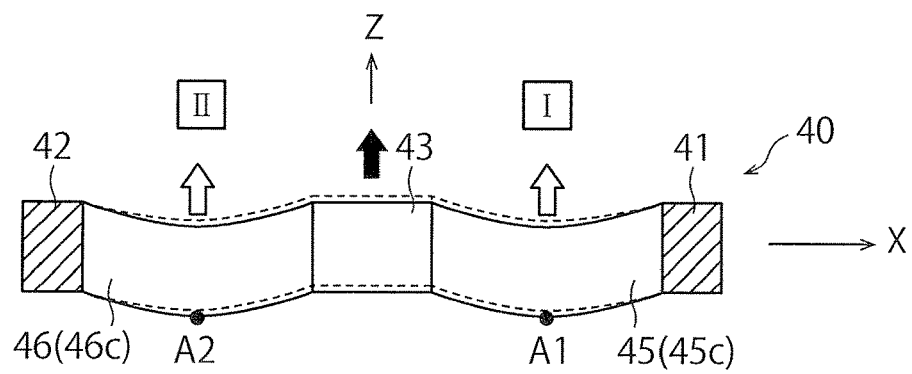
FIG. 5(a) is a cross-sectional view taken along line [5a]-[5a] in FIG. 4.
Figure 5B:
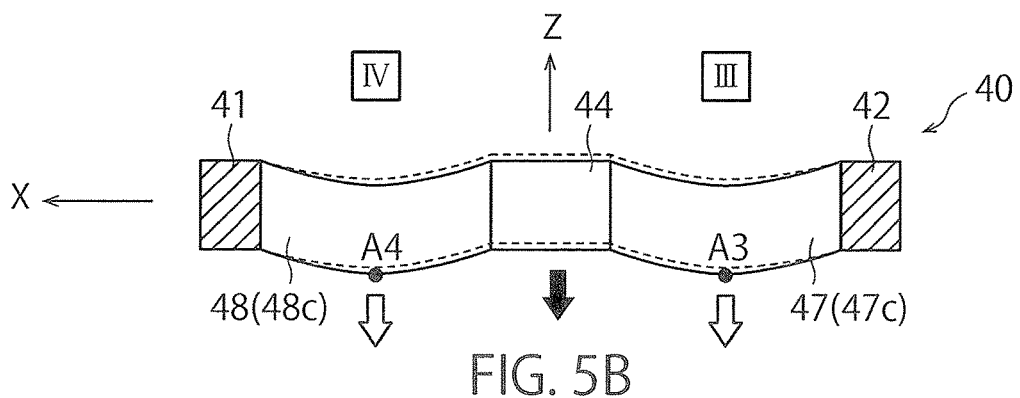
FIG. 5(b) is a cross-sectional view taken along line [5b]-[5b] in FIG. 4.

FIG. 4 is a schematic plan view for illustrating elastic deformation generated in each of the curved portions 45c to 48c when a moment +Mx around the positive X-axis is applied to the basic structure 1 in FIG. 1. FIG. 5 is a schematic cross-sectional view of FIG. 4. FIG. 5(a) is a cross-sectional view taken along line [5a]-[5a] in FIG. 4, and FIG. 5(b) is a cross-sectional view taken along line [5b]-[5b] in FIG. 4. In FIG. 4 and FIG. 5, thick solid arrows indicate applied one of a force and a moment, and thick outlined arrows indicate directions of displacement of the detection sites A1 to A4. This similarly applies to the other figures.

As illustrated in FIG. 4, when the moment +Mx around the positive X-axis is applied to the basic structure 1 via the force receiving body 20 (refer to FIGS. 1 and 3), a force in the positive direction on the Z-axis (upward direction in FIG. 5(a)) is applied to the first force receiving portion 43 of the deformable body 40, while a force in the negative direction on the Z-axis (downward direction in FIG. 5(b)) is applied to the second force receiving portion 44. In FIG. 4, the symbol of a circled black point attached to the first force receiving portion 43 indicate that a force is applied from the negative direction on the Z-axis to the positive direction on the Z-axis. The symbol of a circled x attached to the second force receiving portion 44 indicates that a force is applied from the positive direction on the Z-axis to the negative direction on the Z-axis. Representation of these symbols similarly applies to FIGS. 6, 8 and 10.

At this time, as illustrated in FIG. 5(a) and FIG. 5(b), the following elastic deformation is generated in the first to fourth curved portions 45c to 48c. That is, the first force receiving portion 43 is moved upward by the force in the positive direction on the Z-axis applied to the first force receiving portion 43, and thus, the end portion coupled to the first force receiving portion 43 among the first curved portion 45c and the second curved portion 46c is also moved upward. As a result, as illustrated in FIG. 5(a), the first curved portion 45c and the second curved portion 46c are generally moved upward except for the end portions coupled to the first and second fixed portions 41 and 42. That is, the first detection site A1 and the second detection site A2 move upward together. Meanwhile, the second force receiving portion 44 is moved downward by the force in the negative direction on the Z-axis applied to the second force receiving portion 44, and thus, the end portion coupled to the second force receiving portion 44 among the third curved portion 47c and the fourth curved portion 48c is moved downward. As a result, as illustrated in FIG. 5(b), the third curved portion 47c and the fourth curved portion 48c are generally moved downward except for the end portions coupled to the first and second fixed portions 41 and 42. That is, the third detection site A3 and the fourth detection site A4 move downward together.

In FIG. 4, such movement is represented by the symbol of a circled "+" or "−" attached to the positions of the detection sites A1 to A4. Specifically, the detection site having the symbol of circled "+" is displaced in the positive direction on the Z-axis by the elastic deformation of the curved portion, while the detection site having the circled "−" is displaced in the negative direction on the Z-axis by the elastic deformation of the curved portion. This similarly applies to FIGS. 6, 8 and 10.

As a result, when a moment +Mx around the positive X-axis is applied to the force receiving body 20 of the basic structure 1, the separation distances between each of the first and second detection sites A1 and A2 and the upper surface of the fixed body 10 (refer to FIG. 3) both increase, and the separation distance between each of the third and fourth detection sites A3 and A4 and the upper surface of the fixed body 10 both decrease.

Although not illustrated, in a case where the moment −Mx around the negative X-axis is applied to the force receiving body 20 of the basic structure 1, the moving direction of each of the detection sites A1 to A4 is opposite to the above-described direction. That is, due to the moment −Mx around the negative X-axis, the separation distances between each of the first and second detection sites A1, A2 and the upper surface of the fixed body 10 (refer to FIG. 2) both decrease, and the separation distance between each of the third and fourth detection sites A3, A4 and the upper surface of the fixed body 10 both increase.

(1-2-2. Case where Moment My Around Y-Axis is Applied to Basic Structure 1)

Figure 6:
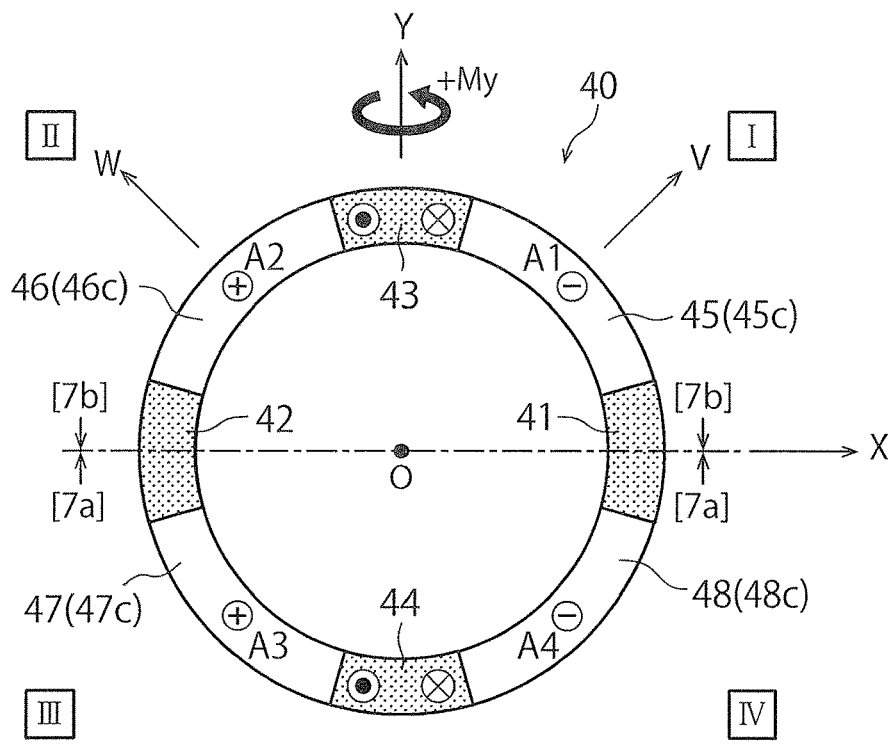
FIG. 6 is a schematic plan view for illustrating elastic deformation generated in each of curved portions when a moment+My around the positive Y-axis is applied to the basic structure in FIG. 1.
Figure 7A:
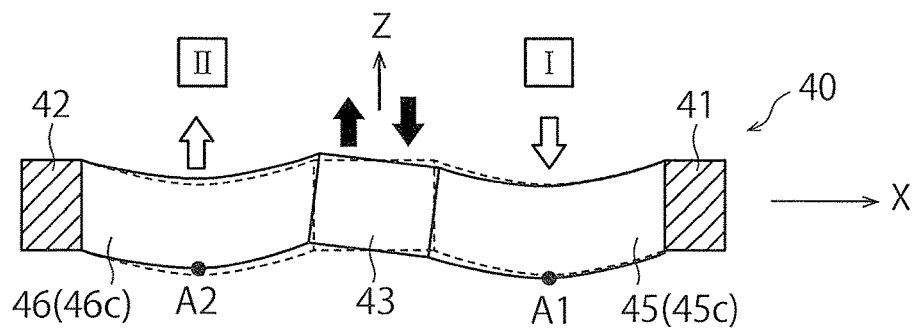
FIG. 7(a) is a cross-sectional view taken along line [7a]-[7a] of FIG. 6.
Figure 7B:
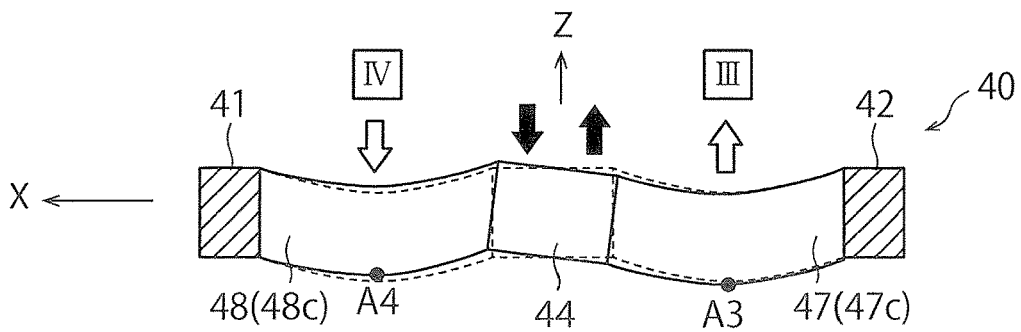
FIG. 7(b) is a cross-sectional view taken along line [7b]-[7b] of FIG. 6.

FIG. 6 is a schematic plan view for illustrating elastic deformation generated in each of the curved portions 45c to 48c when a moment +My around the positive Y-axis is applied to the basic structure 1 in FIG. 1. FIG. 7 is a schematic cross-sectional view of FIG. 6. FIG. 7(a) is a cross-sectional view taken along line [7a]-[7a] of FIG. 6, and FIG. 7(b) is a cross-sectional view taken along line [7b]-[7b] of FIG. 6.

As illustrated in FIGS. 6 and 7, when the moment +My around the positive Y-axis is applied to the basic structure 1 via the force receiving body 20 (refer to FIGS. 1 and 3), a force in the positive direction on the Z-axis is applied to the regions of the first and second force receiving portions 43 and 44 of the deformable body 40 on the negative side on the X-axis, while a force in the negative direction on the Z-axis is applied to the regions of the first and second force receiving portions 43 and 44 in the positive side on the X-axis.

At this time, as illustrated in FIG. 7(a) and FIG. 7(b), the following elastic deformation is generated in the first to fourth curved portions 45c to 48c. That is, the region on the positive side on the X-axis is moved downward by the force in the negative direction on the Z-axis applied to the first force receiving portion 43 on the positive side on the X-axis (right side in FIG. 7(a)), and thus, the end portion coupled to the first force receiving portion 43 among the first curved portion 45c moves downward. As a result, as illustrated in FIG. 7(a), the first curved portion 45c generally moves downward except for the end portion coupled to the first fixed portion 41. That is, the first detection site A1 moves downward. Meanwhile, the region on the negative side on the X-axis is moved upward by the force in the positive direction on the Z-axis applied to the first force receiving portion 43 on the negative side on the X-axis (left side in FIG. 7(a), and thus, the end portion coupled to the first force receiving portion 43 among the second curved portion 46c also moves upward. As a result, as illustrated in FIG. 7(a), the second curved portion 46c generally moves upward except for the end portion coupled to the second fixed portion 42. That is, the second detection site A2 moves upward.

Moreover, as illustrated in FIG. 7(b), the region on the negative side on the X-axis is moved upward by the force in the positive direction on the Z-axis applied to the second force receiving portion 44 on the negative side on the X-axis (right side in FIG. 7(b)), and thus, the end portion coupled to the second force receiving portion 44 among the third curved portion 47c moves upward. As a result, as illustrated in FIG. 7(b), the third curved portion 47c generally moves upward except for the end portion coupled to the second fixed portion 42. That is, the third detection site A3 moves upward.

Meanwhile, as illustrated in FIG. 7(b), the region on the positive side on the X-axis is moved downward by the force in the negative direction on the Z-axis applied to the second force receiving portion 44 on the positive side on the X-axis (left side in FIG. 7(b)), and thus, the end portion coupled to the second force receiving portion 44 among the fourth curved portion 48c moves downward. As a result, as illustrated in FIG. 7(b), the fourth curved portion 48c moves downward as a whole, except for the end portion coupled to the first fixed portion 41. That is, the fourth detection site A4 moves downward.

As a result, when a moment +My around the positive Y-axis is applied to the force receiving body 20 of the basic structure 1, the separation distances between each of the first and fourth detection sites A1 and A4 and the upper surface of the fixed body 10 (refer to FIG. 3) both decrease, and the separation distance between each of the second and third detection sites A2 and A3 and the upper surface of the fixed body 10 both increase.

Although not illustrated, in a case where the moment −My around the negative Y-axis is applied to the force receiving body 20 of the basic structure 1, the moving direction of each of the detection sites A1 to A4 is opposite to the above-described direction. That is, due to the moment −My around the negative Y-axis, the separation distances between each of the first and fourth detection sites A1 and A4 and the upper surface of the fixed body 10 (refer to FIG. 3) both increase, and the separation distance between each of the second and third detection sites A2 and A3 and the upper surface of the fixed body 10 both decrease.

(1-2-3. Case where Moment Mz Around Z-Axis is Applied to Basic Structure 1)

Figure 8:
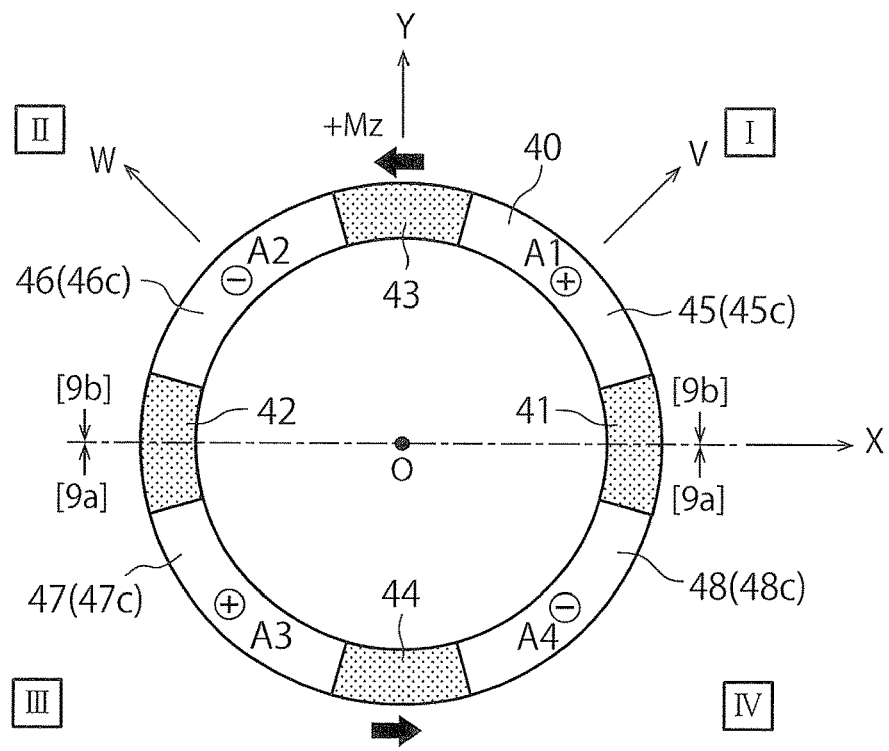
FIG. 8 is a schematic plan view for illustrating elastic deformation generated in each of curved portions when a moment+Mz around the positive Z-axis is applied to the basic structure in FIG. 1.
Figure 9A:
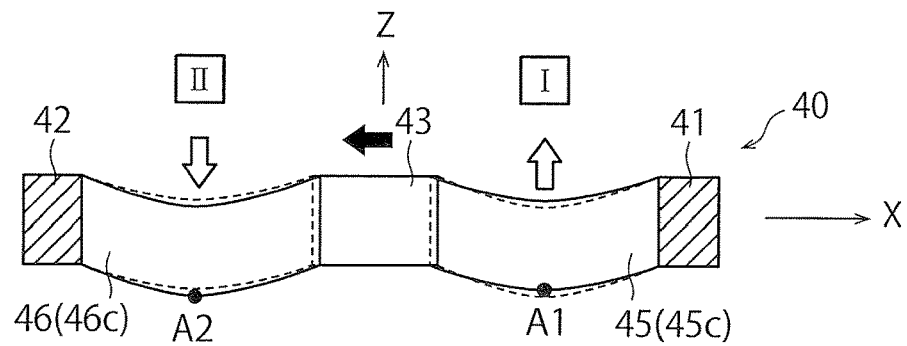
FIG. 9(a) is a cross-sectional view taken along line [9a]-[9a] in FIG. 8.
Figure 9B:
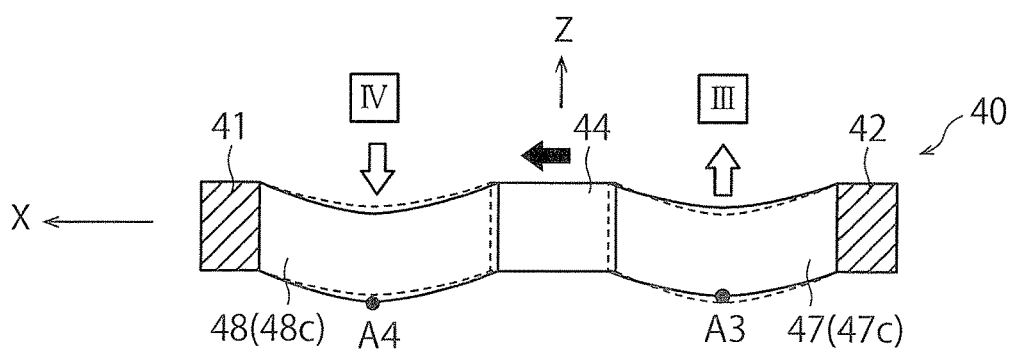
FIG. 9(b) is a cross-sectional view taken along line [9b]-[9b] in FIG. 8.

FIG. 8 is a schematic plan view for illustrating elastic deformation generated in each of the curved portions 45c to 48c when a moment +Mz around the positive Z-axis is applied to the basic structure 1 in FIG. 1. FIG. 9 is a schematic cross-sectional view of FIG. 8. FIG. 9(a) is a cross-sectional view taken along line [9a]-[9a] in FIG. 8, and FIG. 9(b) is a cross-sectional view taken along line [9b]-[9b] in FIG. 8.

As illustrated in FIG. 8, when the moment +Mz around the positive Z-axis is applied to the basic structure 1 via the force receiving body 20 (refer to FIGS. 1 and 3), a force in the negative direction on the X-axis (left direction in FIG. 8) is applied to the first force receiving portion 43 of the deformable body 40, while a force in the positive direction on the X-axis (right direction in FIG. 8) is applied to the second force receiving portion 44.

At this time, as illustrated in FIG. 9(a) and FIG. 9(b), the following elastic deformation is generated in the first to fourth curved portions 45c to 48c. That is, since the first force receiving portion 43 moves in the negative direction on the X-axis due to the force in the negative direction on the X-axis applied to the first force receiving portion 43, a tensile force along the X-axis direction is applied to the first curved portion 45c. As a result, the first curved portion 45c elastically deforms to increase the radius of curvature while maintaining the Z-coordinate values of the both end portions. That is, the first detection site A1 moves upward. Meanwhile, the movement of the first force receiving portion 43 in the negative direction on the X-axis causes a compressive force along the X-axis direction to be applied to the second curved portion 46c. As a result, the second curved portion 46c elastically deforms to decrease the radius of curvature while maintaining the Z-coordinate values of the both end portions. That is, the second detection site A2 moves downward.

Moreover, since the second force receiving portion 44 moves in the positive direction on the X-axis due to the force in the positive direction on the X-axis applied to the second force receiving portion 44, a tensile force along the X-axis direction is applied to the third curved portion 47c. As a result, the third curved portion 47c elastically deforms to increase the radius of curvature while maintaining the Z-coordinate values of the both end portions. That is, the third detection site A3 moves upward. Meanwhile, the movement of the second force receiving portion 44 in the positive direction on the X-axis causes a compressive force along the X-axis direction to be applied to the fourth curved portion 48c. As a result, the fourth curved portion 48c elastically deforms to decrease the radius of curvature while maintaining the Z-coordinate values of the both end portions. That is, the fourth detection site A4 moves downward.

As a result, when a moment +Mz around the positive Z-axis is applied to the force receiving body 20 of the basic structure 1, the separation distances between each of the first and third detection sites A1 and A3 and the upper surface of the fixed body 10 both increase, and the separation distance between each of the second and fourth detection sites A2 and A4 and the upper surface of the fixed body 10 (refer to FIG. 2) both decrease.

Although not illustrated, in a case where the moment −Mz around the negative Z-axis is applied to the force receiving body 20 of the basic structure 1, the moving direction of each of the detection sites A1 to A4 is opposite to the above-described direction. That is, due to the moment −Mz around the negative Z-axis, the separation distances between each of the first and third detection sites A1 and A3 and the upper surface of the fixed body 10 both decrease, and the separation distance between each of the second and fourth detection sites A2 and A4 and the upper surface of the fixed body 10 (refer to FIG. 2) both increase.

(1-2-4. Case where Force Fz in Z Direction is Applied to Basic Structure 1)

Figure 10:
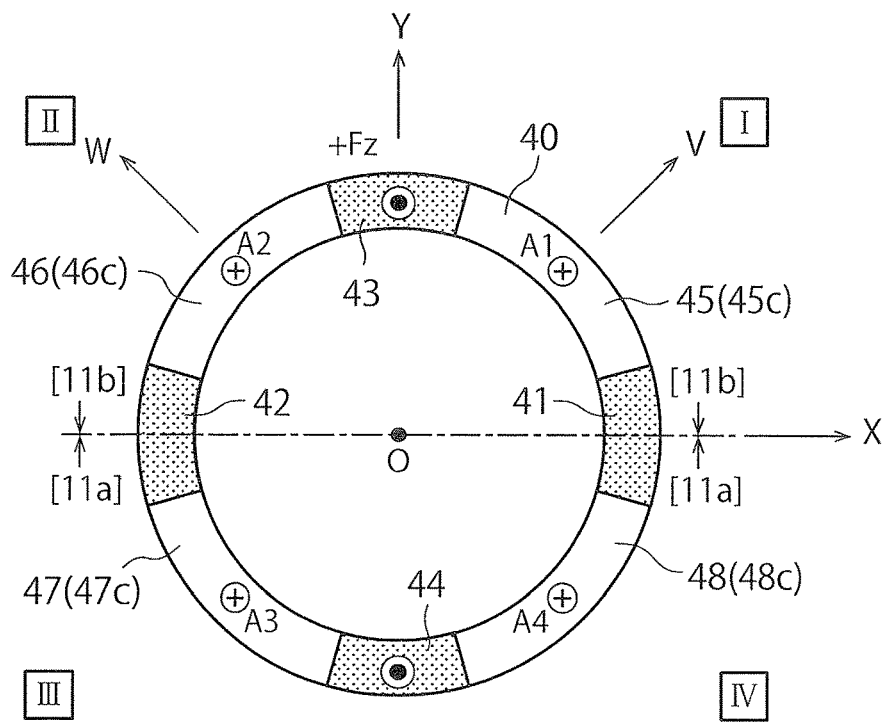
FIG. 10 is a schematic plan view for illustrating elastic deformation generated in each of the curved portions when a force+Fz in the positive direction on the Z-axis is applied to the basic structure in FIG. 1.
Figure 11A:
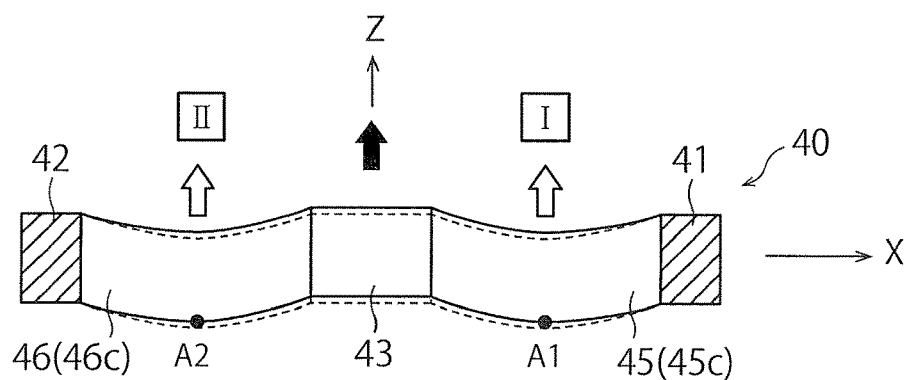
FIG. 11(a) is a cross-sectional view taken along line [11a]-[11a] in FIG. 10.
Figure 11B:
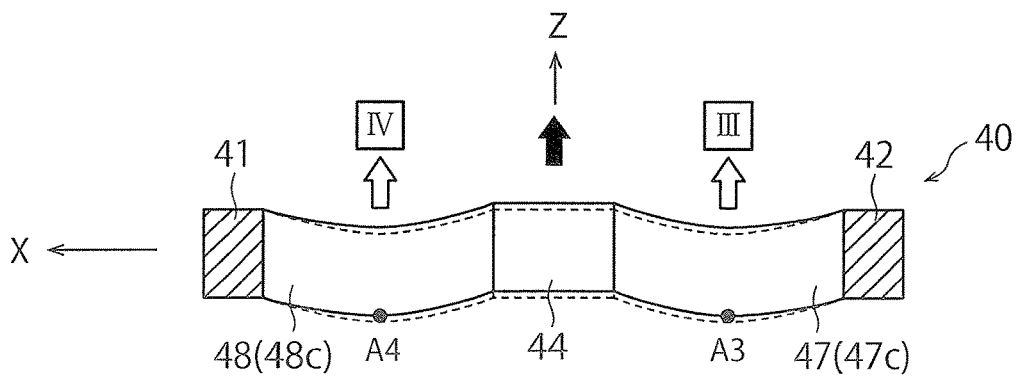
FIG. 11(b) is a cross-sectional view taken along line [11b]-[11b] in FIG. 10.

FIG. 10 is a schematic plan view for illustrating elastic deformation generated in each of the curved portions 45c to 48c when a force +Fz in the positive direction on the Z-axis is applied to the basic structure 1 in FIG. 1. FIG. 11 is a schematic cross-sectional view of FIG. 10. FIG. 11(a) is a cross-sectional view taken along line [11a]-[11a] in FIG. 10, and FIG. 11(b) is a cross-sectional view taken along line [11b]-[11b] in FIG. 10.

As illustrated in FIG. 10 and FIG. 11, when a force +Fz in the positive direction on the Z-axis is applied to the basic structure 1 via the force receiving body 20 (refer to FIGS. 1 and 3), the force in the positive direction on the Z-axis is applied to the first and second force receiving portions 43 and 44 of the deformable body 40.

At this time, as illustrated in FIG. 11(a) and FIG. 11(b), the following elastic deformation is generated in the first to fourth curved portions 45c to 48c. That is, each of the force receiving portions 43 and 44 is moved upward by the force in the positive direction on the Z-axis applied to the first and second force receiving portions 43 and 44, and thus, end portions coupled to the first and second force receiving portions 43 and 44 among the curved portions 45c to 48c are also moved upward. As a result, as illustrated in FIGS. 11(a) and 11(b), each of the detection sites A1 to A4 moves upward.

As a result, when the force +Fz in the positive direction on the Z-axis is applied to the force receiving body 20 of the basic structure 1, the separation distance between the first to fourth detection sites A1 to A4 and the upper surface of the fixed body 10 (refer to FIG. 2) all increase.

Although not illustrated, in a case where the force −Fz in the negative direction on the Z-axis is applied to the force receiving body 20 of the basic structure 1, the moving direction of each of the detection sites A1 to A4 is opposite to the above-described direction. That is, due to application of the force −Fz in the negative direction on the Z-axis, the separation distance between the first to fourth detection sites A1 to A4 and the upper surface of the fixed body 10 (refer to FIG. 2) all decrease.

<1-3. Capacitive Element Type Force Sensor>
(1-3-1. Configuration of Force Sensor)

The basic structure 1 described in detail in § 1-1 and § 1-2 can be suitably used as a capacitive element type force sensor 1c. Herein, this force sensor 1c will be described in detail below.

Figure 12:
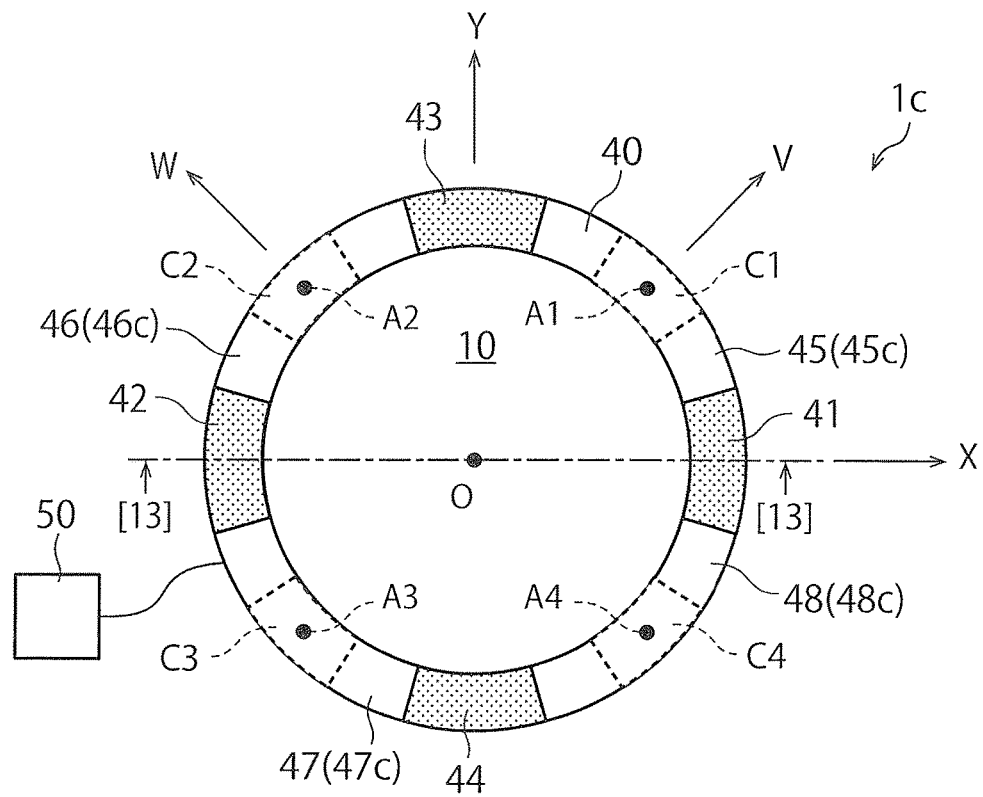
FIG. 12 is a schematic plan view illustrating a force sensor using the basic structure of FIG. 1.
Figure 13:
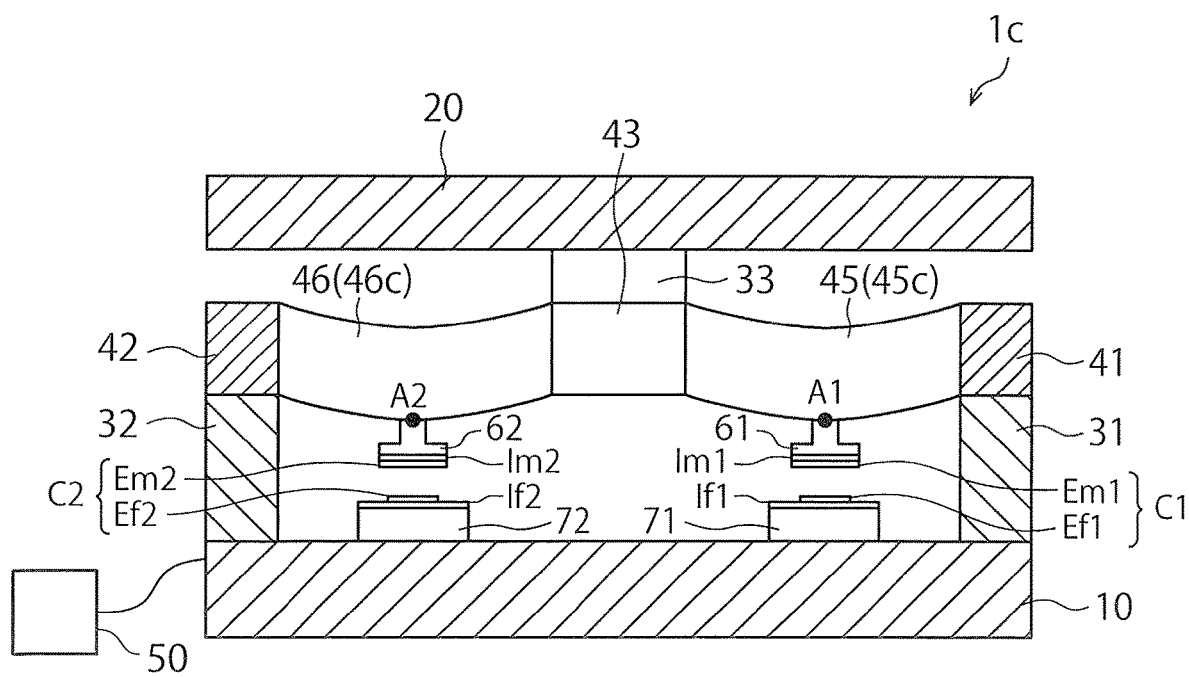
FIG. 13 is a cross-sectional view taken along line [13]-[13] in FIG. 12.

FIG. 12 is a schematic plan view illustrating the force sensor 1c using the basic structure 1 of FIG. 1, and FIG. 13 is a cross-sectional view taken along line [13]-[13] of FIG. 12. In FIG. 13, in order to clearly illustrate the deformable body 40, illustration of the force receiving body 20 is omitted.

As illustrated in FIG. 12 and FIG. 13, the force sensor 1c has a configuration in which one of capacitive element C1 to C4 is arranged in one of the detection sites A1 to A4 of the basic structure 1 of FIG. 1, respectively. Specifically, as illustrated in FIG. 13, the force sensor 1c includes a first displacement electrode Em1 arranged at the first detection site A1 and a first fixed electrode Ef1 arranged to face the first displacement electrode Em1 and configured to not move relative to the fixed body 10. These electrodes Em1 and Ef1 constitute the first capacitive element C1. Furthermore, as illustrated in FIG. 13, the force sensor 1c includes a second displacement electrode Em2 arranged at the second detection site A2 and a second fixed electrode Ef2 arranged to face the second displacement electrode Em2 and configured not to move relative to the fixed body 10. The electrodes Em2 and Ef2 constitute a second capacitive element C2.

Although not illustrated, the force sensor 1c includes a third displacement electrode Em3 arranged at the third detection site A3 and a third fixed electrode Ef3 arranged to face the third displacement electrode Em3 and configured not to move relative to the fixed body 10, and also includes a fourth displacement electrode Em4 arranged at the fourth detection site A4 and a fourth fixed electrode Ef4 arranged to face the fourth displacement electrode Em4 and configured not to move relative to the fixed body 10. The electrode Em3 and the electrode Ef3 constitute the third capacitive element C3, and the electrode Em4 and the electrode Ef4 constitute the fourth capacitive element C4.

As can be observed from FIG. 13, each of the displacement electrodes Em1 to Em4 is supported on the lower surface of each of the first to fourth deformable body-side supports 61 to 64 supported by the corresponding detection sites A1 to A4 via first to fourth displacement substrates Im1 to Im4. Furthermore, the fixed electrodes Ef1 to Ef4 are supported on the upper surfaces of the fixed body side supports 71 to 74 fixed to the upper surface of the fixed body 10 via first to fourth fixed substrates If1 to If4. Each of the displacement electrodes Em1 to Em4 has a same area, and each of the fixed electrodes Ef1 to Ef4 has a same area. However, in order to maintain a certain value of an effective facing area of each of the capacitive elements C1 to C4 by application of the one of a force and a moment, the electrode areas of the displacement electrodes Em1 to Em4 are configured to be greater than the electrode areas of the fixed electrodes Ef1 to Ef4. This point will be described in detail below. In the initial state, the effective facing area and the separation distance of each set of electrodes constituting the capacitive elements C1 to C4 are all the same.

Furthermore, as illustrated in FIGS. 12 and 13, the force sensor 1c includes a detection circuit 50 that outputs an electric signal indicating one of a force and a moment applied to the force receiving body 20 on the basis of the elastic deformation generated in each of the curved portions 45c to 48c of the deformable body 40. In FIGS. 12 and 13, illustration of the wiring for electrically connecting each of the capacitive elements C1 to C4 to the detection circuit 50 is omitted.

In a case where the fixed body 10, the force receiving body 20, and the deformable body 40 are formed of a conductive material such as a metal, the first to fourth displacement substrates Im1 to Im4 and the first to fourth fixing substrates If1 to If4 need to be formed of an insulator so as to prevent short-circuit in each of the electrodes.

(1-3-2. Variation in Electrostatic Capacitance Value of Each of Capacitive Elements when Moment Mx Around the X-Axis is Applied to Force Sensor 1c)

Figures 14, 15:
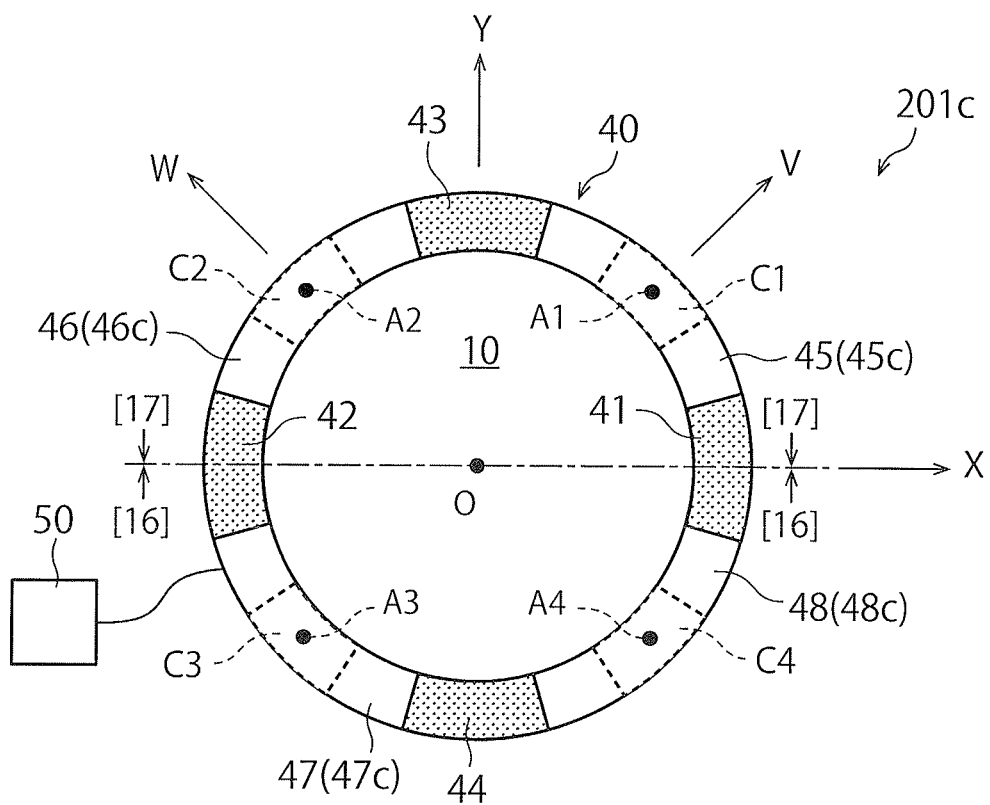
FIG. 14 is a table illustrating variations of the electrostatic capacitance values generated in each of capacitive elements when one of a force and a moment is applied to the force sensor in FIG. 12.
FIG. 15 is a schematic plan view of a force sensor according to a second embodiment of the present invention.

Next, FIG. 14 is a table illustrating variations of the electrostatic capacitance values generated in each of capacitive elements C1 to C4 when one of a force and a moment is applied to the force sensor 1c in FIG. 12.

First, when a moment +Mx around the positive X-axis is applied to the force sensor 1c according to the present embodiment, as observed from the behaviors of the detection sites A1 to A4 described in § 1-2-1, the separation distance between the electrodes constituting the first capacitive element C1 and the second capacitive element C2 both increase. Due to this, the electrostatic capacitance values of the first capacitive element C1 and the second capacitive element C2 both decrease. In contrast, the separation distance between the electrodes constituting the third capacitive element C3 and the fourth capacitive element C4 both decrease. Therefore, the electrostatic capacitance values of the third capacitive element C3 and the fourth capacitive element C4 both increase. The variation of the electrostatic capacitance value of each of the capacitive elements C1 to C4 is summarized in the column of "Mx" in FIG. 14. In this table, "+" indicates an increase in the electrostatic capacitance value, and "−" indicates a decrease in the electrostatic capacitance value. Note that when the moment −Mx around the negative X-axis is applied to the force sensor 1c, the variation of the electrostatic capacitance value of each of the capacitive elements C1 to C4 is opposite to the above-described variation (signs illustrated in the column of Mx in FIG. 14 are all reversed).

(1-3-3. Variation in Electrostatic Capacitance Value of Each of Capacitive Elements when Moment My Around the Y-Axis is Applied to Force Sensor 1c)

Next, when a moment +My around the positive Y-axis is applied to the force sensor 1c according to the present embodiment, as observed from the behaviors of the detection sites A1 to A4 described in § 1-2-2, the separation distance between the electrodes constituting the first capacitive element C1 and the fourth capacitive element C4 both decrease. Therefore, the electrostatic capacitance values of the first capacitive element C1 and the fourth capacitive element C4 both increase. In contrast, the separation distance between the electrodes constituting the second capacitive element C2 and the third capacitive element C3 both increase. Therefore, the electrostatic capacitance values of the second capacitive element C2 and the third capacitive element C3 both decrease. The variation of the electrostatic capacitance value of each of the capacitive elements C1 to C4 is summarized in the column of "My" in FIG. 14. Note that when the moment −My around the negative Y-axis is applied to the force sensor 1c, the variation of the electrostatic capacitance value of each of the capacitive elements C1 to C4 is opposite to the above-described variation (signs illustrated in the column of My in FIG. 14 are all reversed).

(1-3-4. Variation in Electrostatic Capacitance Value of Each of Capacitive Elements when Moment Mz Around the Z-Axis is Applied to Force Sensor 1c)

First, when a moment +Mz around the positive Z-axis is applied to the force sensor 1c according to the present embodiment, as observed from the behaviors of the detection sites A1 to A4 described in § 1-2-3, the separation distance between the electrodes constituting the first capacitive element C1 and the third capacitive element C3 both increase. Therefore, the electrostatic capacitance values of the first capacitive element C1 and the third capacitive element C3 both decrease. In contrast, the separation distance between the electrodes constituting the second capacitive element C2 and the fourth capacitive element C4 both decrease. Therefore, the electrostatic capacitance values of the second capacitive element C2 and the fourth capacitive element C4 both increase. The variation of the electrostatic capacitance value of each of the capacitive elements C1 to C4 is summarized in the column of "Mz" in FIG. 14. Note that when the moment −Mz about the Z-axis negative rotational direction is applied to the force sensor 1c, the variation of the electrostatic capacitance value of each of the capacitive elements C1 to C4 is opposite to the above-described variation (signs illustrated in the column of Mz in FIG. 14 are all reversed).

(1-3-5. Variation in Electrostatic Capacitance Value of Each of Capacitive Elements when Force Fz in Z-Axis Direction is Applied to Force Sensor 1c)

Next, when a force +Fz about the Z-axis positive direction is applied to the force sensor 1c according to the present embodiment, as observed from the behaviors of the detection sites A1 to A4 described in § 1-2-4, the separation distance between the electrodes constituting each of the capacitive elements C1 to C4 all increase. Therefore, the electrostatic capacitance values of the capacitive elements C1 to C4 all decrease. The variation of the electrostatic capacitance value of each of the capacitive elements C1 to C4 is summarized in the column of "Fz" in FIG. 14. Note that when the force −Fz in the negative direction on the Z-axis is applied to the force sensor 1c, the variation of the electrostatic capacitance value of each of the capacitive elements C1 to C4 is opposite to the above-described variation (signs illustrated in the column of Fz in FIG. 14 are all reversed).

(1-3-6. Calculation Method of Applied One of a Force and a Moment)

In view of the variation of the electrostatic capacitance values of the capacitive elements C1 to C4 as described above, the detection circuit 50 calculates the moments Mx, My, and Mz and the force Fz applied to the force sensor 1c using the following [Expression 1] calculate. In [Expression 1], signs C1 to C4 indicate the variation amounts in electrostatic capacitance values of the first to fourth capacitive elements C1 to C4, respectively.

$$Mx = -C1 - C2 + C3 + C4$$

$$My = C1 - C2 - C3 + C4$$

$$Mz = -C1 + C2 - C3 + C4$$

$$Fz = -(C1 + C2 + C3 + C4) \qquad \text{[Expression 1]}$$

In a case where the force or moment applied to the force sensor 1c is in the negative direction, Mx, My, Mz and Fz on the left side may be substituted by −Mx, −My, −Mz and −Fz.

With the force sensor 1c according to the present embodiment, with the simple deformable body 40 having curved portions 45c to 48c protruding in the Z-axis direction, it is possible to generate in the Z-axis direction a displacement corresponding to one of the applied force and the moment at the detection sites A1 to A4. This allows arrangement of one of the pair of electrodes constituting the capacitive elements C1 to C4 in the detection sites A1 to A4 and the other on the upper surface of the fixed body 10, for example, making it easy to configure the capacitive elements C1 to C4. Since the present embodiment adopts a simple structure as described above, it is possible to provide a capacitive type force sensor 1c less expensive than the conventional force sensor.

In the force sensor 1c, in a case where the V-axis and the W-axis passing through the origin O and forming an angle of 45° with respect to the X-axis and the Y-axis are defined on the XY plane, the four sets of capacitive elements C1 to C4 are arranged at each of the four sites overlapping with the V-axis and the W-axis when viewed in the Z-axis direction. This results in arranging the capacitive elements C1 to C4 symmetrically about the X-axis and the Y-axis, the electrostatic capacitance values of the capacitive elements C1 to C4 vary with high symmetry. This makes it possible to measure one of the applied force and the moment on the basis of the variation amount in the electrostatic capacitance values of the capacitive elements C1 to C4 very easily.

In the above description, the four capacitive elements C1 to C4 have the individual fixed substrates If1 to If4 and individual fixed electrodes Ef1 to Ef4. Alternatively, however, it is allowable in another embodiment to configure the fixed substrate to be common to the four capacitive elements and configure to provide individual fixed electrodes on the fixed substrate. Alternatively, the fixed substrate and the fixed electrode may be configured to be common to the four capacitive elements. Even with such a configuration, it is possible to measure the one of a force and a moment similarly to the above-described force sensor 1c. Note that these configurations are also applicable to each of embodiments described below.

In addition, sensitivity of the force sensor 1c to one of the applied force and the moment changes with a change in the cross-sectional shape of the deformable body 40. Specific description will be given as follows. While the sectional shape of the deformable body 40 in the present embodiment is a square (refer to FIG. 3), forming this cross-sectional shape into a vertically elongated rectangle elongated in the Z-axis direction would make each of the sensitivity toward the moment Mx around the X and Y axes, and the sensitivity to the force Fz in the My and Z-axis directions to be lower relative to the sensitivity to the moment Mz around the Z-axis. In contrast, forming the cross-sectional shape of the deformable body 40 in a horizontally elongated rectangle that is long in the radial direction of the deformable body 40 makes the sensitivity toward the moments Mx and My around the X and Y axes and the force Fz in the Z-axis direction to be higher relative to the sensitivity to the moment Mz around the Z-axis.

Alternatively, the sensitivity to one of the applied force and the moment in the force sensor 1c also changes together with the radius of curvature (degree of curvature) of the curved portions 45c to 48c. Specifically, decreasing the radius of curvature of the curved portions 45c to 48c (increasing the degree of curvature) increases the sensitivity to one of the applied force and the moment. In contrast, increasing the radius of curvature of the curved portions 45c to 48c (decreasing the degree of curvature) decreases the sensitivity to one of the applied force and the moment.

With consideration of the cross-sectional shape of the deformable body 40 and the relationship between the radius of curvature of the curved portions 45c to 48c and the sensitivity to one of a force and a moment as described above, the sensitivity of the force sensor 1c can be optimized in the application environment. The above description naturally applies to each of the embodiments described below.

<<<§ 2. Force Sensor According to Second Embodiment of the Present Invention>>>

<2-1. Configuration>

Next, a force sensor 201c according to a second embodiment of the present invention will be described.

Figure 16:
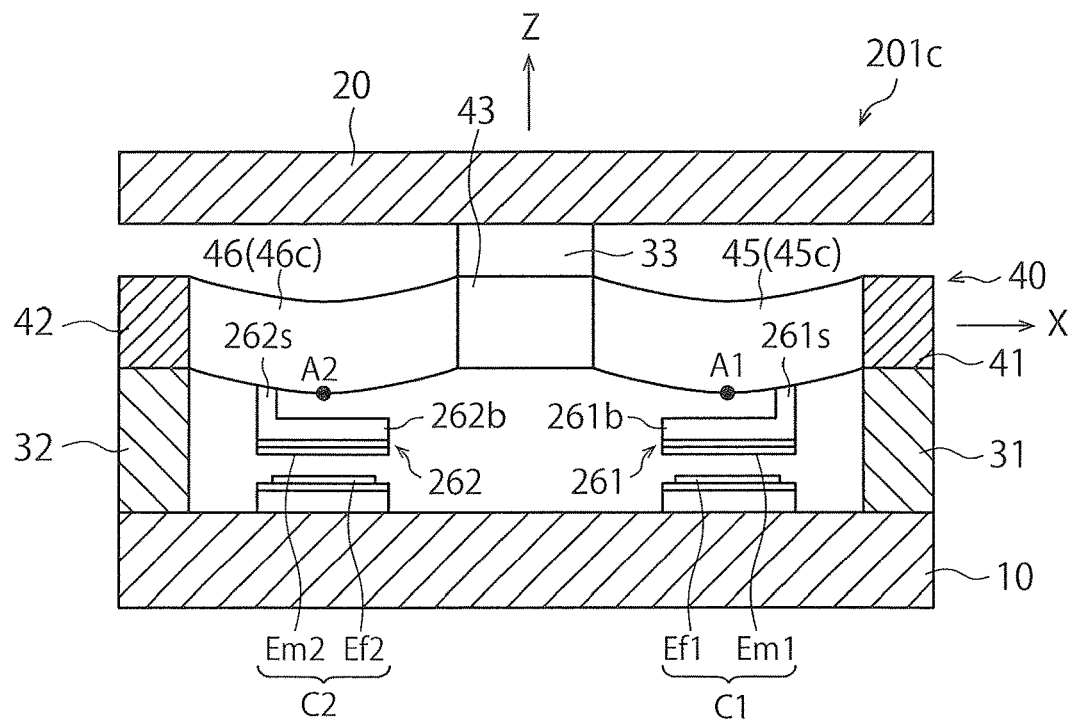
FIG. 16 is a cross-sectional view taken along line [16]-[16] in FIG. 15.
Figure 17:
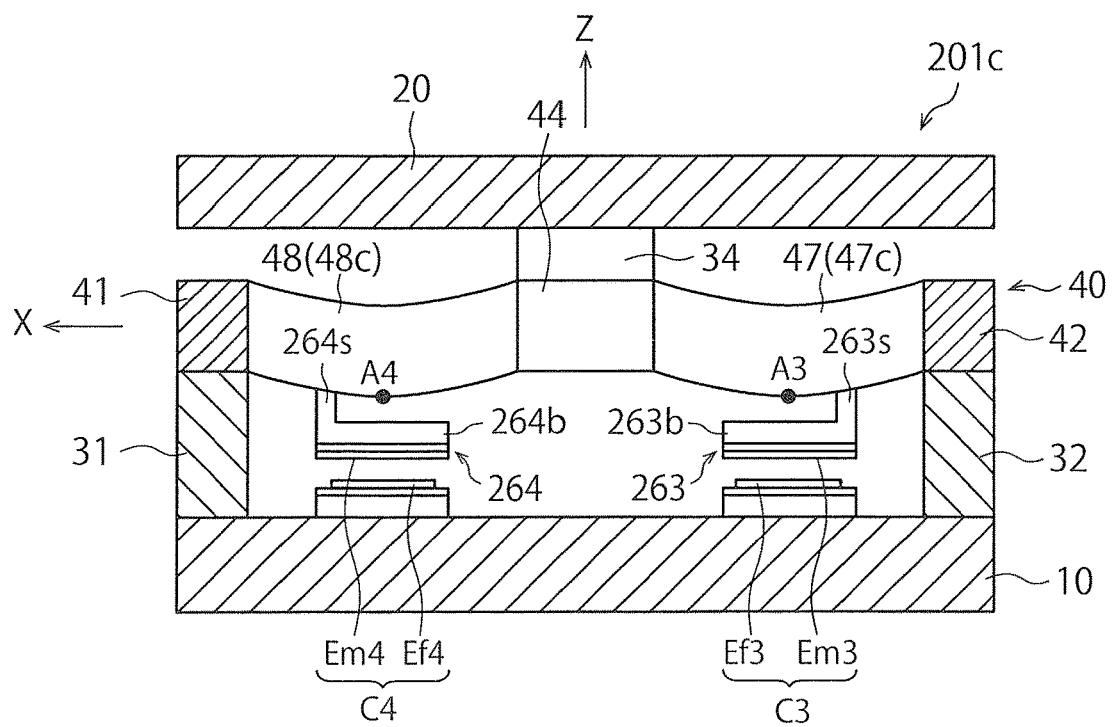
FIG. 17 is a cross-sectional view taken along line [17]-[17] in FIG. 15.

FIG. 15 is a schematic plan view of the force sensor 201c according to the second embodiment of the present invention. FIG. 16 is a cross-sectional view taken along line [16]-[16] of FIG. 15. FIG. 17 is a cross-sectional view taken along line [17]-[17] of FIG. 15. In FIG. 15, however, illustration of the force receiving body 20 is omitted for clarity of the drawing.

As illustrated in FIGS. 15 to 17, the force sensor 201c differs from the force sensor 1c according to the first embodiment in the following point. That is, in the force sensor 201c according to the present embodiment, deformable body-side supports 261 to 264 that respectively support the displacement electrodes Em1 to Em4 are connected to each of the curved portions 45c to 48c at different portions from the detection sites A1 to A4 of the curved portions 45c to 48c. Specifically, as illustrated in FIGS. 15 and 16, the first deformable body-side support 261 connected to the first curved portion 45c has a cantilever beam structure including a first beam 261b arranged so as to overlap with the first detection site A1 of the first curved portion 45c and a first connecting body 261s connecting an end portion of the first beam 261b on the first fixed portion 41 side (right side in FIG. 16) to the first curved portion 45c, when viewed in the Z-axis direction. Since the first connecting body 261s extends in parallel with the Z-axis, the connecting position between the first connecting body 261s and the first curved portion 45c is located closer to the first fixed portion 41 side than the first detection site A1. The first displacement electrode Em1 is supported on the lower surface of the first beam 261b of the cantilever beam structure via a displacement substrate.

Moreover, the second deformable body-side support 262 connected to the second curved portion 46c also has a cantilever beam structure. Specifically, as illustrated in FIGS. 15 and 16, the second deformable body-side support 262 has a cantilever beam structure including a second beam 262b arranged so as to overlap with the second detection site A2 of the second curved portion 46c and a second connecting body 262s connecting an end portion of the second beam 262b on the second fixed portion 42 side (left side in FIG. 16) to the second curved portion 46c, when viewed in the Z-axis direction. Since the second connecting body 262s extends in parallel with the Z-axis, the connecting position between the second connecting body 262s and the second curved portion 46c is located closer to the second fixed portion 42 side than the second detection site A2. The second displacement electrode Em2 is supported on the lower surface of the second beam 262b of the cantilever beam structure via a displacement substrate.

Furthermore, each of the third deformable body-side support 263 and the fourth deformable body-side support 264 also has a similar cantilever beam structure. Specifically, as illustrated in FIGS. 15 and 17, the third deformable body-side support 263 has a cantilever beam structure including a third beam 263b arranged so as to overlap with the third detection site A3 of the third curved portion 47c and a third connecting body 263s connecting an end portion of the third beam 263b on the second fixed portion 42 side (right side in FIG. 17) to the third curved portion 47c, when viewed in the Z-axis direction. Since the third connecting body 263s extends in parallel with the Z-axis, the connecting position between the third connecting body 263 and the third curved portion 47c is located closer to the second fixed portion 42 side than the third detection site A3. The third displacement electrode Em3 is supported on the lower surface of the third beam 263b via a displacement substrate.

Moreover, the fourth deformable body-side support 264 has a cantilever beam structure including a fourth beam 264b arranged so as to overlap with the fourth detection site A4 of the fourth curved portion 48c and a fourth connecting body 264s connecting an end portion of the fourth beam 264b on the first fixed portion 41 side (left side in FIG. 17) to the fourth curved portion 48c, when viewed in the Z-axis direction. Since the fourth connecting body 264s extends in parallel with the Z-axis, the connecting position between the fourth connecting body 264s and the fourth curved portion 48c is located closer to the first fixed portion 41 side than the fourth detection site A4. The fourth displacement electrode Em34 is supported on the lower surface of the fourth beam 264b via a displacement substrate.

With the above-described configuration, each of the connecting bodies 261s to 264s is connected to the curved portions 45c to 48c at a portion different from the detection sites A1 to A4, while the first to fourth displacement electrodes Em1 to Em4 are arranged so as to overlap with the corresponding detection sites A1 to A4 when viewed in the Z-axis direction.

In the examples illustrated in FIGS. 15 to 25, as described above, each of the deformable body-side supports 261 to 264 has a cantilever beam structure. Alternatively in other embodiments (not illustrated), each of the deformable body-side supports 261 to 264 may have a doubly supported beam structure in which the ends of the beams 261b to 264b are coupled to the fixed body 10 via a flexible material. The flexible material may have a linear shape or a curved shape, and may be connected to the fixed body 10 in the vicinity of a site where the Z-axis intersects the upper surface of the fixed body 10. With such a configuration, it is stabilize the behavior of the inclination of the beams 261b to 264b caused by one of the force and the moment applied to the force sensor 201c from the external vibration.

<2-2. Application>
(2-2-1. Variation of Electrostatic Capacitance Value of First Capacitive Element C1)

Variations of the electrostatic capacitance values generated in each of capacitive elements C1 to C4 when one of a force and a moment is applied to the force sensor 201c according to the present embodiment will be discussed. First, the variation of the electrostatic capacitance value of the first capacitive element C1 will be described with reference to FIGS. 18 to 21.

Figure 18:
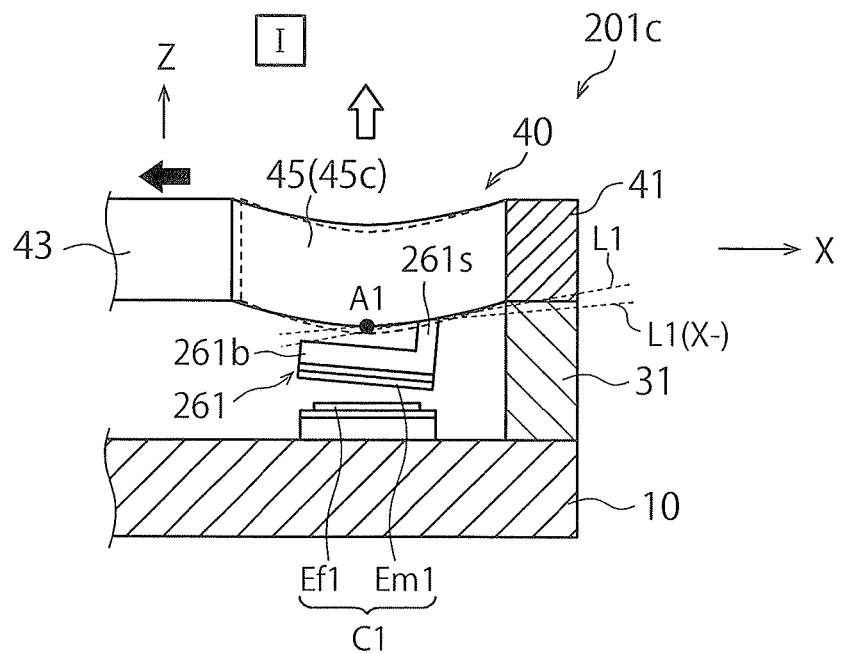
FIG. 18 is a schematic cross-sectional view illustrating a first capacitive element C1 when a force in the negative direction on the X-axis is applied to a first force receiving portion of the force sensor illustrated in FIG. 15.
Figure 19:
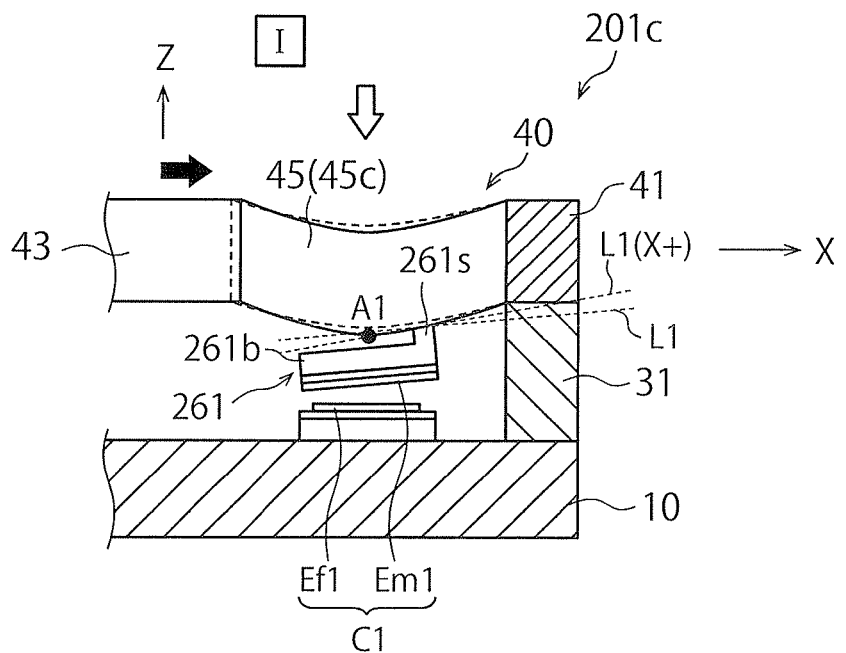
FIG. 19 is a partial schematic cross-sectional view illustrating the first capacitive element C1 when a force in the positive direction on the X-axis is applied to the first force receiving portion of the force sensor illustrated in FIG. 15.
Figure 20:
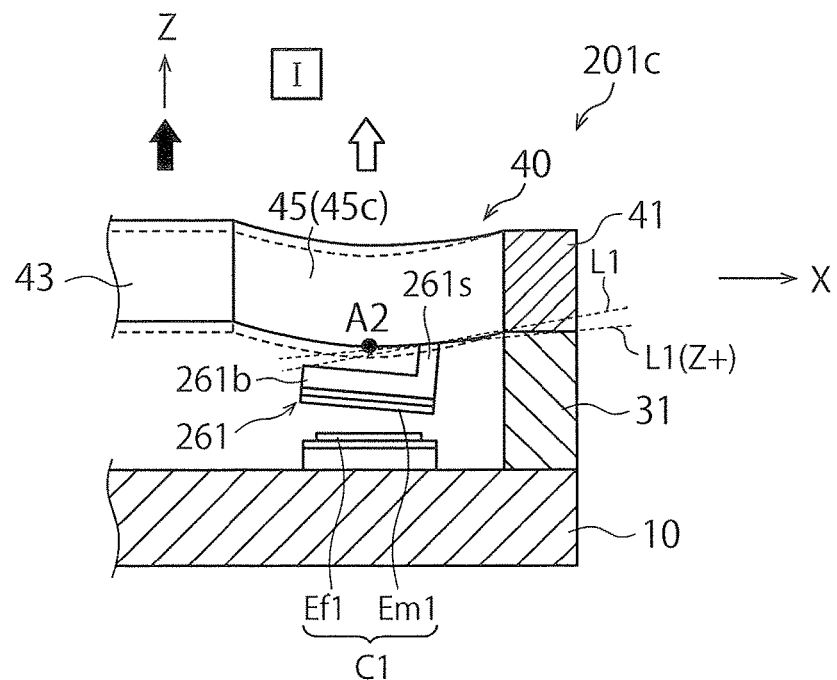
FIG. 20 is a partial schematic cross-sectional view illustrating the first capacitive element C1 when a force in the positive direction on the Z-axis is applied to the first force receiving portion of the force sensor illustrated in FIG. 15.
Figure 21:
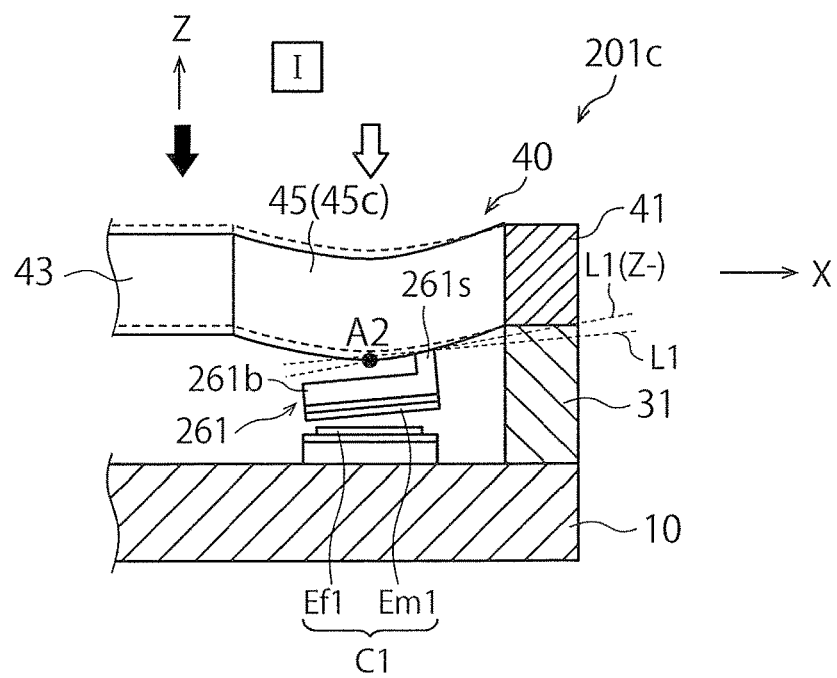
FIG. 21 is a partial schematic cross-sectional view illustrating the first capacitive element C1 when a force in the negative direction on the Z-axis is applied to the first force receiving portion of the force sensor illustrated in FIG. 15.

FIG. 18 is a schematic cross-sectional view illustrating the first capacitive element C1 when a force in the negative direction on the X-axis is applied to the first force receiving portion 43 of the force sensor illustrated in FIG. 15. FIG. 19 is a partial schematic cross-sectional view illustrating the first capacitive element C1 when the force in the positive direction on the X-axis is applied to the first force receiving portion 43 of the force sensor 201c illustrated in FIG. 15. FIG. 20 is a partial schematic cross-sectional view illustrating the first capacitive element C1 when a force in the positive direction on the Z-axis is applied to the first force receiving portion 43 of the force sensor 201c illustrated in FIG. 15. FIG. 21 is a partial schematic cross-sectional view illustrating the first capacitive element C1 when the force in the negative direction on the Z-axis is applied to the first force receiving portion 43 of the force sensor 201c illustrated in FIG. 15.

As illustrated in FIG. 18, when the force in the negative direction on the X-axis (left direction in FIG. 18) is applied to the first force receiving portion 43, the first force receiving portion 43 moves in the same direction. Along with this movement, the first curved portion 45c receives a tensile force in the X-axis direction, and thus, elastically deforms so as to increase its radius of curvature. In FIG. 18, the first curved portion 45c in an initial state is indicated by a broken line, while the first curved portion 45c in a state of elastic deformation is indicated by a solid line. As illustrated in FIG. 18, due to this elastic deformation, a tangent line L1 of the site of the first curved portion 45c to which the first connecting body 261s is connected changes to a state of lying more horizontally. In FIG. 18, the tangent line after the change is indicated by L1 (X−). Then, the first beam 261b of the first deformable body-side support 261 changes from the horizontal state to the state being upward to the left by an amount corresponding to the change in the inclination. As a result, the separation distance between the electrodes constituting the first capacitive element C1 increases. The degree of increase gradually grows from the positive side on the X-axis toward the negative side on the X-axis (from the right side to the left side in FIG. 18) (separation distance gradually increases).

In the force sensor 1c according to the first embodiment described above, the first deformable body-side support 61 is connected with the first curved portion 45c at the first detection site A1, and thus, the separation distance between the electrodes changes uniformly as much as the amount of displacement of the first detection site A1 in the Z-axis direction. However, in the example illustrated in FIG. 18, the first beam 261b is inclined upward toward the left. Accordingly, the separation distance between the electrodes increases exceeding the amount of upward displacement of the first detection site A1 particularly in the left region of the first beam 261b. In other words, since the first deformable body-side support 261 has a cantilever beam structure and the first deformable body-side support 261 is connected to the first curved portion 45c at a position different from the first detection site A1, the displacement in the Z-axis direction generated in the first detection site A1 is amplified.

With such a configuration, when a force in the negative direction of the X-axis is applied to the first force receiving portion 43, the electrostatic capacitance value of the first capacitive element C1 of the force sensor 201c according to the present embodiment decreases, with the degree of decrease being greater than that of the first capacitive element C1 of the force sensor 1c according to the first embodiment.

Next, as illustrated in FIG. 19, when a force in the positive direction on the X-axis (right direction in FIG. 19) is applied to the first force receiving portion 43, the first force receiving portion 43 moves in the same direction. Along with this movement, the first curved portion 45c receives a compressive force in the X-axis direction, and thus, elastically deforms so as to decrease its radius of curvature. In FIG. 19, the first curved portion 45c in an initial state is indicated by a broken line, while the first curved portion 45c in a state of elastic deformation is indicated by a solid line. As illustrated in FIG. 19, due to this elastic deformation, the tangent line L1 of the site of the first curved portion 45c to which the first connecting body 261s is connected changes to a state of standing more vertically. In FIG. 19, the tangent line after the change is indicated by L1 (X+). Then, the first beam 261b of the first deformable body-side support 261 changes from the horizontal state to the state being downward to the left by an amount corresponding to the change in the inclination. As a result, the separation distance between the electrodes constituting the first capacitive element C1 decreases. The degree of decrease gradually grows from the positive side on the X-axis toward the negative side on the X-axis (from the right side to the left side in FIG. 19) (separation distance gradually decreases).

In the example illustrated in FIG. 19, the first beam 261b is inclined downward toward the left. Accordingly, the separation distance between the electrodes decreases exceeding the amount of downward displacement of the first detection site A1 particularly in the left region of the first beam 261b. In other words, the displacement in the Z-axis direction generated in the first detection site A1 is amplified by the cantilever beam structure as described above.

With such a configuration, when a force in the positive direction of the X-axis is applied to the first force receiving portion 43, the electrostatic capacitance value of the first capacitive element C1 of the force sensor 201c according to the present embodiment increases, with the degree of increase being greater than that of the first capacitive element C1 of the force sensor 1c according to the first embodiment.

Next, as illustrated in FIG. 20, when a force in the positive direction on the Z-axis (upper direction in FIG. 20) is applied to the first force receiving portion 43, the first force receiving portion 43 moves in the same direction. Along with this, the region on the negative side of the X-axis connected to the first force receiving portion 43 is moved upward in the first curved portion 45c, the portion as a whole is elastically deformed so as to move upward. Note that the end portion on the positive side on the X-axis is fixed to the first fixed portion 41, and does not move. In FIG. 20, the first curved portion 45c in an initial state is indicated by a broken line, while the first curved portion 45c in a state of elastic deformation is indicated by a solid line. As illustrated in FIG. 20, due to this elastic deformation, the tangent line L1 of the site of the first curved portion 45c to which the first connecting body 261s is connected changes to a state of lying more horizontally. In FIG. 20, the tangent line after the change is indicated by L1 (Z+). Then, the first beam 261b of the first deformable body-side support 261 changes from the horizontal state to the state being upward to the left by an amount corresponding to the change in the inclination. As a result, the separation distance between the electrodes constituting the first capacitive element C1 increases. The degree of increase gradually grows from the positive side on the X-axis toward the negative side on the X-axis (from the right side to the left side in FIG. 20) (separation distance gradually increases).

In the example illustrated in FIG. 20, the first beam 261b is inclined upward toward the left. Accordingly, the separation distance between the electrodes increases exceeding the amount of upward displacement of the first detection site A1 particularly in the left side region of the first beam 261b. In other words, the displacement in the Z-axis direction generated in the first detection site A1 is amplified by the cantilever beam structure as described above.

With such a configuration, when a force in the positive direction of the Z-axis is applied to the first force receiving portion 43, the electrostatic capacitance value of the first capacitive element C1 of the force sensor 201c according to the present embodiment decreases, with the degree of decrease being greater than that of the first capacitive element C1 of the force sensor 1c according to the first embodiment.

Next, as illustrated in FIG. 21, when a force in the negative direction on the Z-axis (lower direction in FIG. 21) is applied to the first force receiving portion 43, the first force receiving portion 43 moves in the same direction. Along with this, the region of the negative side of the X-axis connected to the first force receiving portion 43 is moved downward in the first curved portion 45c, the portion as a whole is elastically deformed so as to move downward. Note that the end portion on the positive side on the X-axis is fixed to the first fixed portion 41, and does not move. In FIG. 21, the first curved portion 45c in an initial state is indicated by a broken line, while the first curved portion 45c in a state of elastic deformation is indicated by a solid line. As illustrated in FIG. 21, due to this elastic deformation, the tangent line L1 of the site of the first curved portion 45c to which the first connecting body 261s is connected changes to a state of standing more vertically. In FIG. 21, the tangential line after the change is indicated by L1 (Z−). As can be observed from the change in the inclination of the tangent line L1, the first beam 261b of the first deformable body-side support 261 changes from the horizontal state to the state being downward to the left by an amount corresponding to the change in the inclination. As a result, the separation distance between the electrodes constituting the first capacitive element C1 decreases. The degree of decrease gradually grows from the positive side on the X-axis toward the negative side on the X-axis (from the right side to the left side in FIG. 21) (separation distance gradually decreases).

In the example illustrated in FIG. 21, the first beam 261b is inclined downward toward the left. Accordingly, the separation distance between the electrodes decreases exceeding the amount of downward displacement of the first detection site A1 particularly in the left end region of the first beam 261b. In other words, the displacement in the Z-axis direction generated in the first detection site A1 is amplified by the cantilever beam structure as described above.

With such a configuration, when a force in the negative direction on the Z-axis is applied to the first force receiving portion 43, the electrostatic capacitance value of the first capacitive element C1 of the force sensor 201c according to the present embodiment increases, with the degree of increase being greater than that of the first capacitive element C1 of the force sensor 1c according to the first embodiment.

(2-2-2. Variation of Electrostatic Capacitance Value of Second Capacitive Element C2)

Next, the variation of the electrostatic capacitance value of the second capacitive element C2 will be described with reference to FIGS. 22 to 25.

Figure 22:
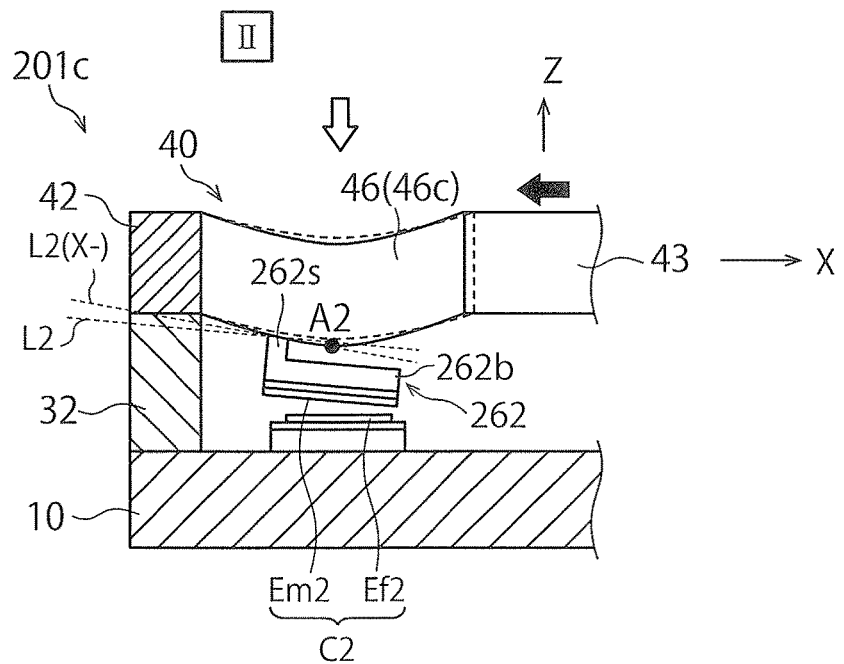
FIG. 22 is a partial schematic cross-sectional view illustrating a second capacitive element C2 when a force in the negative direction on the X-axis is applied to the first force receiving portion of the force sensor illustrated in FIG. 15.
Figure 23:
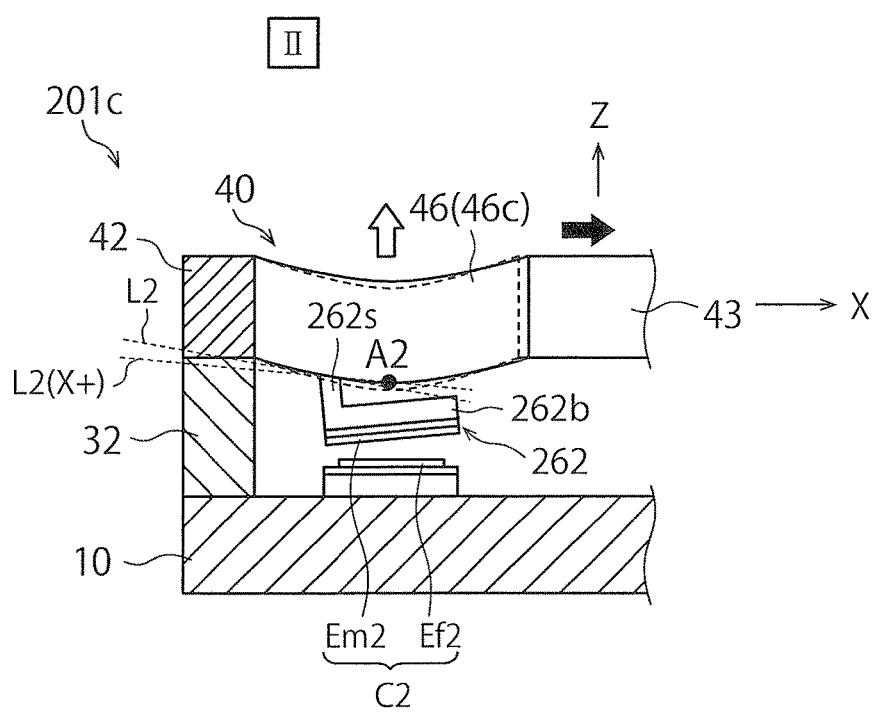
FIG. 23 is a partial schematic cross-sectional view illustrating the second capacitive element C2 when a force in the positive direction on the X-axis is applied to the first force receiving portion of the force sensor illustrated in FIG. 15.
Figure 24:
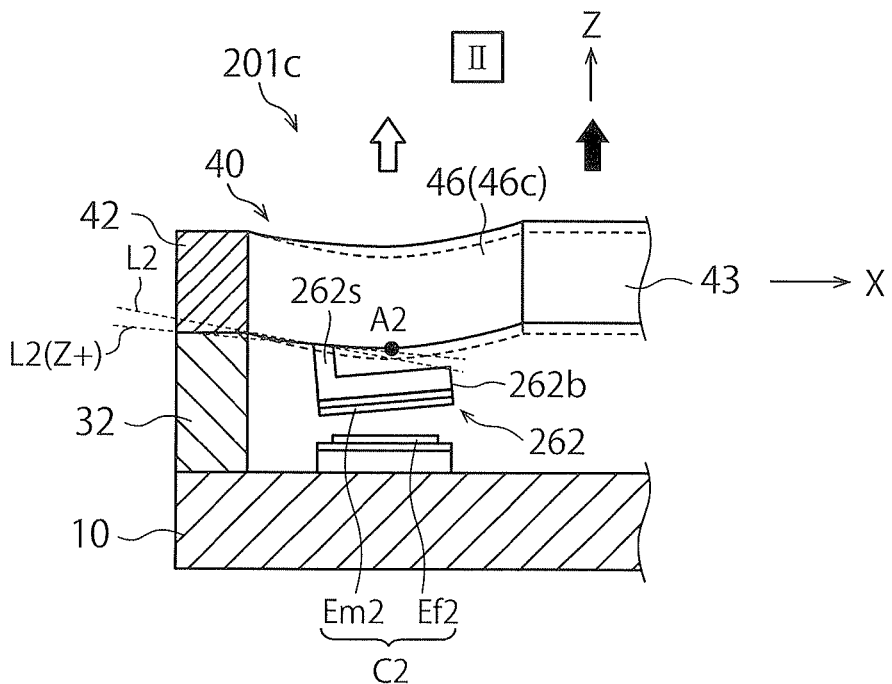
FIG. 24 is a partial schematic cross-sectional view illustrating the second capacitive element C2 when a force in the positive direction on the Z-axis is applied to the first force receiving portion of the force sensor illustrated in FIG. 15.
Figure 25:
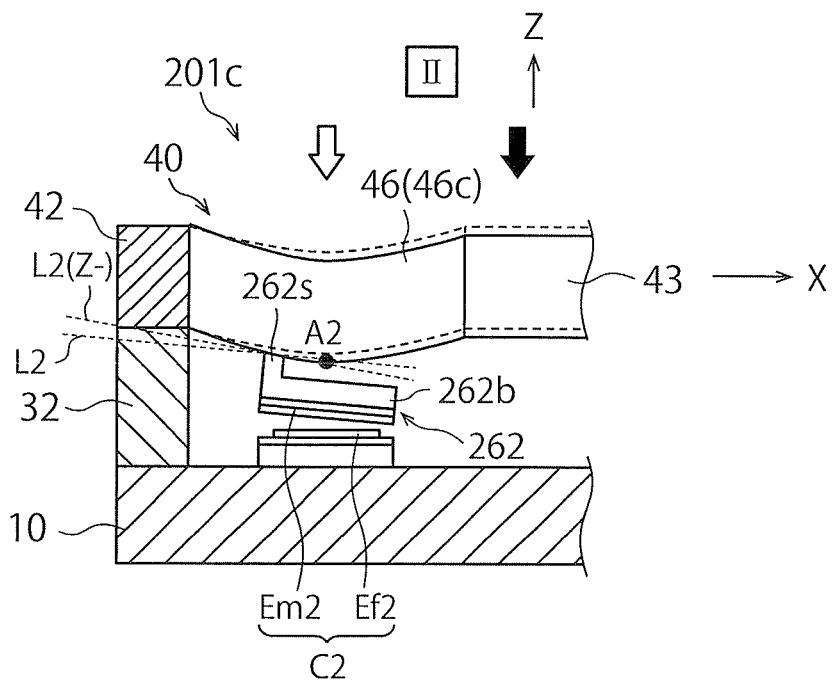
FIG. 25 is a partial schematic cross-sectional view illustrating the second capacitive element C2 when a force in the negative direction on the Z-axis is applied to the first force receiving portion of the force sensor illustrated in FIG. 15.

FIG. 22 is a partial schematic cross-sectional view illustrating the second capacitive element C2 when a force in the negative direction on the X-axis is applied to the first force receiving portion 43 of the force sensor 201c illustrated in FIG. 15. FIG. 23 is a partial schematic cross-sectional view illustrating the second capacitive element C2 when the force in the positive direction on the X-axis is applied to the first force receiving portion 43 of the force sensor 201c illustrated in FIG. 15. FIG. 24 is a partial schematic cross-sectional view illustrating the second capacitive element C2 when a force in the positive direction on the Z-axis is applied to the first force receiving portion 43 of the force sensor 201c illustrated in FIG. 15. FIG. 25 is a partial schematic cross-sectional view illustrating the second capacitive element C2 when the force in the negative direction on the Z-axis is applied to the first force receiving portion of the force sensor 201c illustrated in FIG. 15.

As illustrated in FIG. 22, when the force in the negative direction on the X-axis (left direction in FIG. 22) is applied to the first force receiving portion 43, the first force receiving portion 43 moves in the same direction. Along with this movement, the second curved portion 46c receives a compressive force in the X-axis direction, and thus, elastically deforms so as to decrease its radius of curvature. In FIG. 22, the second curved portion 46c in an initial state is indicated by a broken line, and the second curved portion 46c in a state of elastic deformation is indicated by a solid line. As illustrated in FIG. 22, due to this elastic deformation, a tangent line L2 of the site of the second curved portion 46c to which the second connecting body 262s is connected changes to a state of standing more vertically. In FIG. 22, the tangent line after the change is indicated by L2 (X−). Then, the second beam 262b of the second deformable body-side support 262 changes from the horizontal state to the state being downward to the right by an amount corresponding to the change in the inclination. As a result, the separation distance between the electrodes constituting the second capacitive element C2 decreases. The degree of decrease gradually grows from the negative side on the X-axis toward the positive side on the X-axis (from the left side to the right side in FIG. 22) (separation distance gradually decreases).

In the force sensor 1c according to the first embodiment described above, the second deformable body-side support 62 is connected with the second curved portion 46c at the second detection site A2 of the second curved portion 46c, and thus, the separation distance between the electrodes changes uniformly as much as the amount of displacement of the second detection site A2 in the Z-axis direction. In the example illustrated in FIG. 22, however, the second beam 262b is inclined downward to the right. Accordingly, the separation distance between the electrodes decreases exceeding the amount of downward displacement of the second detection site A2 particularly in the right side region of the second beam 262b. In other words, since the second deformable body-side support 262 has a cantilever beam structure and the second deformable body-side support 262 is connected to the second curved portion 46c at a position different from the second detection site A2, the displacement in the Z-axis direction generated in the second detection site A2 is amplified.

With such a configuration, when a force in the negative direction of the X-axis is applied to the first force receiving portion 43, the electrostatic capacitance value of the second capacitive element C2 of the force sensor 201c according to the present embodiment increases, with the degree of increase being greater than that of the second capacitive element C2 of the force sensor 1c according to the first embodiment.

Next, as illustrated in FIG. 23, when a force in the positive direction on the X-axis (right direction in FIG. 23) is applied to the first force receiving portion 43, the first force receiving portion 43 moves in the same direction. Along with this movement, the second curved portion 46c receives a tensile force in the X-axis direction, and thus, elastically deforms so as to increase its radius of curvature. In FIG. 23, the second curved portion 46c in an initial state is indicated by a broken line, and the second curved portion 46c in a state of elastic deformation is indicated by a solid line. As illustrated in FIG. 23, due to this elastic deformation, the tangent line L2 of the site of the second curved portion 46c to which the second connecting body 262s is connected changes to a state of lying more horizontally. The tangent line after the change is indicated by L2 (X+). Then, the second beam 262b of the second deformable body-side support 262 changes from the horizontal state to the state being upward to the right by an amount corresponding to the change in the inclination. As a result, the separation distance between the electrodes constituting the second capacitive element C2 increases. The degree of increase gradually grows from the negative side on the X-axis toward the positive side on the X-axis (from the left side to the right side in FIG. 23) (separation distance gradually increases).

In the example illustrated in FIG. 23, the second beam 262b is inclined upward to the right. Accordingly, the separation distance between the electrodes increases exceeding the amount of upward displacement of the second detection site A2 particularly in the right region of the second beam 262b. In other words, the displacement in the Z-axis direction generated in the second detection site A2 is amplified by the cantilever beam structure as described above.

With such a configuration, when a force in the positive direction of the X-axis is applied to the first force receiving portion 43, the electrostatic capacitance value of the second capacitive element C2 of the force sensor 201c according to the present embodiment decreases, with the degree of decrease being greater than that of the second capacitive element C2 of the force sensor 1c according to the first embodiment.

Next, as illustrated in FIG. 24, when a force in the positive direction on the Z-axis (upper direction in FIG. 24) is applied to the first force receiving portion 43, the first force receiving portion 43 moves in the same direction. Along with this, the end portion on the positive side on the X-axis connected to the first force receiving portion 43 is moved upward in the second curved portion 46c, the portion as a whole is elastically deformed so as to move upward. However, since the end portion on the negative side on the X-axis is fixed to the second fixed portion 42, and does not move. In FIG. 24, the second curved portion 46c in an initial state is indicated by a broken line, and the second curved portion 46c in a state of elastic deformation is indicated by a solid line. As illustrated in FIG. 24, due to this elastic deformation, the tangent line L2 of the site of the second curved portion 46c to which the second connecting body 262s is connected changes to a state of lying more horizontally. The tangent line after the change is indicated by L2 (Z+). Then, the second beam 262b of the second deformable body-side support 262 changes from the horizontal state to the state being upward to the right by an amount corresponding to the change in the inclination. As a result, the separation distance between the electrodes constituting the second capacitive element C2 increases. The degree of increase gradually grows from the negative side on the X-axis toward the positive side on the X-axis (from the left side to the right side in FIG. 24) (separation distance gradually increases).

In the example illustrated in FIG. 23, the second beam 262b is inclined upward to the right. Accordingly, the separation distance between the electrodes increases exceeding the amount of upward displacement of the second detection site A2 particularly in the right region of the second beam 262b. In other words, the displacement in the Z-axis direction generated in the second detection site A2 is amplified by the cantilever beam structure as described above.

With such a configuration, when a force in the positive direction of the Z-axis is applied to the first force receiving portion 43, the electrostatic capacitance value of the second capacitive element C2 of the force sensor 201c according to the present embodiment decreases, with the degree of decrease being greater than that of the second capacitive element C2 of the force sensor 1c according to the first embodiment.

Next, as illustrated in FIG. 25, when a force in the negative direction on the Z-axis (lower direction in FIG. 25) is applied to the first force receiving portion 43, the first force receiving portion 43 moves in the same direction. Along with this, the end portion on the positive side on the X-axis connected to the first force receiving portion 43 is moved downward in the second curved portion 46c, the portion as a whole is elastically deformed so as to move downward. However, since the end portion on the negative side on the X-axis is fixed to the second fixed portion 42, and does not move. In FIG. 25, the second curved portion 46c in an initial state is indicated by a broken line, and the second curved portion 46c in a state of elastic deformation is indicated by a solid line. As illustrated in FIG. 25, due to this elastic deformation, the tangent line L2 of the site of the second curved portion 46c to which the second connecting body 262s is connected changes to a state of standing more vertically. The tangent line after the change is indicated by L2 (Z−). Then, the second beam 262b of the second deformable body-side support 262 changes from the horizontal state to the state being downward to the right by an amount corresponding to the change in the inclination. As a result, the separation distance between the electrodes constituting the second capacitive element C2 decreases. The degree of decrease gradually grows from the negative side on the X-axis toward the positive side on the X-axis (from the left side to the right side in FIG. 25) (separation distance gradually decreases).

In the example illustrated in FIG. 25, the second beam 262b is inclined downward toward the right. Accordingly, the separation distance between the electrodes decreases exceeding the amount of downward displacement of the second detection site A2 particularly in the right region of the second beam 262b. In other words, the displacement in the Z-axis direction generated in the second detection site A2 is amplified by the cantilever beam structure as described above.

With such a configuration, when a force in the negative direction on the Z-axis is applied to the first force receiving portion 43, the electrostatic capacitance value of the second capacitive element C2 of the force sensor 201c according to the present embodiment increases, with the degree of increase being greater than that of the second capacitive element C2 of the force sensor 1c according to the first embodiment.

(2-2-3. Variation in Electrostatic Capacitance Value of Third Capacitive Element C3 and Fourth Capacitive Element C4)

In the force sensor 201c according to the present embodiment, a portion in the positive Y-coordinate (refer to FIG. 16) and a portion in the negative Y-coordinate (refer to FIG. 17) have a symmetrical structure. For this reason, the variation of the electrostatic capacitance values of the third capacitive element C3 and the fourth capacitive element C4 can be derived analogically as follows on the basis of the explanation of § 2-2-1 and § 2-2-2.

That is, although not illustrated, when the third curved portion 47c and the fourth curved portion 48c are compressed in the X-axis direction, and when the end portions of the third curved portion 47c and the fourth curved portion 48c, connected to the second force receiving portion 44, is moved in the negative direction on the Z-axis, the electrostatic capacitance values of the capacitive elements C3 and C4 increase. In contrast, when the third curved portion 47c and the fourth curved portion 48c are pulled in the X-axis direction, and when the end portion of the third curved portion 47c and the fourth curved portion 48c connected to the second force receiving portion 44 is moved in the positive direction on the Z-axis, the electrostatic capacitance values of the capacitive elements C3 and C4 decrease.

When elastic deformation is generated in one or both of the third curved portion 47c the fourth curved portion 48c, one or both of the third and the fourth beams 263b, 264b is/are inclined as described above. Accordingly, variations of the electrostatic capacitance values in the third capacitive element C3 and the fourth capacitive element C4 become greater than that of the third capacitive element C3 and the fourth capacitive element C4 of the force sensor 1c according to the first embodiment.

Consequently, in the force sensor 201c according to the present embodiment, the variation of the electrostatic capacitance value generated in each of the capacitive elements C1 to C4 due to the one of a force and a moment applied to the force receiving body 20 is as illustrated in FIG. 14, and the variation amount is greater than the variation amount in the force sensor 1c according to the first embodiment. In other words, the force sensor 201c according to the present embodiment has higher sensitivity than the force sensor 1c according to the first embodiment.

According to the present embodiment as described above, the beams 261b to 264b are connected to the curved portions 45c to 48c at positions different from the corresponding detection sites A1 to A4. Accordingly, the displacement generated in the displacement electrodes Em1 to Em4 supported by the beams 261b to 264b is amplified. That is, the displacement generated in the displacement electrodes Em1 to Em4 in a case where one of a force and a moment of a certain magnitude is applied is greater than the displacement generated in the displacement electrodes Em1 to Em4 in the force sensor 1c according to the first embodiment in which the displacement electrodes Em1 to Em4 are supported at the detection sites A1 to A4 of the curved portions 45c to 48c, respectively. This makes it possible to perform measurement with higher sensitivity to one of the applied force and the moment and with higher accuracy.

<<<§ 3. Force Sensor According to Third Embodiment of the Present Invention>>>

<3-1. Configuration>

Next, a force sensor 301c according to a third embodiment of the present invention will be described.

Figure 26:
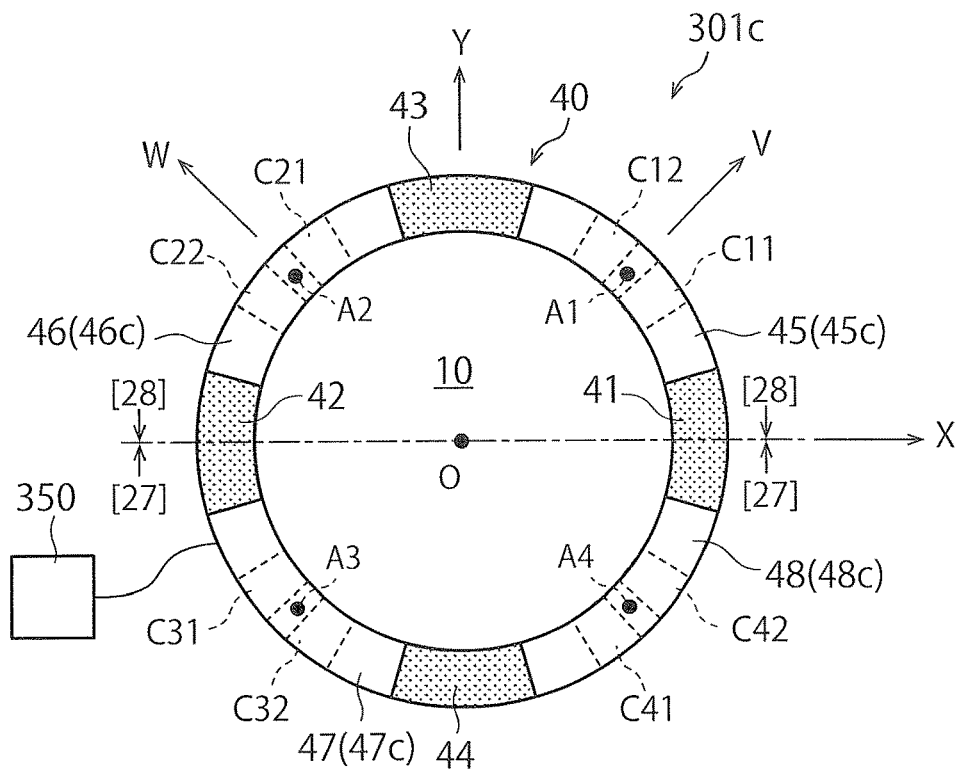
FIG. 26 is a schematic plan view of a force sensor according to a third embodiment of the present invention.
Figure 27:
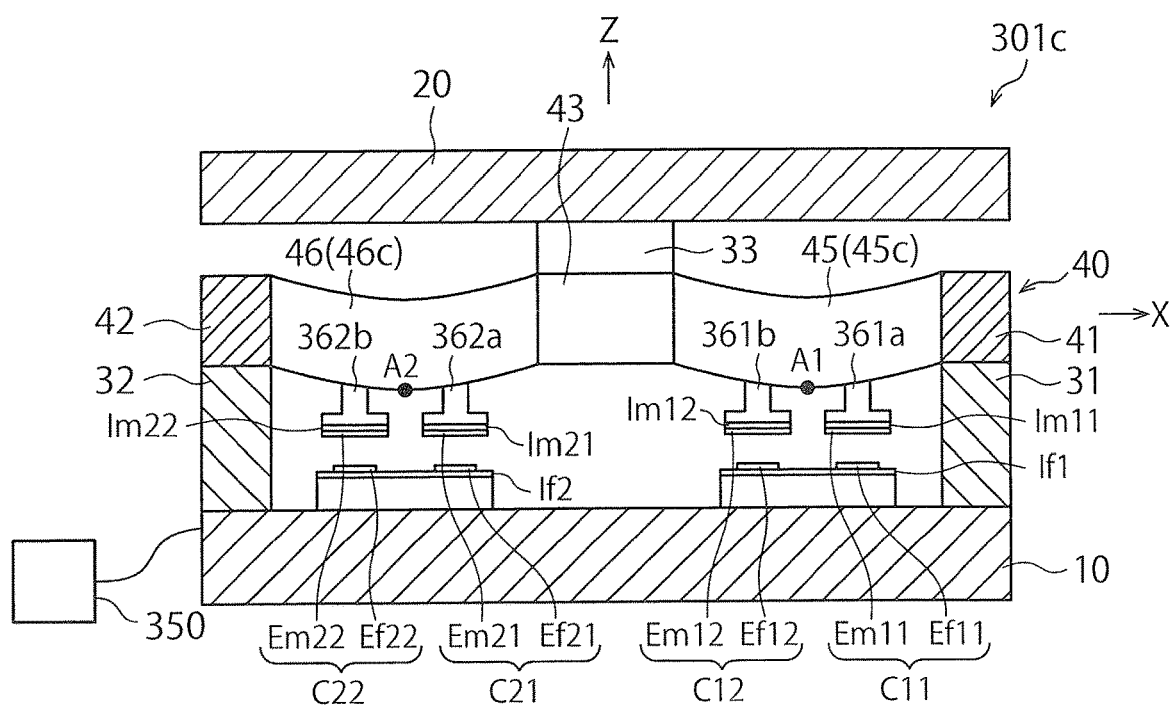
FIG. 27 is a cross-sectional view taken along line [27]-[27] in FIG. 26.
Figures 28, 29:
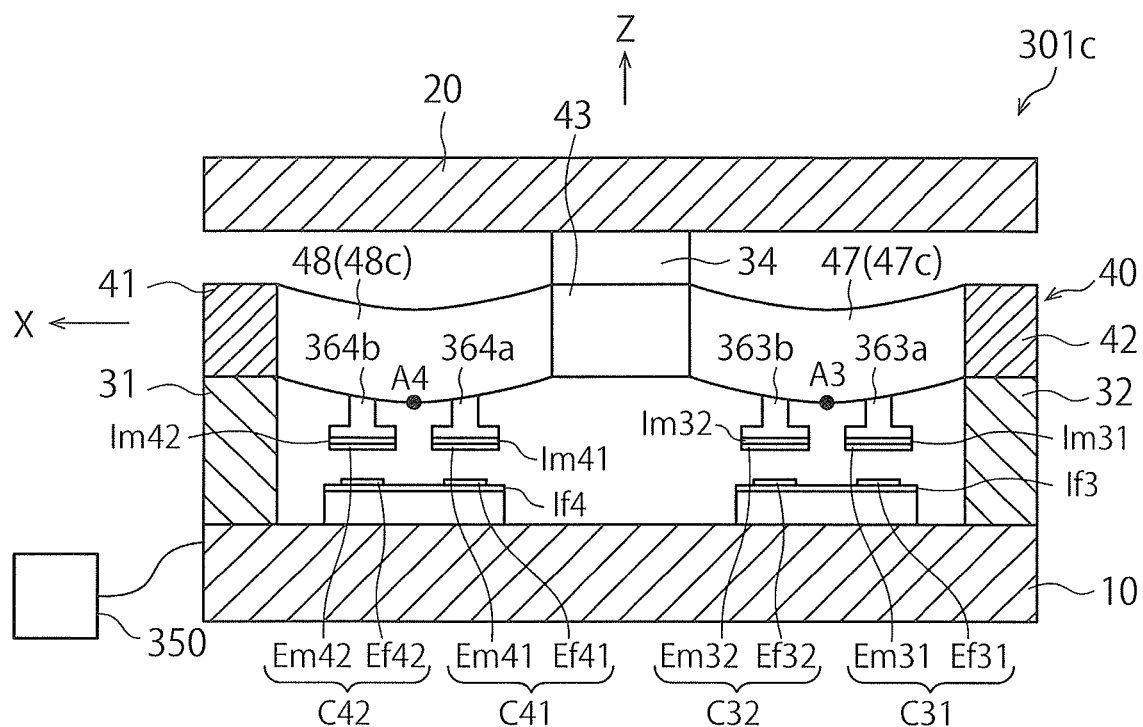
FIG. 28 is a cross-sectional view taken along line [28]-[28] in FIG. 26.
FIG. 29 is a table illustrating variations of the electrostatic capacitance values generated in each of capacitive elements when one of a force and a moment is applied to the force sensor in FIG. 26.

FIG. 26 is a schematic plan view of the force sensor 301c according to the third embodiment. FIG. 27 is a cross-sectional view taken along line [27]-[27] of FIG. 26. FIG. 28 is a cross-sectional view taken along line [28]-[28] of FIG. 26. In FIG. 26, however, illustration of the force receiving body 20 is omitted for clarity of the drawing.

As illustrated in FIGS. 26 to 28, the force sensor 301c is different from the force sensor 1c and 201c according to the first and second embodiments in that the two capacitive elements are provided in the curved portions 45c to 48c. Specifically, as illustrated in FIGS. 26 and 27, two capacitive elements C11 and C12 are arranged on the lower surface of the first curved portion 45c, along the circumferential direction of the deformable body 40 across the first detection site A1. Similarly, two capacitive elements C21 and C22 are arranged on the lower surface of the second curved portion 46c, along the circumferential direction of the deformable body 40 across the second detection site A2. As illustrated in FIGS. 26 and 28, two capacitive elements C31 and C32 are arranged on the lower surface of the third curved portion 47c, along the circumferential direction of the deformable body 40 across the third detection site A3, and two capacitive elements C41 and C42 are arranged on the lower surface of the fourth curved portion 48c, along the circumferential direction of the deformable body 40 across the fourth detection site A4.

In the illustrated example, the 1-1 capacitive element C11, the 1-2 capacitive element C12, the 2-1 capacitive element C21, the 2-2 capacitive element C22, the 3-1 capacitive element C31, the 3-2 capacitive element C32, the 4-1 capacitive element C41, and the 4-2 capacitive element C42 are arranged counterclockwise (leftward rotation) along the circumferential direction of the deformable body 40 in this order viewed in the positive direction on the Z-axis (as viewed from above). As illustrated in FIGS. 27 and 28, the capacitive elements C11 to C42 disposed two in each of the curved portions 45c to 48c are arranged at equal intervals from the corresponding detection sites A1 to A4.

The configuration of each of the capacitive elements C11 to C42 is the similar to the configuration of the capacitive elements C1 to C4 adopted in the force sensor 1c according to the first embodiment. That is, as illustrated in FIG. 27, the 1-1 capacitive element C11 is formed with a 1-1 displacement electrode Em11 supported by the first curved portion 45c and with a 1-1 fixed electrode Ef11 arranged at a position facing the 1-1 displacement electrode Em11. The 1-1 displacement electrode Em11 is supported on the lower surface of the 1-1 deformable body-side support 361a connected to the first curved portion 45c via a 1-1 displacement substrate Im11. The 1-1 fixed electrode Ef11 is supported on the first fixed body-side support 371 fixed to the upper surface of the fixed body 10, via the first fixed substrate If1.

Furthermore, as illustrated in FIG. 27, the 1-2 capacitive element C12 is formed with a 1-2 displacement electrode Em12 supported by the first curved portion 45c and with a 1-2 fixed electrode Ef12 arranged at a position facing the 1-2 displacement electrode Em12. The 1-2 displacement electrode Em12 is supported on the lower surface of the 1-2 deformable body-side support 361b connected to the first curved portion 45c via a 1-2 displacement substrate Im12. Similarly to the 1-1 fixed electrode Ef11, the 1-2 fixed electrode Ef12 is supported on the first fixed body-side support 371 fixed to the upper surface of the fixed body 10, via the first fixed substrate If1. That is, the first fixed body-side support 371 and the first fixed substrate If1 are components common to the 1-1 capacitive element C11 and the 1-2 capacitive element C12.

As illustrated in FIG. 27, the 2-1 capacitive element C21 is formed with a 2-1 displacement electrode Em21 supported by the second curved portion 46c and with a 2-1 fixed electrode Ef21 arranged at a position facing the 2-1 displacement electrode Em21. The 2-1 displacement electrode Em21 is supported on the lower surface of the 2-1 deformable body-side support 362a connected to the second curved portion 46c via a 2-1 displacement substrate Im21. The 2-1 fixed electrode Ef21 is supported on the second fixed body-side support 372 fixed to the upper surface of the fixed body 10, via the second fixed substrate If2.

Furthermore, as illustrated in FIG. 27, the 2-2 capacitive element C22 is formed with a 2-2 displacement electrode Em22 supported by the second curved portion 46c and with a 2-2 fixed electrode Ef22 arranged at a position facing the 2-2 displacement electrode Em22. The 2-2 displacement electrode Em22 is supported on the lower surface of the 2-2 deformable body-side support 362b connected to the second curved portion 46c via a 2-2 displacement substrate Im22.

Similarly to the 2-1 fixed electrode Ef21, the 2-2 fixed electrode Ef22 is supported on the second fixed body-side support 372 fixed to the upper surface of the fixed body 10, via the second fixed substrate If2. That is, the second fixed body-side support 372 and the second fixed substrate If2 are components common to the 2-1 capacitive element C21 and the 2-2 capacitive element C22.

As illustrated in FIG. 28, the 3-1 capacitive element C31 is formed with a 3-1 displacement electrode Em31 supported by the third curved portion 47c and with a 3-1 fixed electrode Ef31 arranged at a position facing the 3-1 displacement electrode Em31. The 3-1 displacement electrode Em31 is supported on the lower surface of the 3-1 deformable body-side support 363a connected to the third curved portion 47c via a 3-1 displacement substrate Im31. The 3-1 fixed electrode Ef31 is supported on the third fixed body-side support 373 fixed to the upper surface of the fixed body 10, via the third fixed substrate If3.

Furthermore, as illustrated in FIG. 28, the 3-2 capacitive element C32 is formed with a 3-2 displacement electrode Em32 supported by the third curved portion 47c and with a 3-2 fixed electrode Ef32 arranged at a position facing the 3-2 displacement electrode Em32. The 3-2 displacement electrode Em32 is supported on the lower surface of the 3-2 deformable body-side support 363b connected to the third curved portion 47c via a 3-2 displacement substrate Im32. Similarly to the 3-1 fixed electrode Ef31, the 3-2 fixed electrode Ef32 is supported on the third fixed body-side support 373 fixed to the upper surface of the fixed body 10, via the third fixed substrate If3. That is, the third fixed body-side support 373 and the third fixed substrate If3 are components common to the 3-1 capacitive element C31 and the 3-2 capacitive element C32.

Furthermore, as illustrated in FIG. 28, the 4-1 capacitive element C41 is formed with a 4-1 displacement electrode Em41 supported by the fourth curved portion 48c and with a 4-1 fixed electrode Ef41 arranged at a position facing the 4-1 displacement electrode Em41. The 4-1 displacement electrode Em41 is supported on the lower surface of the 4-1 deformable body-side support 364a connected to the fourth curved portion 48c via a 4-1 displacement substrate Im41. The 4-1 fixed electrode Ef41 is supported on the third fixed body-side support 373 fixed to the upper surface of the fixed body 10 via the fourth fixed substrate If4.

Moreover, as illustrated in FIG. 28, the 4-2 capacitive element C42 is formed with a 4-2 displacement electrode Em42 supported by the fourth curved portion 48c and with a 4-2 fixed electrode Ef42 arranged at a position facing the 4-2 displacement electrode Em42. The 4-2 displacement electrode Em42 is supported on the lower surface of the 4-2 deformable body-side support 364b connected to the fourth curved portion 48c via a 4-2 displacement substrate Im42. Similarly to the 4-1 fixed electrode Ef41, the 4-2 fixed electrode Ef42 is supported on the fourth fixed body-side support 374 fixed to the upper surface of the fixed body 10, via the fourth fixed substrate If4. That is, the fourth fixed body-side support 374 and the fourth fixed substrate If4 are components common to the 4-1 capacitive element C41 and the 4-2 capacitive element C42. Since other configurations are substantially similar to the configuration of the force sensor 1c according to the first embodiment, corresponding components are denoted by the similar reference numerals in the drawings, and a detailed description thereof will be omitted.

Note that each of the 1-1 to 2-4 capacitive elements C11 to C24 has a same effective facing areas of the displacement electrodes Em11 to Em24 and the fixed electrodes Ef11 to Ef24 constituting the capacitive elements C11 to C24, and a equalized separation distance between the electrodes.

<3-2. Application>

Next, FIG. 29 is a table illustrating variations of the electrostatic capacitance values generated in each of capacitive elements C11 to C24 when one of a force and a moment is applied to the force sensor 301c in FIG. 26. In this table, "+" indicates an increase in the electrostatic capacitance value of the capacitive element, and "−" indicates a decrease in the electrostatic capacitance value of the capacitive element.

When one of a force and a moment is applied to the force sensor 301c according to the present embodiment, the curved portions 45c to 48c are elastically deformed as described with reference to FIGS. 3 to 9 in accordance with one of the applied force and the moment. Due to this elastic deformation, the electrostatic capacitance values of the capacitive elements C11 to C42 vary as illustrated in FIG. 29. That is, the 1-1 capacitive element C11 and the 1-2 capacitive element C12 behave similarly to the first capacitive element C1 of the force sensor 1c according to the first embodiment (refer to column of C1 in FIG. 14). In addition, the 2-1 capacitive element C21 and the 2-2 capacitive element C22 behave similarly to the second capacitive element C2 of the force sensor 1c according to the first embodiment (refer to column of C2 in FIG. 14). The 3-1 capacitive element C31 and the 3-2 capacitive element C32 behave similarly to the third capacitive element C3 of the force sensor 1c according to the first embodiment (refer to column of C3 in FIG. 14). The 4-1 capacitive element C41 and the 4-2 capacitive element C42 behave similarly to the fourth capacitive element C4 of the force sensor 1c according to the first embodiment (refer to column of C4 in FIG. 14).

In view of the table illustrated in FIG. 29, the detection circuit 250 calculates the moments Mx, My, Mz and the force Fz applied to the force sensor 301c on the basis of the following [Expression 2]. In the individual expressions described in this description, the symbols C11 to C24 indicate the variation amounts of the electrostatic capacitance values of the 1-1 to 2-4 capacitive elements C11 to C24, respectively. Moreover, the symbols at the ends of Mx, My, Mz and Fz are provided to distinguish between the one of a force and a moment measured using [Expression 2] and the one of a force and a moment measured using [Expression 3] described below.

$$Mx1=-C11-C21+C31+C41$$

$$My1=C11-C21-C31+C41$$

$$Mz1=-C11+C21-C31+C41$$

$$Fz1=-(C11+C21+C31+C41) \quad \text{[Expression 2]}$$

[Expression 2] is an expression for measuring one of the applied force and the moment by using the capacitive element that advances in rightward rotation of the deformable body 40 when viewed in the positive direction on the Z-axis (as viewed from above) among the two capacitive elements arranged in each of the curved portions 45c to 48c.

Alternatively, the moments Mx, My, Mz and the force Fz applied to the force sensor 301c are also calculated using the following [Expression 3].

$$Mx2=-C12-C22+C32+C42$$

$$My2=C12-C22-C32+C42$$

$$Mz2=-C12+C22-C32+C42$$

$$Fz2=-(C12+C22+C32+C42) \quad \text{[Expression 3]}$$

[Expression 3] is an expression for measuring one of the applied force and the moment by using the capacitive element that advances in leftward rotation of the deformable body 40 when viewed in the positive direction on the Z-axis (as viewed from above) among the two capacitive elements arranged in each of the curved portions 45c to 48c.

<3-3. Fault Diagnosis>

The force sensor 301c according to the present embodiment can perform failure diagnosis by the single force sensor 301c. Herein, a diagnosis method will be described.

As described above, the eight capacitive elements C11 to C24 arranged in the force sensor 301c have the same effective facing areas and the separation distances between the electrodes. Furthermore, the four capacitive elements C11, C21, C31, and C41 used in [Expression 2] are arranged symmetrically with the four capacitive elements C12, C22, C32, and C42 used in [Expression 3] about the detection sites A1 to A4 defined in the first to fourth curved portions 45c to 48c. From these, in the force sensor 301c functioning normally, the one of a force and a moment measured on the basis of [Expression 2] s equal to the one of a force and a moment measured on the basis of [Expression 3]. That is, the force sensor 301c which is functioning normally achieves the following relationship of [Expression 4].

$$Mx1=Mx2$$

$$My1=My2$$

$$Mz1=Mz2$$

$$Fz1=Fz2 \quad \text{[Expression 4]}$$

This enables failure diagnosis of the force sensor 301c to be performed as follows. That is, the detection circuit 250 measures the one of a force and a moment applied to the force sensor 301c on the basis of both [Expression 2] and [Expression 3], and then, in a case where the absolute value of the difference between each of the values (Mx1, My1, Mz1, and Fz1) measured on the basis of [Expression 2] and each of the values (Mx2, My2, Mz2, Fz2) measured on the basis of [Expression 3] is a predetermined threshold (Cmx, Cmy, Cmz, and Cfz in [Expression 5]) or below, the detection circuit 250 determines that the force sensor 301c is functioning normally. That is, in a case where Expression 5 is satisfied, the detection circuit 250 determines that the force sensor 301c is functioning normally. In the present embodiment, the predetermined thresholds Cmx, Cmy, Cmz, Cfz are stored in the detection circuit 250 in advance.

$$|Mx1-Mx2| \leq Cmx, \text{ and}$$

$$|My1-My2| \leq Cmy, \text{ and}$$

$$|Mz1-Mz2| \leq Cmz, \text{ and}$$

$$|Fz1-Fz2| \leq Cfz \quad \text{[Expression 5]}$$

In contrast, in a case where at least one of the differences is greater than the predetermined threshold C1, the detection circuit 250 determines that the force sensor 301c is not functioning normally (faulty). That is, in a case where the following [Expression 6] is satisfied, the detection circuit 250 determines that the force sensor 301$c$ is not functioning normally.

$$|Mx1-Mx2|>Cmx, \text{ or}$$

$$|My1-My2|>Cmy, \text{ or}$$

$$|Mz1-Mz2|>Cmz, \text{ or}$$

$$|Fz1-Fz2|>Cfz \qquad \text{[Expression 6]}$$

According to the force sensor 301$c$ of the present embodiment as described above, it is possible to diagnose the failure by the single force sensor 301$c$ on the basis of the difference between the value of the measured one of a force and a moment measured using each one (total of four) of the two capacitive elements arranged in each of the first to fourth curved portions 45$c$ to 48$c$, and the value of the one of a force and a moment measured using the remaining one (total of four). This results in enhancement of the safety and reliability of the force sensor 301$c$.

In the above description, while the specific one of a force and a moment obtained on the basis of [Expression 2] and the specific one of a force and a moment obtained on the basis of [Expression 3] are compared with each other in order to perform failure diagnosis of the force sensor 301$c$, the failure diagnosis is not limited to such a method. For example, the failure diagnosis may be performed by comparing a specific one of a force and a moment (e.g, Mx1+Mx2) obtained on the basis of the sum of [Expression 2] and [Expression 3] with the specific one of a force and a moment (e.g, Mx1 or Mx2) obtained on the basis of any one of [Expression 2] and [Expression 3]. The specific diagnosis method is similar to the above-described method. That is, in a case where the fault diagnosis is performed focusing on the moment Mx around the X-axis, and when the specific one of a force and a moment obtained on the basis of Mx1+Mx2 which is the sum of [Expression 2] and [Expression 3] is defined as M12, whether one of |Mx12−Mx1| and |Mx12−Mx2| exceeds a predetermined threshold is evaluated. This also applies to the case where failure diagnosis is performed on the basis of other forces or moments.

Furthermore, while the above description uses one of [Expression 2] and [Expression 3] to measure the one of the force and the moment, it is allowable to use the sum (e.g, Mx1+Mx2) of [Expression 2] and [Expression 3].

<<<§ 4. Force Sensor According to Fourth Embodiment of the Present Invention>>>

<4-1. Configuration>

Next, a force sensor 401$c$ according to a fourth embodiment of the present invention will be described.

Figure 30:
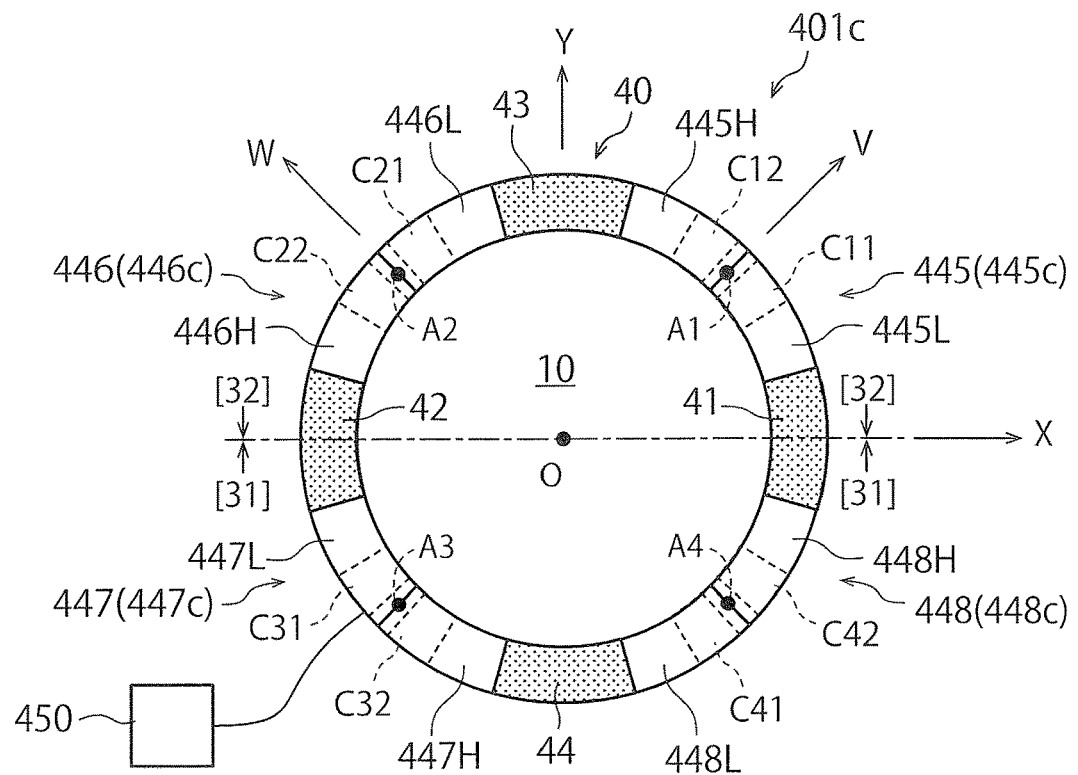
FIG. 30 is a schematic plan view of a force sensor according to a fourth embodiment of the present invention.
Figure 31:
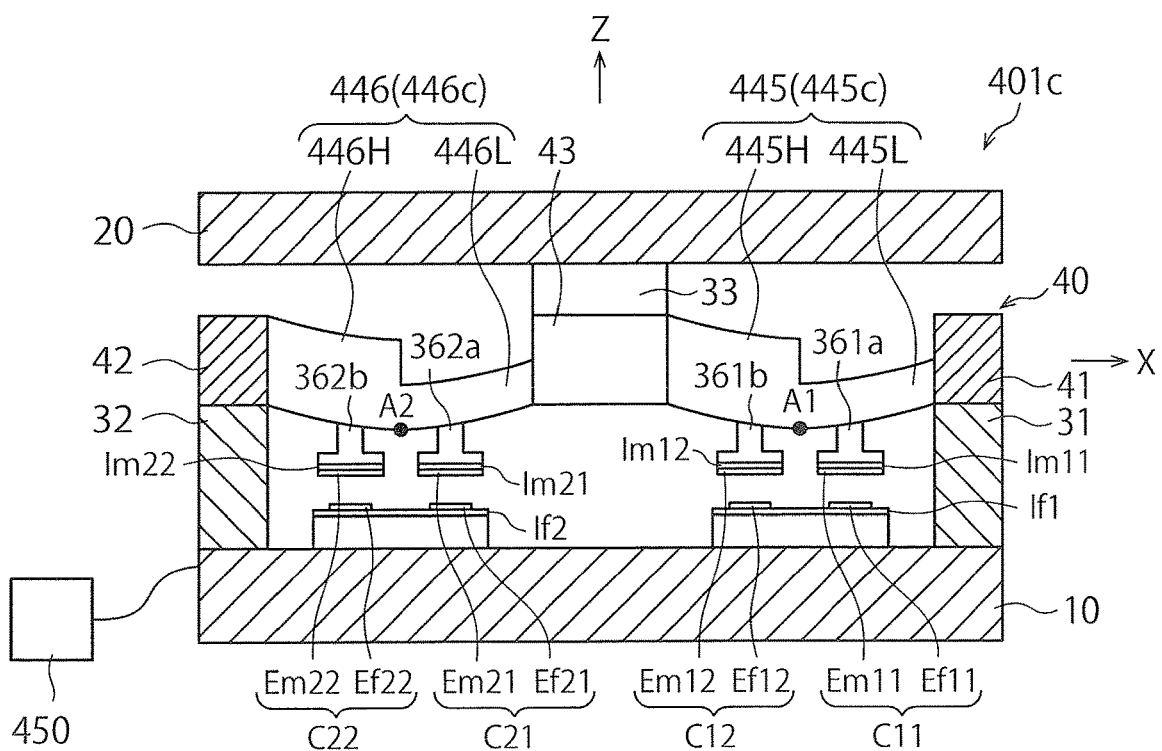
FIG. 31 is a cross-sectional view taken along line [31]-[31] in FIG. 30.
Figures 32, 33:
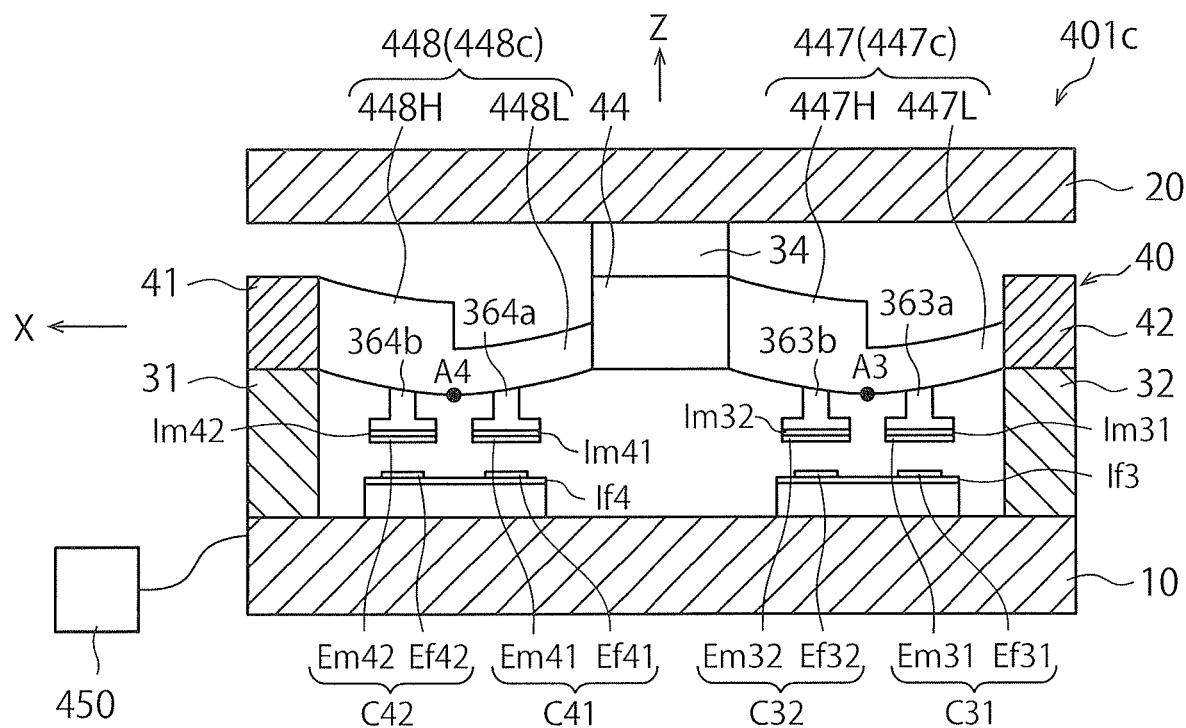
FIG. 32 is a cross-sectional view taken along line [32]-[32] of FIG. 30.
FIG. 33 is a table illustrating variations of the electrostatic capacitance values generated in each of capacitive elements when one of a force and a moment is applied to the force sensor in FIG. 30.

FIG. 30 is a schematic plan view of the force sensor 401$c$ according to the fourth embodiment of the present invention. FIG. 31 is a cross-sectional view taken along line [31]-[31] in FIG. 30. FIG. 32 is a cross-sectional view taken along line [32]-[32] line in FIG. 30. In FIG. 30, however, illustration of the force receiving body 20 is omitted for clarity of the drawing.

As illustrated in FIGS. 30 to 32, the force sensor 401$c$ according to the present embodiment is different from the force sensor 301$c$ according to the third embodiment in that first to fourth curved portions 445$c$ to 448$c$ are constituted by portions having two different spring constants. Specifically, as illustrated in FIG. 30 and FIG. 31, the first curved portion 445$c$ includes a first low elasticity portion 445L and a first high elasticity portion 445H. The first low elasticity portion 445L is located in a region sandwiched between a positive X-axis and a positive V-axis, and having a relatively small spring constant. The first high elasticity portion 445H is located in a region sandwiched between a positive V-axis and a positive Y-axis, and having a relatively high spring constant. The first low elasticity portion 445L and the first high elasticity portion 445H are integrally connected with each other (on the V-axis) at the first detection site A1. Similarly, the second curved portion 446$c$ includes a second low elasticity portion 446L and a second high elasticity portion 446H. The second low elasticity portion 446L is located in a region sandwiched between a positive Y-axis and a positive W-axis, and having a relatively small spring constant. The second high elasticity portion 446H is located in a region sandwiched between a positive W-axis and a negative X-axis, and having a relatively high spring constant. The second low elasticity portion 446L and the second high elasticity portion 446H are integrally connected with each other (on the W-axis) at the second detection site A2.

Furthermore, as illustrated in FIG. 30 and FIG. 32, the third curved portion 447$c$ includes a third low elasticity portion 447L and a third high elasticity portion 447H. The third low elasticity portion 447L is located in a region sandwiched between a negative X-axis and a negative V-axis, and having a relatively small spring constant. The third high elasticity portion 447H is located in a region sandwiched between a negative V-axis and a negative Y-axis, and having a relatively high spring constant. The third low elasticity portion 447L and the third high elasticity portion 447H are integrally connected with each other (on the V-axis) at the third detection site A3. Similarly, the fourth curved portion 448$c$ includes a fourth low elasticity portion 448L and a fourth high elasticity portion 448H. The fourth low elasticity portion 448L is located in a region sandwiched between a negative Y-axis and a negative W-axis, and having a relatively small spring constant. The fourth high elasticity portion 448H is located in a region sandwiched between a negative W-axis and a positive X-axis, and having a relatively high spring constant. The fourth low elasticity portion 448L and the fourth high elasticity portion 448H are integrally connected with each other (on the W-axis) at the fourth detection site A4.

As illustrated in FIGS. 31 and 32, each of the low elasticity portions 445L to 448L has a smaller thickness in the Z-axis direction (up-down direction) than each of the high elasticity portions 445H to 448H. Of course, the present invention is not limited to such a mode. In other embodiments, each of the low elasticity portions 445L to 448L may be configured to have a smaller radial width than each of the high elasticity portions 445H to 448H so as to achieve the difference in the spring constants, or may be formed of different materials so as to achieve the differences in the spring constants.

As illustrated in FIGS. 30 to 32, each of the curved portions 445$c$ to 448$c$ is provided with two capacitive elements C11 to C42 similarly to the force sensor 301$c$ according to the third embodiment. The two capacitive elements are arranged along the circumferential direction of the deformable body 40 with the corresponding detection sites A1 to A4 interposed therebetween. Specifically, the 1-1 capacitive element C11 is arranged on the lower surface of the first low elasticity portion 445L, while the 1-2 capacitive element C12 is arranged on the lower surface of the first high elasticity portion 445H. The 2-1 capacitive element C21 is arranged on the lower surface of the second low elasticity portion 446L, while the 2-2 capacitive element C22 is arranged on the lower surface of the second high elasticity portion 446H. The 3-1 capacitive element C31 is arranged on the lower surface of the third low elasticity portion 447L, while the 3-2 capacitive element C32 is arranged on the lower surface of the third high elasticity portion 447H. The 4-1 capacitive element C41 is arranged on the lower surface of the fourth low elasticity portion 448L and the 4-2 capacitive element C42 is arranged on the lower surface of the fourth high elasticity portion 448H. Since other configurations are substantially similar to the configuration of the third embodiment, corresponding components are denoted by the similar reference numerals in the drawings, and a detailed description thereof will be omitted.

<4-2. Application>

Next, FIG. 33 is a table illustrating variations of the electrostatic capacitance values generated in each of capacitive elements C11 to C24 when one of a force and a moment is applied to the force sensor 401c in FIG. 30. In this table, "+" indicates that the electrostatic capacitance value increases, and "++" indicates that the electrostatic capacitance value widely increases. In addition, "−" indicates that the electrostatic capacitance value decreases, and "−−" indicates that the electrostatic capacitance value widely decreases.

When one of a force and a moment is applied to the force sensor 401c according to the present embodiment, the curved portions 445c to 448c are elastically deformed as a whole as described with reference to FIGS. 3 to 9 in accordance with one of the applied force and the moment. Due to this elastic deformation, the electrostatic capacitance values of the capacitive elements C11 to C42 vary. This variation is substantially similar to the electrostatic capacitance value of each of the capacitive elements C11 to C42 of the force sensor 301c according to the third embodiment. Note that, due to the difference in spring constant, relatively great elastic deformation is generated in low elasticity portions 444L to 448L in each of the curved portions 445c to 448c, while relatively small elastic deformation is generated in the high elasticity portions 444H to 448H. As a result, as illustrated in FIG. 33, the capacitive elements C11, C21, C31, and C41 arranged in the low elasticity portions 444L to 448L have relatively large variations in the electrostatic capacitance value, while the capacitive elements C12, C22, C32, and C42 arranged in the high elasticity portions 444H to 448H have relatively small variations in the electrostatic capacitance value.

The moments Mx, My, and Mz and the force Fz applied to the force sensor 401c are calculated using the following [Expression 7] on the basis of the table illustrated in FIG. 33. The symbols at the ends of Mx, My, Mz and Fz are provided to distinguish between the one of a force and a moment calculated using [Expression 7] and the one of a force and a moment calculated using [Expression 8] described below.

$$Mx1=-C11-C21+C31+C41$$

$$My1=C11-C21-C31+C41$$

$$Mz1=-C11+C21-C31+C41$$

$$Fz1=-(C11+C21+C31+C41) \qquad \text{[Expression 7]}$$

[Expression 7] is an expression for measuring one of the applied force and the moment by using the four capacitive elements C11, C21, C31, C41 arranged in the low elasticity portions 445L to 448L among the two capacitive elements arranged in the first to fourth curved portions 445c to 448c.

Alternatively, the moments Mx, My, Mz and force Fz applied to the force sensor 401c are also calculated using the following [Expression 8].

$$Mx2=-C12-C22+C32+C42$$

$$My2=C12-C22-C32+C42$$

$$Mz2=-C12+C22-C32+C42$$

$$Fz2=-(C12+C22+C32+C42) \qquad \text{[Expression 8]}$$

[Expression 8] is an expression for measuring one of the applied force and the moment by using the four capacitive elements C12, C22, C32, C42 arranged in the high elasticity portions 445H to 448H among the two capacitive elements arranged in the first to fourth curved portions 445c to 448c.

In the present embodiment, in view of the table illustrated in FIG. 33, the detection circuit 450 measures one of the applied force and the moment on the basis of [Expression 7] based on the variation of the electrostatic capacitance values of the four capacitive elements C11, C21, C31, and C41 arranged in the low elasticity portions 445L to 448L, respectively. This makes it possible to perform measurement with high sensitivity and high S/N ratio. Of course, one of the applied force and the moment may be measured using [Expression 8].

<4-3. Fault Diagnosis>

The force sensor 401c according to the present embodiment can perform failure diagnosis with higher performance than the force sensor 301c according to the third embodiment in the following point. That is, the force sensor 301c according to the third embodiment is capable of detecting a failure when the electrode is broken or when foreign matter is mixed between the electrodes. On the other hand, when the force sensor 301c fails to function normally due to metal fatigue in the deformable body 40, there might be a case where there i no difference between the one of a force and a moment (Mx1, My1, Mz1, and Fz1) measured on the basis of [Expression 2] and the one of a force and a moment (Mx2, My2, Mz2, and Fz2) measured on the basis of [Expression 3]. In this case, the force sensor 301c has difficulty in properly performing failure diagnosis. Metal fatigue occurring in the deformable body 40 might generate cracks or the like in the elastic body constituting the deformable body 40, leading to breakage of the deformable body 40 in the final stage. Therefore, providing a force sensor capable of detecting failures due to metal fatigue would further enhance the reliability and safety.

The force sensor 401c according to the present embodiment is intended to deal with such a problem. That is, even in a case where the force sensor 401c fails to function normally due to metal fatigue in the deformable body 40, the force sensor 401c can properly perform failure diagnosis. Hereinafter, the failure diagnosis by the force sensor 401c according to the present embodiment will be described in detail.

First, the principle of failure diagnosis will be described. When repeated loads are applied to the deformable body 40 of the force sensor 401c, metal fatigue occurs in the deformable body 40. When this metal fatigue is accumulated, the strength of the deformable body 40 decreases, and ultimately, the deformable body 40 breaks. Typically, when metal fatigue accumulates in a metal material, the metal material would soften. Therefore, the spring constants of the first to fourth curved portions 445c to 448c would decrease. In other words, due to the accumulation of metal fatigue, the deformable body 40 has an increased sensitivity to one of the applied force and the moment, as compared with the initial state.

Figure 34:
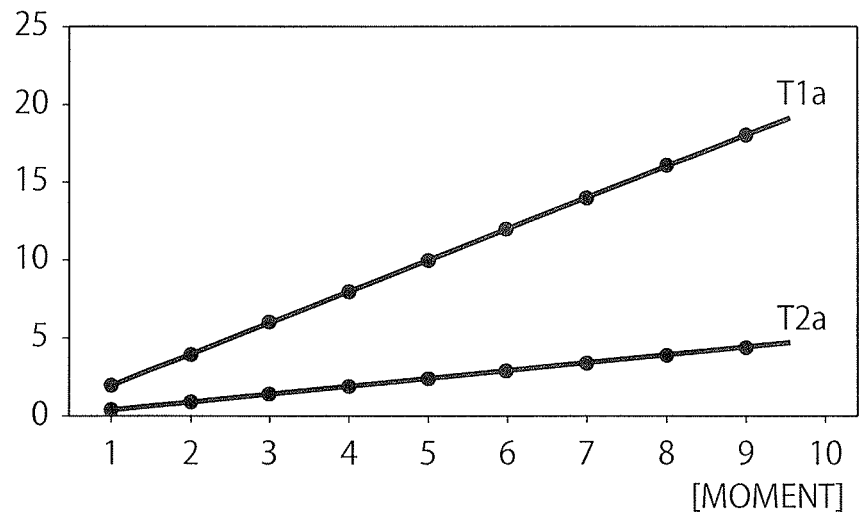
FIG. 34 is a graph illustrating a relationship between the magnitude of a moment Mx around the X-axis applied to the force sensor and an electric signal output from the force sensor in a state (initial state) where metal fatigue is not generated in the force sensor illustrated in FIG. 30.
Figure 35:
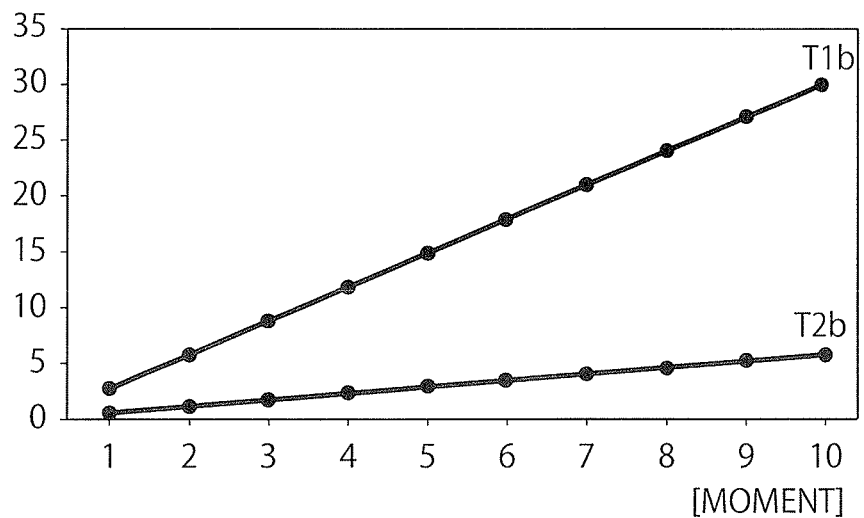
FIG. 35 is a graph illustrating a relationship between the magnitude of the moment Mx around the X-axis applied to the force sensor and an electric signal output from the force sensor in a state where metal fatigue is generated in the force sensor illustrated in FIG. 30.

FIG. 34 is a graph illustrating the relationship between the magnitude of the moment Mx around the X-axis applied to the force sensor 401c and an electric signal indicating the moment Mx output from the force sensor 401c in a state where no metal fatigue is generated in the force sensor 401c illustrated in FIG. 30 (initial state). FIG. 35 is a graph illustrating the relationship between the magnitude of the moment Mx around the X-axis applied to the force sensor 401c and an electric signal indicating the moment Mx output from the force sensor 401c in a state where metal fatigue is generated in the force sensor 401c illustrated in FIG. 30. The reference numeral "T1" in FIGS. 34 and 35 indicates a first electric signal which is an electric signal based on the variation amount in the electrostatic capacitance value of the four capacitive elements arranged in the low elasticity portions 445L to 448L. The reference numeral "T2" indicates a second electric signal which is an electric signal based on the variation amount of the electrostatic capacitance value of the four capacitive elements arranged in the high elasticity portions 445H to 448H. The symbols at the end of "T1" and "T2" are provided to distinguish between the electric signal (with "a" added at the end) in the initial state and the electric signal (with "b" added at the end) in the state where the metal fatigue is accumulated.

When the first electric signal T1 and the second electric signal T2 are represented specifically by the following [Expression 9]

$$T1(T1a,T1b)=-C11-C21+C31+C41$$

$$T2(T2a,T2b)=-C12-C22+C32+C42 \quad \text{[Expression 9]}$$

Referring to FIG. 34, the slope (sensitivity) of the graph (straight line) illustrating the first electric signal T1a in the initial state is 2.0, while the slope (sensitivity) of the graph (straight line) illustrating the second electric signal T2a in the initial state is 0.5. In contrast, referring to FIG. 35, the slope (sensitivity) of the graph (straight line) illustrating the first electric signal T1b in the state where metal fatigue is accumulated is 3.0, while the slope (sensitivity) of the graph (straight line) illustrating the second electric signal T2b in the state where metal fatigue is accumulated is 0.6.

From these, it is observed that the force sensor 401c has increased sensitivity to the applied moment Mx about the X-axis due to accumulation of metal fatigue in the deformable body. In particular, the detection sensitivity of each of the four capacitive elements arranged in the low elasticity portions 445L to 448L increased by 50%. In contrast, the detection sensitivity of each of the four capacitive elements arranged in the high elasticity portions 445H to 448H also increased, with the ratio of merely 20%.

What is remarkable here is that there is a difference in the change in the sensitivity between the four capacitive elements C11, C21, C31, and C41 arranged in the low elasticity portions 445L to 448L and the four capacitive elements C12, C22, C32, and C42 arranged in the high elasticity portions 445H to 448H. Such a difference is due to the fact that the strain generated in the low elasticity portions 445L to 448L is greater than the strain generated in the high elasticity portions 445H to 448H, leading to a greater amount of metal fatigue accumulated in the low elasticity portions 445L to 448L in comparison. Such a change in sensitivity is quantitatively evaluated by focusing on the ratio between the first electric signal T1 and the second electric signal T2 as follows. That is, the ratio of the first electric signal T1a to the second electric signal T2a (T1a/T2a) is 4.0 in the initial state, while the ratio of the first electric signal T1b to the second electric signal T2b (T1b/T2b) is increased to 5.0 in a state where metal fatigue is accumulated.

Given the mechanism by which metal fatigue develops, this ratio T1/T2 gradually increases from 4.0 to 5.0 as application of repetitive load (one of a force and a moment). In addition to measurement of one of the applied force and the moment, the force sensor 401c according to the present embodiment also performs failure diagnosis of the force sensor 1c by focusing on the change in the ratio T1/T2. The fault diagnosis is implemented by the detection circuit 450 by evaluating whether the difference ((T1/T2)−(T1a/T2a)) between the ratio (T1/T2) of the first electric signal T1 and the second electric signal T2 at the time of measurement and the ratio (T1a/T2a) of the first electric signal T1a and the second electric signal T2a in the initial state exceeds a predetermined value (threshold C). Specifically, when the following [Expression 10] is satisfied, the detection circuit 450 determines that the force sensor 401c is functioning normally. Note that in the present embodiment, the ratio (T1a/T2a) of the first electric signal T1a and the second electric signal T2a and the threshold C in the initial state are stored in the detection circuit 450 in advance.

$$(T1/T2)-(T1a/T2a) \leq C (C: \text{threshold}) \quad \text{[Expression 10]}$$

In contrast, when the following [Expression 11] is satisfied, the detection circuit 450 determines that the force sensor 401c is not functioning normally (faulty).

$$(T1/T2)-(T1a/T2a) > C (C: \text{threshold}) \quad \text{[Expression 11]}$$

While the above description is an exemplary case where the moment Mx around the X-axis is applied to the force sensor 401c, similar failure diagnosis is possible even in a case where the other moments My, Mz or the force Fz is applied. Specifically, for the force or moment of interest, the expression described in [Expression 7] is defined as the first electric signal T1 and the expression described in [Expression 8] is defined as the second electric signal T2. At this time, the relationship between the one of a force and a moment applied to the force sensor 401c and the first and second electric signals T1 and T2 is similar to the graph illustrated in FIG. 34 in the initial state, and similar to the graph illustrated in FIG. 35 in a state where metal fatigue is accumulated in the deformable body 40. However, when the force Fz in the Z-axis direction is applied, the "moment" on the horizontal axis may be substituted by "force" in reading. Therefore, even when any one of a force and a moment is applied, the failure diagnosis of the force sensor 401c is appropriately performed on the basis of the above-described [Expression 10] and [Expression 11].

According to the present embodiment as described above, it is possible to provide the force sensor 401c capable of detecting a failure due to metal fatigue developed in the deformable body 40 while measuring one of a force and a moment. This further enhances the reliability and safety of the force sensor 401c.

<<<§ 5. Force Sensor According to Fifth Embodiment of the Present Invention>>>

Next, a force sensor 501c according to a fifth embodiment of the present invention will be described.

Figure 36:
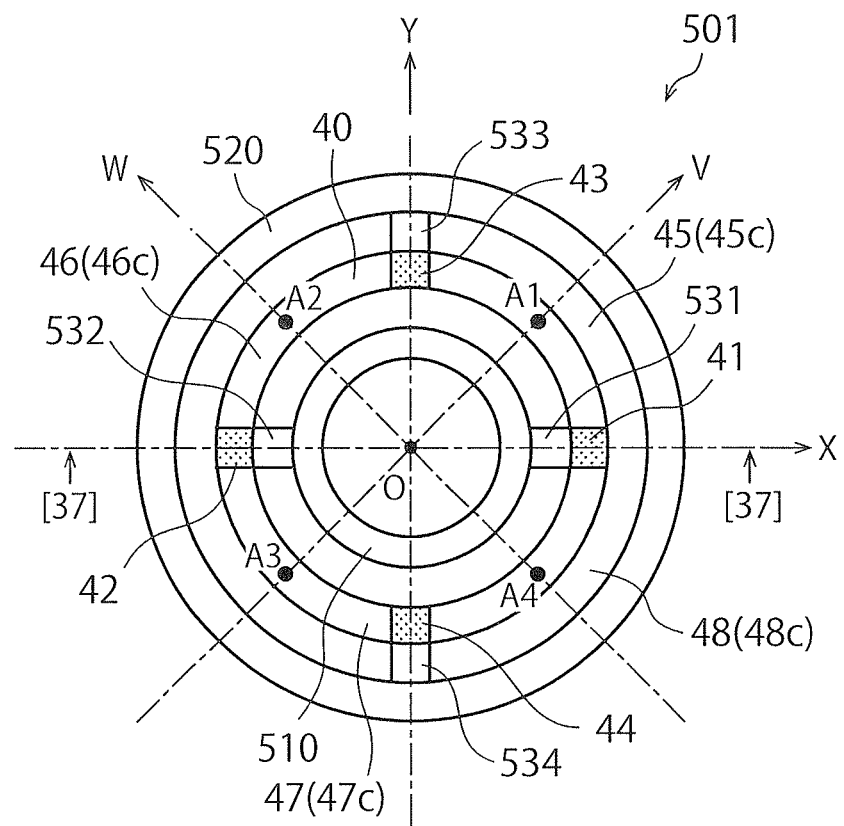
FIG. 36 is a schematic plan view illustrating a basic structure of a force sensor according to a fifth embodiment of the present invention.
Figure 37:
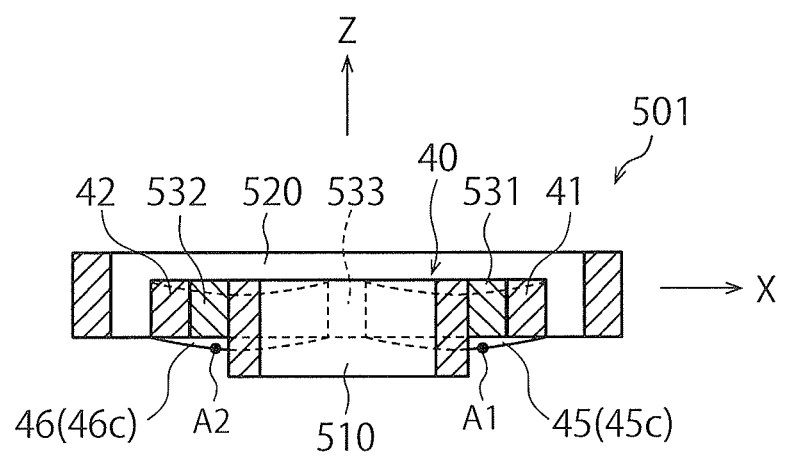
FIG. 37 is a cross-sectional view taken along line [37]-[37] in FIG. 36.

FIG. 36 is a schematic plan view illustrating a basic structure 501 of a force sensor 501c according to a fifth embodiment of the present invention, and FIG. 37 is a cross-sectional view taken along line [37]-[37] in FIG. 36.

As illustrated in FIGS. 36 and 37, the basic structure 501 includes the structure of the fixed body 510 and the force receiving body 520 different from the basic structure 1 of the force sensor 1c according to the first embodiment. Specifically, each of the fixed body 510 and the force receiving body 520 of the basic structure 501 has an annular (cylindrical) shape. As illustrated in FIGS. 36 and 37, the fixed body 510 is arranged inside the deformable body 40 when viewed in the Z-axis direction, and the force receiving body 520 is arranged outside the deformable body 40. The fixed body 510, the force receiving body 520, and the deformable body 40 have their center axes overlapped with the Z-axis and are concentric with each other. Furthermore, as illustrated in FIG. 37, the fixed body 510 is arranged such that the Z-coordinate value of the lower end thereof is smaller than the Z-coordinate value of the lower end (detection sites A1 to A4) of the deformable body 40. Furthermore, the force receiving body 520 is arranged such that the Z-coordinate value of the upper end thereof is larger than the Z-coordinate value of the upper end of the deformable body 40.

Together with the arrangement of the fixed body 510, the force receiving body 520, and the deformable body 40 as described above, the arrangement of the first to fourth connecting members 531 to 534 is also different from the case of the force sensor 1c according to the first embodiment. That is, as illustrated in FIGS. 36 and 37, the first connecting member 531 connects the outer side surface of the fixed body 510 (side surface facing the positive direction on the X-axis) and the inner surface side of the deformable body 40 (side surface facing the negative direction on the X-axis) with each other on the positive X-axis. In contrast, the second connecting member 532 connects the outer side surface of the fixed body 510 (side surface facing the negative direction on the X-axis) and the inner side surface of the deformable body 40 (side surface facing the positive direction on the X-axis) with each other on the negative X-axis. Furthermore, as illustrated in FIG. 36, the inner side surface of the force receiving body 520 (side surface facing the negative direction on the Y-axis) is connected with the outer side surface of the deformable body 40 (side surface facing the positive direction on the Y-axis) by a third connecting member 533, on the positive Y-axis. The inner side surface of the force receiving body 520 (side surface facing the positive direction on the Y-axis) is connected with the outer side surface of the deformable body 40 (side surface facing the negative direction on the Y-axis) by a fourth connecting member 534, on the negative Y-axis. The other configuration is similar to the basic structure 1 of the force sensor 1c according to the first embodiment. For this reason, corresponding components are denoted by the similar reference numerals in the drawings, and a detailed description thereof will be omitted.

Although not illustrated, the force sensor 501c can be configured by arranging four capacitive elements in an arrangement similar to the force sensor 1c according to the first embodiment in the basic structure 501 as described above. Although a member for arranging the fixed electrode is not illustrated in FIG. 37, a fixed electrode may be appropriately arranged at a site to which the force sensor 501c is attached, or an additional member may be added to the fixed body 510 and the fixed electrode may be arranged on this member.

The force sensor 501c as described above can be suitably installed in a mechanism formed with a first member and a second member that move relative to each other, for example, a joint of a robot. That is, by coupling the fixed body 510 to the first member and coupling the force receiving body 520 to the second member, it is possible to arrange the force sensor 501c in a limited space in a mode of avoiding interference with other members.

The method for measuring the force or moment applied to the force sensor 501c is similar to the method for the force sensor 1c according to the first embodiment, and thus, a detailed description thereof will be omitted here.

As a modification of the basic structure 501 as described above, a basic structure 502 as in the following is also conceivable.

Figure 38:
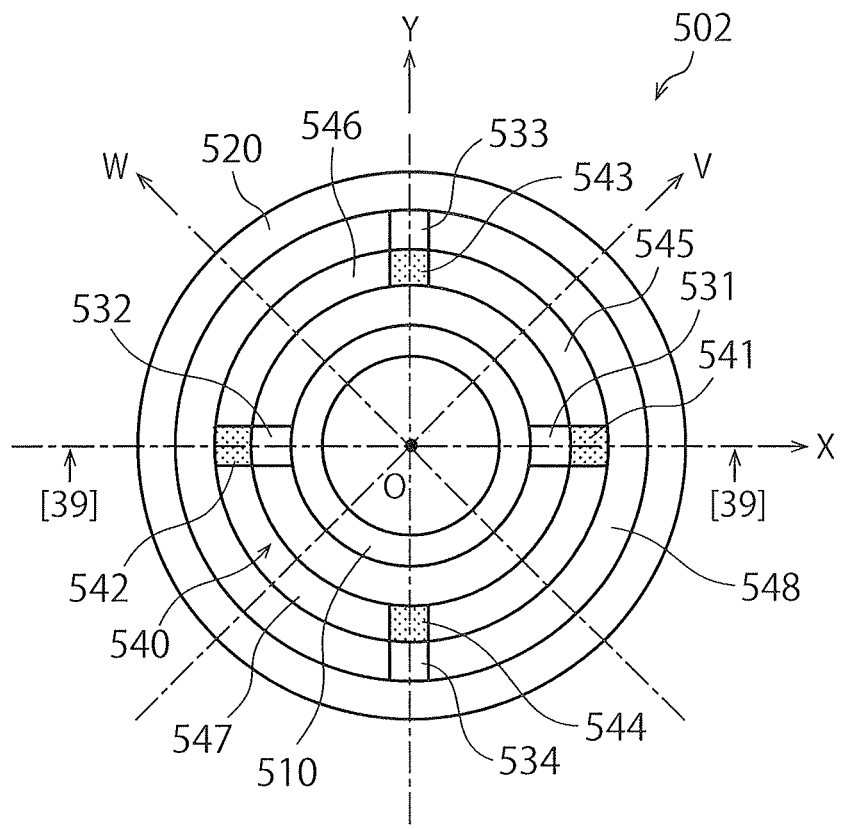
FIG. 38 is a schematic plan view illustrating a modification of the basic structure of FIG. 36.
Figure 39:
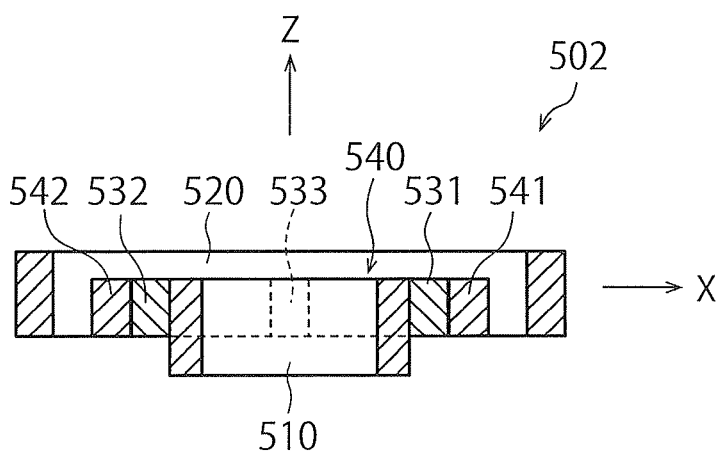
FIG. 39 is a cross-sectional view taken along line [39]-[39] in FIG. 38.

FIG. 38 is a schematic plan view illustrating a modification of the basic structure 501 in FIG. 36, and FIG. 39 is a cross-sectional view taken along line [39]-[39] in FIG. 38.

As illustrated in FIGS. 38 and 39, the basic structure 502 according to the present modification is different from the basic structure 501 illustrated in FIGS. 36 and 37 in that no curved portion is provided in the deformable body 540. Therefore, the deformable body 540 according to the present modification has an annular (cylinder) shape, and the upper surface and the lower surface of the deformable body 540 are parallel to the XY plane. Since other configurations are similar to the basic structure 501 described above, corresponding components are denoted by the similar reference numerals in the drawings, and the detailed description thereof will be omitted.

Figure 40:
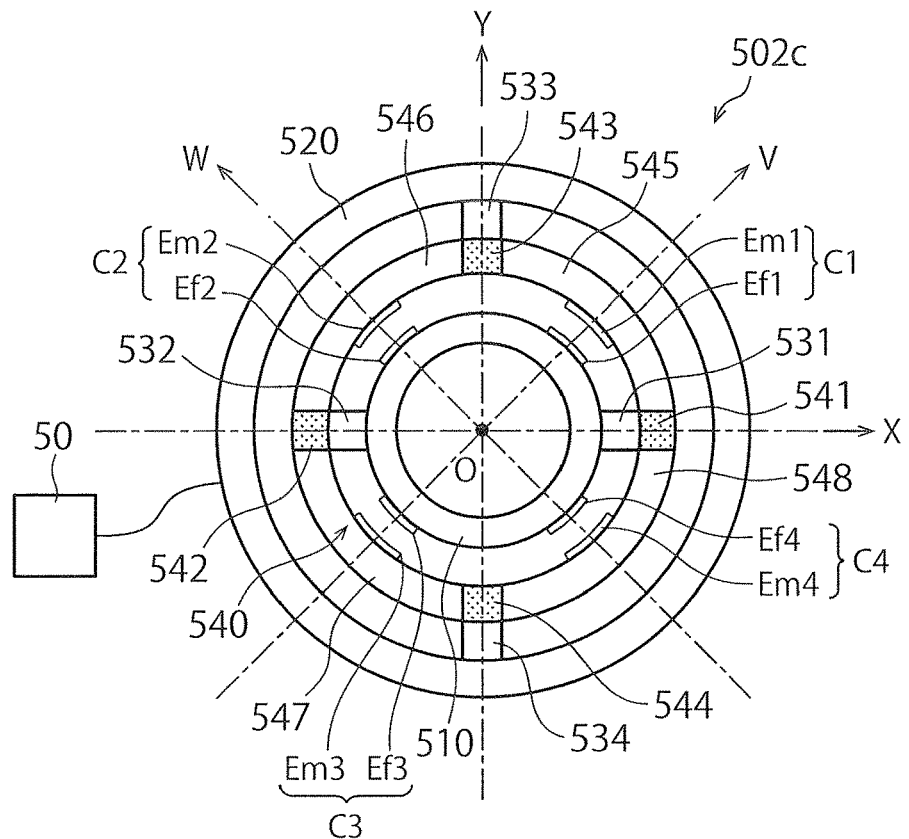
FIG. 40 is a schematic plan view illustrating an example of a force sensor using the basic structure of FIG. 38.

FIG. 40 is a schematic plan view illustrating an exemplary force sensor 502c using the basic structure 502 of FIG. 38. The force sensor 502c illustrated in FIG. 40 measures the force or moment using the radial displacement generated on the inner surface (side surface facing the origin O) due to the elastic deformation of the deformable body 40 caused by the applied force or moment. In this case, as illustrated in FIG. 40, each of the displacement electrodes Em1 to Em4 may be provided at each of four portions overlapping the V-axis and the W-axis on the inner side surface of the deformable body 540, and each of the fixed electrodes Ef1 to Ef4 may be provided at each of sites facing the displacement electrodes Em1 to Em4 on the outer side surfaces of the fixed body 510. With this configuration, four capacitive elements C1 to C4 are formed at four positions on the V-axis and the W-axis. In the force sensor 502c using the basic structure 502 according to the present modification, one of the force and the moment applied on the basis of these four capacitive elements C1 to C4 are detected.

The specific principle for measuring the one of a force and a moment applied using the force sensor 502c as described above is described, for example, in JP 4948630 B2 in the name of the present applicant, and thus, detailed description will be omitted.

The basic structures 501 and 502 as described above include the force receiving body 520, the deformable bodies 40 and 540, the connecting members 531 to 534, and the fixed body 510 being concentrically arranged along the XY plane. Therefore, each of components of the basic structures 501 and 502 can be integrally formed by cutting working. By such processing, force sensor 501c, 502c without hysteresis can be provided.

<<<§ 6. Other Modifications>>>

Next, with reference to FIG. 41 and FIG. 42, modifications using a deformable body 640 applicable to the force sensor or the basic structure according to each of the embodiments described above will be described.

Figure 41:
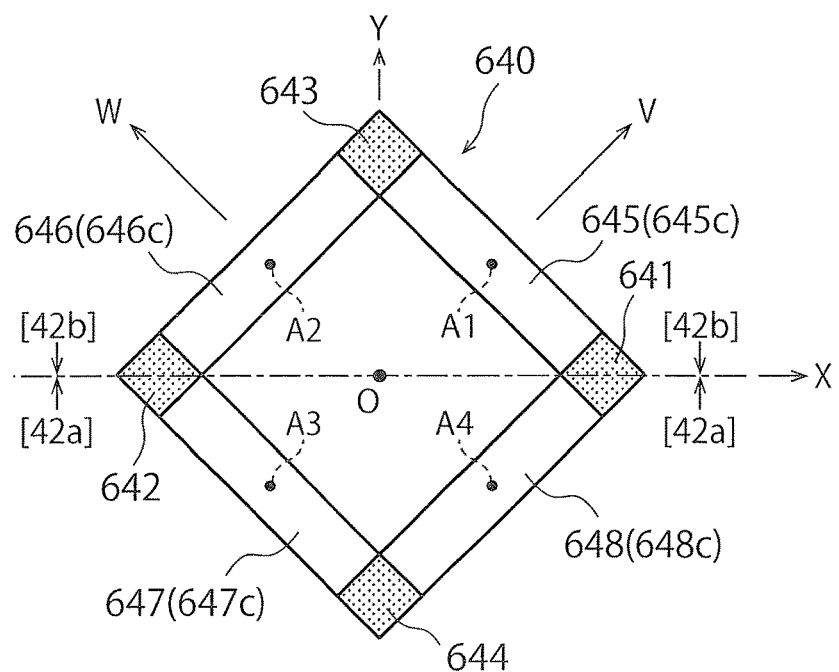
FIG. 41 is a schematic plan view illustrating a rectangular deformable body.
Figure 42A:
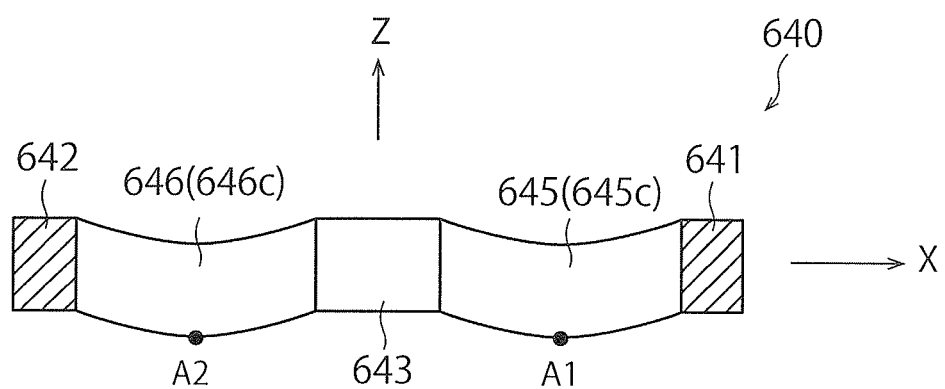
FIG. 42(a) is a cross-sectional view taken along line [42a]-[42a] of FIG. 41.
Figure 42B:
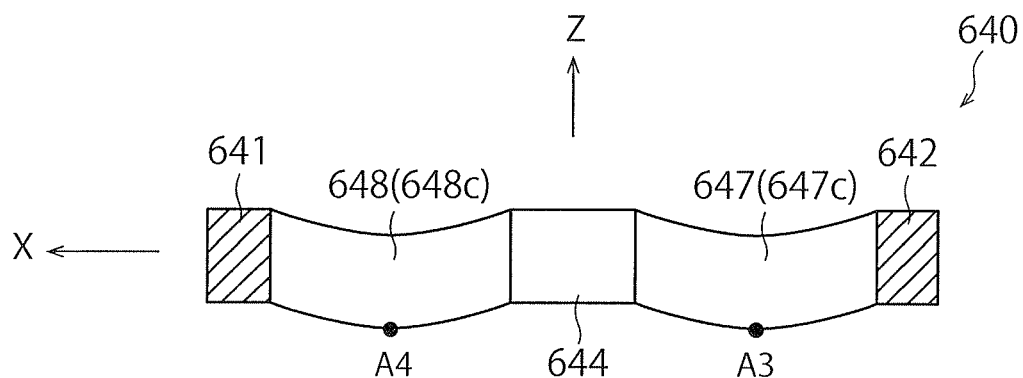
FIG. 42(b) is a cross-sectional view taken along line [42b]-[42b] of FIG. 41.

FIG. 41 is a schematic plan view illustrating the rectangular deformable body 640. FIG. 42 is a schematic cross-sectional view of FIG. 41. FIG. 42(a) is a cross-sectional view taken along line [42a]-[42a] of FIG. 41, and FIG. 42(b) is a cross-sectional view taken along line [42b]-[42b] of FIG. 41.

The deformable body 640 according to the present modification has a rectangular shape as a whole. Herein, as illustrated in FIG. 41, explanation will be given by taking the deformable body 640 with a square shape as an example. The deformable body 640 includes a first fixed portion 641 positioned on the positive X-axis, a second fixed portion 642 located on the negative X-axis, and a first force receiving portion 643 located on the positive Y-axis, and a second force receiving portion 644 located on the negative Y-axis. Each of the fixed portions 641 and 642 and each of the force receiving portions 643 and 644 are regions to which the fixed body 10 and the force receiving body 20 of the deformable body 640 are connected, and they not sites having characteristics different from the other regions of the deformable body 640. Accordingly, the material of each of the fixed portions 641 and 642 and the force receiving portions 643 and 644 is the same as the material of the other regions of the deformable body 640. However, for the sake of convenience of explanation, the regions are illustrated in a color different from the colors of other regions of the deformable body 640 in the drawing.

As illustrated in FIG. 41, the deformable body 640 further includes: a first deformable portion 645 located between the first fixed portion 641 and the first force receiving portion 643 (first quadrant of the XY plane); a second deformable portion 646 located between the first force receiving portion 643 and the second fixed portion 642 (second quadrant of the XY plane); a third deformable portion 647 located between the second fixed portion 642 and the second force receiving portion 644 (third quadrant of the XY plane); and a fourth deformable portion 648 located between the second force receiving portion 644 and the first fixed portion 641 (fourth quadrant of the XY plane). Both ends of each of the deformable portions 645 to 648 are integrally coupled to the adjacent fixed portions 641 and 642 and the force receiving portions 643 and 644, respectively. With this structure, one of the force and the moment applied to the force receiving portions 43 and 44 are reliably transmitted to the individual deformable portions 645 to 648, thereby generating elastic deformation corresponding to one of the applied force and the moment in the deformable portions 645 to 648.

As illustrated in FIG. 41, the first to fourth deformable portions 645 to 648 are all formed in linear shapes when viewed in the Z-axis direction. Moreover, since distances from the origin O to each of the fixed portions 641 and 642 and each of the force receiving portions 643 and 644 are all equal, each deformable portion 645 to 648 is arranged to form one side of a square.

Furthermore, as illustrated in FIGS. 42(*a*) and 42(*b*), each of the deformable portions 645 to 648 of the deformable body 640 includes curved portions 645*c* to 648*c* curved to protrude in the negative direction on the Z-axis. In the illustrated example, each of the deformable portions 645 to 648 forms the curved portions 645*c* to 648*c* as a whole. Accordingly, FIGS. 42(*a*) and 42(*b*) illustrate reference numerals of the deformable portions together with reference numerals of the curved portions. As illustrated in the drawing, a site of the first curved portion 645*c* positioned at the lowermost (negative direction on the Z-axis) exists on the positive V-axis. In addition, the shape of the first curved portion 645*c* from the first fixed portion 641 to the site located at the lowermost position is the same as the shape of the site from the first force receiving portion 643 to the site located at the lowermost position. In other words, the first curved portion 645*c* has a symmetrical shape about the positive V-axis in the length direction of the deformable body 640.

This similarly applies to the remaining three curved portions 646*c*, 647*c*, and 648*c*. That is, the lowermost site of the second curved portion 646*c* exists on the positive W-axis and has a symmetrical shape about the positive W-axis. The lowermost site of the third curved portion 647*c* exists on the negative V-axis and has a symmetrical shape with respect to the negative V-axis. The lowermost site of the fourth curved portion 648*c* exists on the negative W-axis and has a symmetrical shape about the negative V-axis.

As illustrated in FIGS. 42(*a*) and 42(*b*), the deformable body 640 defines detection sites A1 to A4 for detecting elastic deformation generated in each of the first to fourth curved portions 645*c* to 648*c*. Specifically, the detection sites A1 to A4 are formed at the lowermost site of each of the curved portions 645*c* to 648*c*, that is, at the sites in which each of the curved portions 645*c* to 648*c* overlaps with the V-axis and the W-axis when viewed in the Z-axis direction. In FIG. 41, while the detection sites A1 to A4 are illustrated as being provided on the upper surface (front surface) of the deformable body 640, the detection sites A1 to A4 are actually provided on the lower surface (back surface) of the deformable body 640 (refer to FIG. 42).

<<<§ 7. For Maintaining Constant Effective Facing Area Between Electrode Plates>>>

In each force sensor described above, the in order to suppress the change in the effective facing area of the pair of electrodes constituting the capacitive element even when the relative position of the displacement electrode with respect to the fixed electrode changes as a result of application of the force in each axial direction or the moment around each axis, it is conceivable to set the area of one of the fixed electrode and the displacement electrode constituting each of the capacitive elements to be greater than the area of the other. This corresponds to a state where the outline of the electrode with the smaller area (for example, the displacement electrode) is projected on the surface of the greater electrode (for example, the fixed electrode) in a normal direction of the electrode to form an orthographic projection image, and the projected image of the electrode having the smaller area is completely contained in the surface of the electrode having the greater area. When this state is maintained, the effective area of the capacitive element formed by both electrodes is equal to the area of the smaller electrode and is always constant. That is, it is possible to enhance detection accuracy of the force.

In each of the embodiments and the modifications described so far, the area of the fixed electrode is greater than the area of the displacement electrode, as illustrated in the corresponding drawings.

The invention claimed is:

1. A force sensor that detects at least one of a force in each axial direction and a moment around each axis in an XYZ three-dimensional coordinate system, the force sensor comprising:

an annular deformable body arranged so as to surround an origin O when viewed in the Z-axis direction and configured to generate elastic deformation by application of one of the force and the moment; and a detection circuit configured to output an electric signal indicating one of the applied force and the moment on the basis of the elastic deformation generated in the deformable body, wherein the deformable body includes: two fixed portions fixed with respect to the XYZ three-dimensional coordinate system; two force receiving portions positioned alternately with the fixed portions in a circumferential direction of the deformable body and configured to receive application of one of the force and the moment; and four deformable portions positioned between the fixed portion and the force receiving portion adjacent to each other in the circumferential direction of the deformable body, each of the deformable portions includes a curved portion protruding in the Z-axis direction, and the detection circuit outputs the electric signal on the basis of elastic deformation generated in the curved portion.

2. The force sensor according to claim 1, further comprising: a fixed body fixed with respect to the XYZ three-dimensional coordinate system; and a force receiving body configured to move relative to the fixed portion by the application of one of a force and a moment, wherein the fixed portion of the deformable body is connected to the fixed body, and the force receiving portion of the deformable body is connected to the force receiving body.

3. The force sensor according to claim 2, wherein each of the fixed body and the force receiving body includes a through hole through which the Z-axis is inserted.

4. The force sensor according to claim 1, wherein the two fixed portions are arranged symmetrically with a site where the deformable body overlaps with the X-axis about the Y-axis when viewed in the Z-axis direction, and the two force receiving portions are arranged symmetrically with a site where the deformable body overlaps with the Y-axis about the X-axis when viewed in the Z-axis direction.

5. The force sensor according to claim 1, wherein the deformable body has an annular shape about the origin O as a center, when viewed in the Z-axis direction.

6. The force sensor according to claim 1, wherein the deformable body has a rectangular shape about the origin O as a center, when viewed in the Z-axis direction.

7. The force sensor according to claim 1, wherein each of the curved portions of the deformable body protrudes in a negative direction on the Z-axis, the detection circuit includes: a total of four displacement electrodes arranged one for each of the curved portions; and a fixed electrode arranged to face each of the displacement electrodes and fixed to the fixed portion, each of the displacement electrodes and the fixed electrode may constitute four sets of capacitive elements, and the detection circuit outputs an electric signal indicating one of the applied force and the moment on the basis of a variation amount of electrostatic capacitance values of the four sets of capacitive elements.

8. The force sensor according to claim 7, wherein in a case where the V-axis and the W-axis passing through the origin O and forming an angle of 45° with respect to the X-axis and the Y-axis are defined on the XY plane, each of the four sets of capacitive elements is arranged at each of the four sites at which the deformable body intersects the V-axis and the W-axis when viewed in the Z-axis direction.

9. The force sensor according to claim 8, wherein one deformable body-side support is connected to each of the curved portions of the deformable body, and each of the four displacement electrodes is supported by the corresponding deformable body-side support.

10. The force sensor according to claim 9, wherein detection sites are defined at a site located on the most negative side on the Z-axis at each of the curved portions of the deformable body, the deformable body-side support includes: a beam arranged so as to overlap with the detection site of the curved portion to which the deformable body-side support is connected; and a connecting body connecting one end of the beam to the curved portion at a position different from the detection site, viewed in the Z-axis direction, and each of the displacement electrodes is supported by the beam of the corresponding deformable body-side support.

11. The force sensor according to claim 1, wherein each of the curved portions of the deformable body protrudes in the negative direction on the Z-axis, the detection circuit includes: a total of eight displacement electrodes arranged two in each of the curved portions; and a fixed electrode arranged to face each of the displacement electrodes and fixed to the fixed portion, the displacement electrodes and the fixed electrodes constitute eight sets of capacitive elements, the detection circuit outputs a first electric signal indicating one of the applied force and the moment on the basis of a variation amount in an electrostatic capacitance value of a total of four capacitive elements obtained by selecting each one from the capacitive elements arranged such that two capacitive elements are located in each of the curved portions of the deformable body, and outputs a second electric signal indicating one of the applied force and the moment on the basis of a variation amount in an electrostatic capacitance value of a total of four capacitive elements obtained by selecting each one from the remaining capacitive elements, and determines whether the force sensor is functioning normally on the basis of the first electric signal and the second electric signal.

12. The force sensor according to claim 11, wherein the detection circuit determines whether the force sensor is functioning normally on the basis of a difference between the first electric signal and the second electric signal.

13. The force sensor according to claim 1, wherein each of the curved portions protrudes in the negative direction on the Z-axis and is formed by a first curved portion having a first spring constant and a second curved portion having a second spring constant different from the first spring constant continuously connected in a circumferential direction of the deformable body, the detection circuit includes: a total of eight displacement electrodes arranged one for each of the first curved portion and the second curved portion; and a fixed electrode arranged to face each of the displacement electrodes and fixed to the fixed portion, each of the displacement electrodes and the fixed electrodes constitute eight sets of capacitive elements, the detection circuit outputs a first electric signal indicating one of the applied force and the moment on the basis of a variation amount in an electrostatic capacitance value of the four capacitive elements arranged in the first curved portion, and outputs a second electric signal indicating one of an applied force and a moment on the basis of a variation amount in an electrostatic capacitance value of the four capacitive elements arranged in the second curved portion, and determines whether the force sensor is functioning normally on the basis of a change in a ratio of the first electric signal to the second electric signal.

14. The force sensor according to claim 13, wherein the detection circuit stores the ratio of the first electric signal to the second electric signal in a state where the force sensor is functioning normally as a reference ratio, and determines whether the force sensor is functioning normally on the basis of a difference between the ratio of the first electric signal to the second electric signal, and the reference ratio.

15. The force sensor according to claim 11, wherein in a case where the V-axis and the W-axis passing through the origin O and forming an angle of 45° with respect to the X-axis and the Y-axis are defined on the XY plane, the two displacement electrodes arranged in a first quadrant on the XY plane are arranged symmetrically about the positive V-axis, the two displacement electrodes arranged in a second quadrant on the XY plane are arranged symmetrically about the positive W-axis, the two displacement electrodes arranged in a third quadrant on the XY plane are arranged symmetrically about the negative V-axis, and the two displacement electrodes arranged in a fourth quadrant on the XY plane are arranged symmetrically about the negative W-axis.

16. A force sensor that detects at least one of a force in each axial direction and a moment around each axis in an XYZ three-dimensional coordinate system, the force sensor comprising:

a circular fixed body fixed with respect to the XYZ three-dimensional coordinate system;

an annular deformable body arranged so as to surround the fixed body and to be connected to the fixed body and configured to generate elastic deformation by application of one of the force and the moment;

an annular force receiving body surrounding the deformable body and connected to the deformable body, and configured to move relative to the fixed body by the application of one of the force and the moment; and a detection circuit configured to output an electric signal indicating one of the force and the moment applied to the force receiving body on the basis of the elastic deformation generated in the deformable body, wherein the fixed body, the deformable body, and the force receiving body are arranged to be concentric with each other, the Z-coordinate value of an end surface of the force receiving body on the positive side on the Z-axis is greater than the Z-coordinate value of an end surface of the deformable body on the positive side on the Z-axis, a Z-coordinate value of an end surface of the fixed body on the negative side on the Z-axis is smaller than a Z-coordinate value of an end surface of the deformable body on the negative side on the Z-axis, and the deformable body includes: two fixed portions connected to the fixed body; two force receiving portions connected to the force receiving body and alternately positioned with the fixed portions in the circumferential direction of the deformable body; and four deformable portions positioned between the adjacent fixed portions and the force receiving portions, wherein each of the deformable portions includes a curved portion protruding in the Z-axis direction, and the detection circuit outputs the electric signal on the basis of elastic deformation generated in the curved portion.

17. A force sensor that detects at least one of a force in each axial direction and a moment around each axis in an XYZ three-dimensional coordinate system, the force sensor comprising:

a circular fixed body fixed with respect to the XYZ three-dimensional coordinate system;

an annular deformable body arranged so as to surround the fixed body and to be connected to the fixed body and configured to generate elastic deformation by application of one of the force and the moment;

an annular force receiving body surrounding the deformable body and connected to the deformable body, and configured to move relative to the fixed body by the application of one of the force and the moment; and a detection circuit configured to output an electric signal indicating one of the force and the moment applied to the force receiving body on the basis of the elastic deformation generated in the deformable body, wherein the fixed body, the deformable body, and the force receiving body are arranged to be concentric with each other, the Z-coordinate value of an end surface of the force receiving body on the positive side on the Z-axis is greater than the Z-coordinate value of an end surface of the deformable body on the positive side on the Z-axis, a Z-coordinate value of an end surface of the fixed body on the negative side on the Z-axis is smaller than a Z-coordinate value of an end surface of the deformable body on the negative side on the Z-axis, and the deformable body includes: two fixed portions connected to the fixed body; two force receiving portions connected to the force receiving body and alternately positioned with the fixed portions in the circumferential direction of the deformable body; and four deformable portions positioned between the adjacent fixed portions and the force receiving portions, wherein each of the deformable portions includes a curved portion protruding in a radial direction of the deformable body, and the detection circuit outputs the electric signal on the basis of elastic deformation generated in the curved portion.

18. The force sensor according to claim 16, wherein the two fixed portions are arranged symmetrically with a site where the deformable body overlaps with the X-axis about the Y-axis when viewed in the Z-axis direction, and the two force receiving portions are arranged symmetrically with a site where the deformable body overlaps with the Y-axis with about the X-axis when viewed in the Z-axis direction.

19. The force sensor according to claim 17, wherein the two fixed portions are arranged symmetrically with a site where the deformable body overlaps with the X-axis about the Y-axis when viewed in the Z-axis direction, and the two force receiving portions are arranged symmetrically with a site where the deformable body overlaps with the Y-axis with about the X-axis when viewed in the Z-axis direction.

* * * * *